(12) United States Patent
Zhou et al.

(10) Patent No.: US 10,028,286 B2
(45) Date of Patent: Jul. 17, 2018

(54) FLEXIBLY DISABLING PARTICULAR UPLINK OR DOWNLINK CHANNELS WHEN IN A STATE OF POWER IMBALANCE

(71) Applicant: Huawei Technologies Co., Ltd., Shenzhen (CN)

(72) Inventors: Han Zhou, Shanghai (CN); Meng Hua, Shanghai (CN); Peng Zhang, Shanghai (CN); Xiaolei Tie, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 192 days.

(21) Appl. No.: 14/981,231

(22) Filed: Dec. 28, 2015

(65) Prior Publication Data
US 2016/0113023 A1    Apr. 21, 2016

Related U.S. Application Data

(63) Continuation of application No. PCT/CN2014/081072, filed on Jun. 28, 2014.

(30) Foreign Application Priority Data

Jun. 29, 2013 (CN) .......................... 2013 1 0270843
Mar. 19, 2014 (CN) .......................... 2014 1 0103869
May 8, 2014 (CN) .......................... 2014 1 0192727

(51) Int. Cl.
*H04W 72/08* (2009.01)
*H04W 36/20* (2009.01)
(Continued)

(52) U.S. Cl.
CPC ......... *H04W 72/082* (2013.01); *H04L 1/1812* (2013.01); *H04L 5/0055* (2013.01);
(Continued)

(58) Field of Classification Search
CPC . H04W 72/082; H04W 72/042; H04W 16/32; H04W 36/20; H04W 52/04;
(Continued)

(56) References Cited

U.S. PATENT DOCUMENTS

2008/0198831 A1* 8/2008 Zhang ................... H04W 16/04
                                                      370/342
2011/0026422 A1   2/2011 Ma et al.
(Continued)

FOREIGN PATENT DOCUMENTS

CN       101547477 A    9/2009
CN       102413573 A    4/2012
(Continued)

OTHER PUBLICATIONS

Ericsson; 3GPP TSG RAN WG1 Meeting #72bis; Apr. 19, 2013; R1-131549.*

(Continued)

*Primary Examiner* — Ricky Ngo
*Assistant Examiner* — Stephen Steiner
(74) *Attorney, Agent, or Firm* — Conley Rose, P.C.

(57) ABSTRACT

A network communications method includes receiving, by a user equipment (UE), instruction information sent by a radio network controller (RNC) in an access network, where the instruction information is used to instruct the UE to perform uplink and downlink service transmission with a macro base station and perform uplink service transmission with a micro base station in a first area, and/or perform uplink and downlink service transmission with a micro base station and perform downlink service transmission with a macro base station in a second area, and performing, by the UE, service transmission according to the instruction information.

21 Claims, 15 Drawing Sheets

(51) Int. Cl.
| | |
|---|---|
| H04L 1/18 | (2006.01) |
| H04L 5/00 | (2006.01) |
| H04W 16/32 | (2009.01) |
| H04W 52/04 | (2009.01) |
| H04W 72/04 | (2009.01) |
| H04W 76/04 | (2009.01) |
| H04W 76/06 | (2009.01) |
| H04W 88/06 | (2009.01) |
| H04W 88/12 | (2009.01) |

(52) U.S. Cl.
CPC ........... *H04W 16/32* (2013.01); *H04W 36/20* (2013.01); *H04W 52/04* (2013.01); *H04W 72/042* (2013.01); *H04W 76/046* (2013.01); *H04W 76/06* (2013.01); *H04W 88/06* (2013.01); *H04W 88/12* (2013.01)

(58) Field of Classification Search
CPC .. H04W 76/046; H04W 76/06; H04L 5/0055; H04L 1/1812
See application file for complete search history.

(56) References Cited

U.S. PATENT DOCUMENTS

| | | | |
|---|---|---|---|
| 2012/0071190 A1 | 3/2012 | Choi et al. | |
| 2012/0213092 A1 | 8/2012 | Sun et al. | |
| 2016/0029388 A1* | 1/2016 | Ali | H04W 72/1278 370/329 |

FOREIGN PATENT DOCUMENTS

| | | |
|---|---|---|
| CN | 102932836 A | 2/2013 |
| WO | 2012112868 A1 | 8/2012 |
| WO | 2013020209 A1 | 2/2013 |

OTHER PUBLICATIONS

Nokia; 3GPP TSG RAN WG1 Meeting #73; May 24, 2013; R1-132704.*

"3rd Generation Partnership Project; Technical Specification Group Radio Access Network; Study on UMTS Heterogeneous Networks; (Release 12)," 3GPP TR 25.800, V1.0.1, Technical Report, Jun. 2013, 54 pages.

"3rd Generation Partnership Project; Technical Specification Group Radio Access Network; Physical channels and mapping of transport channels onto physical channels (FDD) (Release 11)," 3GPP TS 25.211, V11.4.0, Technical Specification, Jun. 2013, 63 pages.

Ericsson, "On Uplink/Downlink Imbalance Problems in Heterogeneous Networks," 3GPP TSG RAN WG1 Meeting #72bis, R1-131549, Apr. 15-19, 2013, 5 pages.

Nokia, "Introducing E-DCH decoupling in Hetnet deployments," 3GPP TSG-RAN WG1 Meeting #73, R1-132529, May 20-24, 2013, 7 pages.

Nokia, "TP for Section 7.1.2 and 7.1.3 on potential solutions in 7.1 Solutions for Co-channel Scenarios," 3GPP TSG RAN WG1 Meeting #73, R1-132704, May 20-24, 2013, 11 pages.

Foreign Communication From a Counterpart Application, European Application No. 14818014.4, Extended European Search Report dated May 18, 2016, 12 pages.

"3rd Generation Partnership Project; Technical Specification Group Radio Access Network; Radio Resource Control (RRC); Protocol Specification (Release 10)," 3GPP TS 25.331, V10.11.0, Technical Specification, Mar. 2013, 937 pages.

"3rd Generation Partnership Project; Technical Specification Group Radio Access Network; UTRAN lub interface Node B Application Part (NBAP) signalling (Release 11)," 3GPP TS 25.433, V11.4.0, Technical Specification, Mar. 2013, 1337 pages.

Foreign Communication From A Counterpart Application, PCT Application No. PCT/CN2014/081072, English Translation of International Search Report dated Oct. 10, 2014, 2 pages.

Foreign Communication From A Counterpart Application, PCT Application No. PCT/CN2014/081072, English Translation of Written Opinion dated Oct. 10, 2014, 18 pages.

ZTE, "E-DCH Decoupling for Legacy UE," R1-135621, 3GPP TSG RAN WG1 Meeting #75, Nov. 11-15, 2013, 5 pages.

Qualcomm Incorp, "Solutions for UL/DL Incorporated," R1-140706, 3GPP TSG RAN WG1 Meeting #76, Feb. 10-14, 2014, 4 pages.

Huawei, "Considerations on E-DCH decoupling," R1-134676, 3GPP TSG-RAN WG1 Meeting #74bis, Oct. 7-11, 2013, 4 pages.

Foreign Communication From A Counterpart Application, Chinese Application No. 2016-522237, Chinese Office Action dated Feb. 14, 2017, 3 pages.

Foreign Communication From A Counterpart Application, Chinese Application No. 2016-522237, English Translation of Chinese Office Action dated Feb. 14, 2017, 4 pages.

* cited by examiner

FLEXIBLY DISABLING PARTICULAR UPLINK OR DOWNLINK CHANNELS WHEN IN A STATE OF POWER IMBALANCE

CROSS-REFERENCE TO RELATED APPLICATIONS

This application is a continuation of International Application No. PCT/CN2014/081072, filed on Jun. 28, 2014, which claims priority to Chinese Patent Application No. 201310270843.9, filed on Jun. 29, 2013, Chinese Patent Application No. 201410103869.9 filed on Mar. 19, 2014, and Chinese Patent Application No. 201410192727.4 filed on May 8, 2014, all of which are incorporated herein by reference in their entireties.

TECHNICAL FIELD

Embodiments of the present disclosure relate to the field of communications technologies, and in particular, to a network communications method, apparatus, and system.

BACKGROUND

A heterogeneous network (HetNet) technology is a radio access network technology applicable to a multi-layer network. A conventional radio access network generally has only one network layer, which is referred to as a macro network layer, and a base station in a macro network (macro base station for short) needs to cover an entire macro network to provide continuous and uninterrupted services to users. In a HetNet, one or more micro network layers are added on a basis of a macro network layer, and a base station in a micro network (micro base station for short) has low transmit power and a coverage range that is much lower than that of a macro base station. Therefore, a micro base station is also referred to as a low power node (LPN). A micro base station is generally deployed at a coverage hole or a hot spot area of a macro base station to offload the macro base station, so as to improve a throughput rate of an entire network.

In a HetNet, an uplink power balance line is a location where a macro base station and a micro base station have same received quality of an uplink signal sent by a user equipment (UE), and a downlink power balance line is a location where the UE has same received quality of downlink signals sent by the macro base station and the micro base station. The uplink power balance line is related only to a path loss from the UE separately to the micro base station and to the macro base station, and the downlink power balance line further depends on transmit power of the macro base station and the micro base station. Pilot transmit power of the macro base station is much different from that of the micro base station; therefore, the downlink power balance line is shifted towards the micro base station, which causes a problem that the uplink power balance line and the downlink power balance line are inconsistent between the macro base station and the micro base station. Such inconsistency eventually causes that in proximity to a cell handover area, the UE encounters different types of interference when receiving and sending different services in different areas. FIG. 1 is a schematic diagram of an uplink power balance line, a downlink power balance line, and a soft handover area in the prior art. As shown in FIG. 1: in area B: downlink reception quality on the UE for the macro base station is better than that for the micro base station, where a high speed downlink packet access (HSDPA) serving cell is the macro base station; but on an uplink, a path loss from the UE to the micro base station is less than a path loss from the UE to the macro base station, and reception on the micro base station for the UE is better than that on the macro base station; however, because a serving cell of the UE is the macro base station and the UE has not entered a soft handover (SHO) area, the micro base station cannot perform power control on the UE; as a result, receive power on the micro base station for an uplink service of the UE is excessively high, which causes uplink interference to the micro base station; and in area E: although in this area, link quality of the micro base station is better on both an uplink and a downlink for the UE, the UE still has higher receive power for a downlink signal of the macro base station, which may cause downlink interference to the micro base station.

SUMMARY

Embodiments of the present disclosure provide a network communications method, apparatus, and system, so as to reduce a problem of uplink interference and downlink interference that is caused to a micro base station when a UE, in a first area or a second area, performs service transmission in a HetNet.

According to a first aspect, an embodiment of the present disclosure provides a network communications method, including receiving, by a user equipment UE, instruction information sent by a radio network controller (RNC) in an access network, where the instruction information is used to instruct the UE to, in a first area, perform uplink and downlink service transmission with a macro base station of the access network and perform uplink service transmission with a micro base station of the access network, where the first area is an area in which common pilot channel quality of the micro base station is between common pilot channel quality of the micro base station that reaches a first threshold value for addition to a first active set and common pilot channel quality of the micro base station that reaches a first condition threshold value for addition to a second active set, and the common pilot channel quality of the micro base station is obtained by the UE in the first area by means of measurement; and/or in a second area, perform uplink and downlink service transmission with a micro base station and perform downlink service transmission with a macro base station, where the second area is an area in which common pilot channel quality of the macro base station is between common pilot channel quality of the macro base station that reaches a third threshold value for addition to a third active set and common pilot channel quality of the macro base station that reaches a second condition threshold value for addition to a second active set, and the common pilot channel quality of the macro base station is obtained by the UE in the second area by means of measurement; and performing, by the UE, service transmission according to the instruction information, where the first active set includes an extended dedicated channel (DCH) active set and/or an extended enhanced dedicated channel (E-DCH) active set, where the extended DCH active set supports the UE to send an uplink DCH service, a micro base station in the extended DCH active set receives the uplink DCH service sent by the UE, the extended E-DCH active set supports the UE to send an E-DCH service, and a micro base station in the extended E-DCH active set receives the E-DCH service sent by the UE; in the first active set, the UE may receive and calculate a log-likelihood ratio (LLR) of a DCH service of a macro base station in the first active set, and input the LLR as a Viterbi decoder to perform Viterbi decoding; the second active set includes a DCH active set and/or an E-DCH active set; the third active set includes an extended DCH active set, where the extended DCH active set supports a macro base station in the third active set to send a downlink DCH service, and the UE receives the downlink DCH service sent by the macro base station in the third active set; and in the third active set, the UE may receive an enhanced dedicated channel hybrid automatic repeat request indicator channel (E-HICH) sent by a micro base station in the third active set; the UE transmits new data if the E-HICH indicates an acknowledgement (ACK), or the UE retransmits data if the E-HICH indicates a negative acknowledgement (NACK) and a maximum quantity of retransmissions is not reached.

In a first possible implementation manner of the first aspect, before the performing, by the UE, service transmission according to the instruction information, the method further includes: receiving, by the UE, active set update signaling sent by the RNC; and adding, by the UE according to the active set update signaling, the micro base station to the first active set when performing service transmission in the first area, and/or adding the macro base station to the third active set when performing service transmission in the second area.

With reference to the first possible implementation manner of the first aspect, in a second possible implementation manner of the first aspect, before the receiving, by the UE, active set update signaling sent by the RNC, the method further includes: measuring, by the UE, common pilot channel quality of each cell; and when the UE is in a non-soft handover area, and when the UE measures that the common pilot channel quality of the micro base station is greater than the preset first threshold value for addition to the first active set and less than the first condition threshold value for addition to the second active set, sending, by the UE, a first measurement report to the RNC, so that the RNC sends the active set update signaling to the UE according to the first measurement report; or when the UE is in a soft handover area corresponding to the second active set, and when the UE measures that the common pilot channel quality of the micro base station is less than a third condition threshold value for removal of the micro base station from the second active set and greater than a preset second threshold value, sending, by the UE, a first measurement report to the RNC, so that the RNC sends the active set update signaling to the UE according to the first measurement report.

With reference to the second possible implementation manner of the first aspect, in a third possible implementation manner of the first aspect, after the performing, by the UE, service transmission according to the instruction information, the method further includes: continuing, by the UE, to measure the common pilot channel quality of the micro base station, and when the common pilot channel quality of the micro base station is greater than the first condition threshold value for addition to the second active set, sending, by the UE, a second measurement report to the RNC, so that the RNC sends first control information to the UE; and adding, by the UE, the micro base station to the second active set according to the first control information; or continuing, by the UE, to measure the common pilot channel quality of the micro base station, and when the common pilot channel quality of the micro base station is less than the second threshold value, sending, by the UE, a second measurement report to the RNC, so that the RNC sends second control information to the UE; and removing, by the UE, the micro base station from the first active set according to the second control information.

With reference to the method according to any one of the first possible implementation manner of the first aspect to the third possible implementation manner of the first aspect, in a fourth possible implementation manner of the first aspect, a service transmitted by the UE includes a DCH service, and the method further includes receiving, by the UE, a transmit power control (TPC) sent by the micro base station, where the TPC is used to adjust uplink transmit power of the UE; or a service transmitted by the UE includes an E-DCH service, and the method further includes receiving, by the UE, a TPC, an enhanced dedicated channel relative grant channel (E-RGCH), and an E-HICH that are sent by the micro base station, where the TPC is used to adjust uplink transmit power of the UE, the E-RGCH is used to adjust a scheduling grant value obtained by the UE, and the E-HICH is used to feed back to the UE whether the micro base station correctly receives data of the UE.

With reference to the first possible implementation manner of the first aspect, in a fifth possible implementation manner of the first aspect, before the receiving, by the UE, active set update signaling sent by the RNC, the method further includes measuring, by the UE, common pilot channel quality of each cell; and when the UE is in a non-soft handover area, and when the UE measures that the common pilot channel quality of the macro base station is greater than the preset third threshold value and less than the second condition threshold value for addition to the second active set, sending, by the UE, a third measurement report to the RNC, so that the RNC sends the active set update signaling to the UE according to the third measurement report; or when the UE is in a soft handover area corresponding to the second active set, and when the UE measures that the common pilot channel quality of the macro base station is less than a fourth condition threshold value for removal of the macro base station from the second active set and greater than a preset fourth threshold value, sending, by the UE, a third measurement report to the RNC, so that the RNC sends the active set update signaling to the UE according to the third measurement report.

With reference to the fifth possible implementation manner of the first aspect, in a sixth possible implementation manner of the first aspect, after the performing, by the UE, service transmission according to the instruction information, the method further includes continuing, by the UE, to measure the common pilot channel quality of the macro base station, and when the common pilot channel quality of the macro base station is greater than the second condition threshold value for addition to the second active set, sending, by the UE, a fourth measurement report to the RNC, so that the RNC sends third control information to the UE; and adding, by the UE, the macro base station to the second active set according to the third control information; or continuing, by the UE, to measure the common pilot channel quality of the macro base station, and when the common pilot channel quality of the macro base station is less than the fourth threshold value, sending, by the UE, a fourth measurement report to the RNC, so that the RNC sends fourth control information to the UE; and removing, by the UE, the macro base station from the third active set according to the fourth control information.

According to a second aspect, an embodiment of the present disclosure provides a network communications method, including generating, by an RNC in an access network, instruction information, where the instruction information is used to instruct a user equipment UE to, in a first area, perform uplink and downlink service transmission with a macro base station of the access network and perform uplink service transmission with a micro base station of the access network, where the first area is an area in which common pilot channel quality of the micro base station is between common pilot channel quality of the micro base station that reaches a first threshold value for addition to a first active set and common pilot channel quality of the micro base station that reaches a first condition threshold value for addition to a second active set, and the common pilot channel quality of the micro base station is obtained by the UE in the first area by means of measurement; and/or in a second area, perform uplink and downlink service transmission with a micro base station and perform downlink service transmission with a macro base station, where the second area is an area in which common pilot channel quality of the macro base station is between common pilot channel quality of the macro base station that reaches a third threshold value for addition to a third active set and common pilot channel quality of the macro base station that reaches a second condition threshold value for addition to a second active set, and the common pilot channel quality of the macro base station is obtained by the UE in the second area by means of measurement; and sending, by the RNC, the instruction information to the UE, so that the UE performs service transmission according to the instruction information, where the first active set includes an extended DCH active set and/or an extended E-DCH active set, where the extended DCH active set supports the UE to send an uplink DCH service, a micro base station in the extended DCH active set receives the uplink DCH service sent by the UE, the extended E-DCH active set supports the UE to send an E-DCH service, and a micro base station in the extended E-DCH active set receives the E-DCH service sent by the UE; in the first active set, the UE may receive and calculate a log-likelihood ratio LLR of a DCH service of a macro base station in the first active set, and input the LLR as a Viterbi decoder to perform Viterbi decoding; the second active set includes a DCH active set and/or an E-DCH active set; the third active set includes an extended DCH active set, where the extended DCH active set supports a macro base station in the third active set to send a downlink DCH service, and the UE receives the downlink DCH service sent by the macro base station in the third active set; and in the third active set, the UE may receive an E-HICH sent by a micro base station in the third active set; the UE transmits new data if the E-HICH indicates an ACK, or the UE retransmits data if the E-HICH indicates a NACK and a maximum quantity of retransmissions is not reached.

In a first possible implementation manner of the second aspect, before the sending, by the RNC, the instruction information to the UE, the method further includes sending, by the RNC, active set update signaling to the UE, so that the UE, according to the active set update signaling, adds the micro base station to the first active set when performing service transmission in the first area, and/or adds the macro base station to the third active set when performing service transmission in the second area.

With reference to the first possible implementation manner of the second aspect, in a second possible implementation manner of the second aspect, before the sending, by the RNC, active set update signaling to the UE, the method further includes receiving, by the RNC, a first measurement report sent by the UE, where the first measurement report is sent to the RNC when the UE is in a non-soft handover area and when the UE measures that the common pilot channel quality of the micro base station is greater than the preset first threshold value for addition to the first active set and less than the first condition threshold value for addition to the second active set; or the first measurement report is sent to the RNC when the UE is in a soft handover area corresponding to the second active set and when the UE measures that the common pilot channel quality of the micro base station is less than a third condition threshold value for removal of the micro base station from the second active set and greater than a preset second threshold value.

With reference to the second possible implementation manner of the second aspect, in a third possible implementation manner of the second aspect, after the sending, by the RNC, the instruction information to the UE, the method further includes receiving, by the RNC, a second measurement report sent by the UE, where the second measurement report is sent by the UE to the RNC when the common pilot channel quality of the micro base station is greater than the first condition threshold value for addition to the second active set; and sending, by the RNC, first control information to the UE, so that the UE adds the micro base station to the second active set according to an instruction of the first control information; or receiving, by the RNC, a second measurement report sent by the UE, where the second measurement report is sent by the UE to the RNC when the common pilot channel quality of the micro base station is less than the second threshold value; and sending, by the RNC, second control information to the UE, so that the UE removes the micro base station from the first active set according to the second control information.

With reference to the first possible implementation manner of the second aspect, in a fourth possible implementation manner of the second aspect, before the sending, by the RNC, active set update signaling to the UE, the method further includes receiving, by the RNC, a third measurement report sent by the UE, where the third measurement report is sent by the UE to the RNC when the UE is in a non-soft handover area and when the UE measures that the common pilot channel quality of the macro base station is greater than the preset third threshold value and less than the second condition threshold value for addition to the second active set; or the third measurement report is sent by the UE to the RNC when the UE is in a soft handover area corresponding to the second active set and when the UE measures that the common pilot channel quality of the macro base station is less than a fourth condition threshold value for removal of the macro base station from the second active set and greater than a preset fourth threshold value.

With reference to the fourth possible implementation manner of the second aspect, in a fifth possible implementation manner of the second aspect, after the sending, by the RNC, the instruction information to the UE, the method further includes receiving, by the RNC, a fourth measurement report sent by the UE, where the fourth measurement report is sent by the UE to the RNC when the common pilot channel quality of the macro base station is greater than the second condition threshold value for addition to the second active set; and sending, by the RNC, third control information to the UE, so that the UE adds the macro base station to the second active set according to the third control information; or receiving, by the RNC, a fourth measurement report sent by the UE, where the fourth measurement report is sent by the UE to the RNC when the common pilot channel quality of the macro base station is less than the fourth threshold value; and sending, by the RNC, fourth control information to the UE, so that the UE removes the macro base station from the third active set according to the fourth control information.

According to a third aspect, an embodiment of the present disclosure provides a network communications method, including receiving, by a micro base station, configuration information sent by an RNC in an access network, where the configuration information is used to instruct the micro base station to receive an uplink DCH and/or uplink E-DCH service sent by a UE; and after the micro base station is added by the UE to a first active set when the UE performs service transmission in a first area, receiving, by the micro base station in the first active set according to the configuration information, the uplink DCH and/or uplink E-DCH service sent by the UE, where the first area is an area in which common pilot channel quality of the micro base station is between common pilot channel quality of the micro base station that reaches a first threshold value for addition to the first active set and common pilot channel quality of the micro base station that reaches a first condition threshold value for addition to a second active set, and the common pilot channel quality of the micro base station is obtained by the UE in the first area by means of measurement, where the first active set includes an extended DCH active set and/or an extended E-DCH active set, where the extended DCH active set supports the UE to send an uplink DCH service, a micro base station in the extended DCH active set receives the uplink DCH service sent by the UE, the extended E-DCH active set supports the UE to send an E-DCH service, and a micro base station in the extended E-DCH active set receives the E-DCH service sent by the UE; and in the first active set, the UE may receive and calculate a LLR of a DCH service of a macro base station in the first active set, and input the LLR as a Viterbi decoder to perform Viterbi decoding.

In a first possible implementation manner of the third aspect, if a service received by the micro base station is a DCH service, the method further includes sending, by the micro base station, a TPC to the UE, where the TPC is used to adjust uplink transmit power of the UE; or if a service received by the micro base station is an E-DCH service, the method further includes sending, by the micro base station, a TPC, an E-RGCH, and an E-HICH to the UE, where the TPC is used to adjust uplink transmit power of the UE, the E-RGCH is used to adjust a scheduling grant value obtained by the UE, and the E-HICH is used to feed back to the UE whether the micro base station correctly receives data of the UE.

According to a fourth aspect, an embodiment of the present disclosure provides a network communications method, including receiving, by a macro base station, configuration information sent by a RNC in an access network, where the configuration information is used to instruct the macro base station to send a downlink DCH service to a UE; and after the macro base station is added by the UE to the third active set when the UE performs service transmission in a second area, sending, by the macro base station in the third active set according to the configuration information, the downlink DCH service to the UE, where the second area is an area in which common pilot channel quality of the macro base station is between common pilot channel quality of the macro base station that reaches a third threshold value for addition to the third active set and common pilot channel quality of the macro base station that reaches a second condition threshold value for addition to a second active set, and the common pilot channel quality of the macro base station is obtained by the UE in the second area by means of measurement, where the third active set includes an extended DCH active set, where the extended DCH active set supports a macro base station in the third active set to send a downlink DCH service, and the UE receives the downlink DCH service sent by the macro base station in the third active set; and in the third active set, the UE may receive an E-HICH sent by a micro base station in the third active set; the UE transmits a new E-DCH service if the E-HICH indicates an ACK, or the UE retransmits an E-DCH service if the E-HICH indicates a NACK and a maximum quantity of retransmissions is not reached.

In a first possible implementation manner of the fourth aspect, after the sending, in a third active set according to the configuration information, the downlink DCH service to the UE, the method further includes receiving an uplink power control command TPC sent by the UE, where the TPC is used to control transmit power of the downlink DCH service.

According to a fifth aspect, an embodiment of the present disclosure provides a user equipment, including a receiving module configured to receive instruction information sent by a RNC in an access network, where the instruction information is used to instruct the UE to, in a first area, perform uplink and downlink service transmission with a macro base station of the access network and perform uplink service transmission with a micro base station of the access network, where the first area is an area in which common pilot channel quality of the micro base station is between common pilot channel quality of the micro base station that reaches a first threshold value for addition to a first active set and common pilot channel quality of the micro base station that reaches a first condition threshold value for addition to a second active set, and the common pilot channel quality of the micro base station is obtained by the UE in the first area by means of measurement; and/or in a second area, perform uplink and downlink service transmission with a micro base station and perform downlink service transmission with a macro base station, where the second area is an area in which common pilot channel quality of the macro base station is between common pilot channel quality of the macro base station that reaches a third threshold value for addition to a third active set and common pilot channel quality of the macro base station that reaches a second condition threshold value for addition to a second active set, and the common pilot channel quality of the macro base station is obtained by the UE in the second area by means of measurement; and a processing module configured to perform service transmission according to the instruction information, where the first active set includes an extended DCH active set and/or an extended E-DCH active set, where the extended DCH active set supports the UE to send an uplink DCH service, a micro base station in the extended DCH active set receives the uplink DCH service sent by the UE, the extended E-DCH active set supports the UE to send an E-DCH service, and a micro base station in the extended E-DCH active set receives the E-DCH service sent by the UE; in the first active set, the UE may receive and calculate a LLR of a DCH service of a macro base station in the first active set, and input the LLR as a Viterbi decoder to perform Viterbi decoding; the second active set includes a DCH active set and/or an E-DCH active set; the third active set includes an extended DCH active set, where the extended DCH active set supports a macro base station in the third active set to send a downlink DCH service, and the UE receives the downlink DCH service sent by the macro base station in the third active set; and in the third active set, the UE may receive an E-HICH sent by a micro base station in the third active set; the UE transmits new data if the E-HICH indicates an ACK, or the UE retransmits data if the E-HICH indicates a NACK and a maximum quantity of retransmissions is not reached.

In a first possible implementation manner of the fifth aspect, the receiving module is further configured to receive, before the processing module performs service transmission according to the instruction information, active set update signaling sent by the RNC; and the processing module is further configured to, according to the active set update signaling, add the micro base station to the first active set when performing service transmission in the first area, and/or add the macro base station to the third active set when performing service transmission in the second area.

With reference to the first possible implementation manner of the fifth aspect, in a second possible implementation manner of the fifth aspect, the user equipment further includes a first measuring module configured to measure common pilot channel quality of each cell before the receiving module receives the active set update signaling sent by the RNC; and a first sending module configured to, when the UE is in a non-soft handover area, and when the first measuring module measures that the common pilot channel quality of the micro base station is greater than the preset first threshold value for addition to the first active set and less than the first condition threshold value for addition to the second active set, send a first measurement report to the RNC, so that the RNC sends the active set update signaling to the UE according to the first measurement report, where the first sending module is further configured to: when the UE is in a soft handover area corresponding to the second active set, and when the UE measures that the common pilot channel quality of the micro base station is less than a second condition threshold value for removal of the micro base station from the second active set and greater than a preset second threshold value, send a first measurement report to the RNC, so that the RNC sends the active set update signaling to the UE according to the first measurement report.

With reference to the second possible implementation manner of the fifth aspect, in a third possible implementation manner of the fifth aspect, the first measuring module is further configured to, after the processing module performs service transmission according to the instruction information, continue to measure the common pilot channel quality of the micro base station; when the common pilot channel quality of the micro base station is greater than the first condition threshold value for addition to the second active set, the first sending module is further configured to send a second measurement report to the RNC, so that the RNC sends first control information to the UE; and the processing module is further configured to add the micro base station to the second active set according to the first control information; or the first measuring module is further configured to, after the processing module performs service transmission according to the instruction information, continue to measure the common pilot channel quality of the micro base station; when the common pilot channel quality of the micro base station is less than the second threshold value, the first sending module is further configured to send a second measurement report to the RNC, so that the RNC sends second control information to the UE; and the processing module is further configured to remove the micro base station from the first active set according to the second control information.

With reference to the user equipment according to any one of the first possible implementation manner of the fifth aspect to the third possible implementation manner of the fifth aspect, in a fourth possible implementation manner of the fifth aspect, a service transmitted by the UE includes a DCH service, and the receiving module is further configured to receive a power control command TPC sent by the micro base station, where the TPC is used to adjust uplink transmit power of the UE; or a service transmitted by the UE includes an E-DCH service, and the receiving module is further configured to receive a power control command TPC, an E-RGCH, and an E-HICH that are sent by the micro base station, where the TPC is used to adjust uplink transmit power of the UE, the E-RGCH is used to adjust a scheduling grant value obtained by the UE, and the E-HICH is used to feed back to the UE whether the micro base station correctly receives data of the UE.

With reference to the first possible implementation manner of the fifth aspect, in a fifth possible implementation manner of the fifth aspect, the user equipment further includes a second measuring module configured to measure common pilot channel quality of each cell before the receiving module receives the active set update signaling sent by the RNC; and a second sending module configured to, when the UE is in a non-soft handover area, and when the second measuring module measures that the common pilot channel quality of the macro base station is greater than the preset third threshold value and less than the second condition threshold value for addition to the second active set, send a third measurement report to the RNC, so that the RNC sends the active set update signaling to the UE according to the third measurement report, where the second sending module is further configured to, when the UE is in a soft handover area corresponding to the second active set, and when the second measuring module measures that the common pilot channel quality of the macro base station is less than a fourth condition threshold value for removal of the macro base station from the second active set and greater than a preset fourth threshold value, send a third measurement report to the RNC, so that the RNC sends the active set update signaling to the UE according to the third measurement report.

With reference to the fifth possible implementation manner of the fifth aspect, in a sixth possible implementation manner of the fifth aspect, the second measuring module is further configured to, after the processing module performs service transmission according to the instruction information, continue to measure the common pilot channel quality of the macro base station; when the common pilot channel quality of the macro base station is greater than the second condition threshold value for addition to the second active set, the second sending module is further configured to send a fourth measurement report to the RNC, so that the RNC sends third control information to the UE; and the processing module is further configured to add the macro base station to the second active set according to the third control information; or the second measuring module is further configured to: after the processing module performs service transmission according to the instruction information, continue to measure the common pilot channel quality of the macro base station; when the common pilot channel quality of the macro base station is less than the fourth threshold value, the second sending module is further configured to send a fourth measurement report to the RNC, so that the RNC sends fourth control information to the UE; and the processing module is further configured to remove the macro base station from the third active set according to the fourth control information.

According to a sixth aspect, an embodiment of the present disclosure provides a radio network controller, including a generating module configured to generate instruction information, where the instruction information is used to instruct a user equipment UE to, in a first area, perform uplink and downlink service transmission with a macro base station of an access network and perform uplink service transmission with a micro base station of the access network, where the first area is an area in which common pilot channel quality of the micro base station is between common pilot channel quality of the micro base station that reaches a first threshold value for addition to a first active set and common pilot channel quality of the micro base station that reaches a first condition threshold value for addition to a second active set, and the common pilot channel quality of the micro base station is obtained by the UE in the first area by means of measurement; and/or in a second area, perform uplink and downlink service transmission with a micro base station and perform downlink service transmission with a macro base station, where the second area is an area in which common pilot channel quality of the macro base station is between common pilot channel quality of the macro base station that reaches a third threshold value for addition to a third active set and common pilot channel quality of the macro base station that reaches a second condition threshold value for addition to a second active set, and the common pilot channel quality of the macro base station is obtained by the UE in the second area by means of measurement; and a sending module configured to send the instruction information to the UE, so that the UE performs service transmission according to the instruction information, where the first active set includes an extended DCH active set and/or an extended E-DCH active set, where the extended DCH active set supports the UE to send an uplink DCH service, a micro base station in the extended DCH active set receives the uplink DCH service sent by the UE, the extended E-DCH active set supports the UE to send an E-DCH service, and a micro base station in the extended E-DCH active set receives the E-DCH service sent by the UE; in the first active set, the UE may receive and calculate a LLR of a DCH service of a macro base station in the first active set, and input the LLR as a Viterbi decoder to perform Viterbi decoding; the second active set includes a DCH active set and/or an E-DCH active set; the third active set includes an extended DCH active set, where the extended DCH active set supports a macro base station in the third active set to send a downlink DCH service, and the UE receives the downlink DCH service sent by the macro base station in the third active set; and in the third active set, the UE may receive an E-HICH sent by a micro base station in the third active set; the UE transmits new data if the E-HICH indicates an ACK, or the UE retransmits data if the E-HICH indicates a NACK and a maximum quantity of retransmissions is not reached.

In a first possible implementation manner of the sixth aspect, the sending module is further configured to, before sending the instruction information, send active set update signaling to the UE, so that the UE, according to the active set update signaling, adds the micro base station to the first active set when performing service transmission in the first area, and/or adds the macro base station to the third active set when performing service transmission in the second area.

With reference to the first possible implementation manner of the sixth aspect, in a second possible implementation manner of the sixth aspect, the radio network controller further includes a first receiving module configured to: before the sending module sends the active set update signaling to the UE, receive a first measurement report sent by the UE, where the first measurement report is sent to the RNC when the UE is in a non-soft handover area and when the UE measures that the common pilot channel quality of the micro base station is greater than the preset first threshold value for addition to the first active set and less than the first condition threshold value for addition to the second active set; or the first measurement report is sent to the RNC when the UE is in a soft handover area corresponding to the second active set and when the UE measures that the common pilot channel quality of the micro base station is less than a third condition threshold value for removal of the micro base station from the second active set and greater than a preset second threshold value.

With reference to the second possible implementation manner of the sixth aspect, in a third possible implementation manner of the sixth aspect, the first receiving module is further configured to, after the sending module sends the instruction information to the UE, receive a second measurement report sent by the UE, where the second measurement report is sent by the UE to the RNC when the common pilot channel quality of the micro base station is greater than the first condition threshold value for addition to the second active set; and the sending module is further configured to send first control information to the UE, so that the UE adds the micro base station to the second active set according to an instruction of the first control information; or the first receiving module is further configured to, after the sending module sends the instruction information to the UE, receive a second measurement report sent by the UE, where the second measurement report is sent by the UE to the RNC when the common pilot channel quality of the micro base station is less than the second threshold value; and the sending module is further configured to send second control information to the UE, so that the UE removes the micro base station from the first active set according to the second control information.

With reference to the first possible implementation manner of the sixth aspect, in a fourth possible implementation manner of the sixth aspect, the radio network controller further includes a second receiving module configured to, before the sending module sends the active set update signaling to the UE, receive a third measurement report sent by the UE, where the third measurement report is sent by the UE to the RNC when the UE is in a non-soft handover area and when the UE measures that the common pilot channel quality of the macro base station is greater than the preset third threshold value and less than the second condition threshold value for addition to the second active set; or the third measurement report is sent by the UE to the RNC when the UE is in a soft handover area corresponding to the second active set and when the UE measures that the common pilot channel quality of the macro base station is less than a fourth condition threshold value for removal of the macro base station from the second active set and greater than a preset fourth threshold value.

With reference to the fourth possible implementation manner of the sixth aspect, in a fifth possible implementation manner of the sixth aspect, the second receiving module is further configured to, after the sending module sends the instruction information to the UE, receive a fourth measurement report sent by the UE, where the fourth measurement report is sent by the UE to the RNC when the common pilot channel quality of the macro base station is greater than the second condition threshold value for addition to the second active set; and the sending module is further configured to send third control information to the UE, so that the UE adds the macro base station to the second active set according to the third control information; or the second receiving module is further configured to, after the sending module sends the instruction information to the UE, receive a fourth measurement report sent by the UE, where the fourth measurement report is sent by the UE to the RNC when the common pilot channel quality of the macro base station is less than the fourth threshold value; and the sending module is further configured to send fourth control information to the UE, so that the UE removes the macro base station from the third active set according to the fourth control information.

According to a seventh aspect, an embodiment of the present disclosure provides a micro base station, including a receiving module configured to receive configuration information sent by a radio network controller RNC in an access network, where the configuration information is used to instruct the micro base station to receive an uplink DCH and/or uplink E-DCH service sent by a user equipment UE; and a processing module configured to receive, in a first active set according to the configuration information after the micro base station is added by the UE to the first active set when the UE performs service transmission in a first area, the uplink DCH and/or uplink E-DCH service sent by the UE, where the first area is an area in which common pilot channel quality of the micro base station is between common pilot channel quality of the micro base station that reaches a first threshold value for addition to the first active set and common pilot channel quality of the micro base station that reaches a first condition threshold value for addition to a second active set, and the common pilot channel quality of the micro base station is obtained by the UE in the first area by means of measurement, where the first active set includes an extended DCH active set and/or an extended E-DCH active set, where the extended DCH active set supports the UE to send an uplink DCH service, a micro base station in the extended DCH active set receives the uplink DCH service sent by the UE, the extended E-DCH active set supports the UE to send an E-DCH service, and a micro base station in the extended E-DCH active set receives the E-DCH service sent by the UE; and in the first active set, the UE may receive and calculate a LLR of a DCH service of a macro base station in the first active set, and input the LLR as a Viterbi decoder to perform Viterbi decoding.

In a first possible implementation manner of the seventh aspect, the micro base station further includes a sending module, where if a service received by the micro base station is a DCH service, the sending module is configured to send a TPC to the UE, where the TPC is used to adjust uplink transmit power of the UE; or if a service received by the micro base station is an E-DCH service, the sending module is configured to send a TPC, an E-RGCH, and an E-HICH to the UE, where the TPC is used to adjust uplink transmit power of the UE, the E-RGCH is used to adjust a scheduling grant value obtained by the UE, and the E-HICH is used to feed back to the UE whether the micro base station correctly receives data of the UE.

According to an eighth aspect, an embodiment of the present disclosure provides a macro base station, including a receiving module configured to receive configuration information sent by a RNC in an access network, where the configuration information is used to instruct the macro base station to send a downlink DCH service to a UE; and a sending module configured to send, in a third active set according to the configuration information after the macro base station is added by the UE to the third active set when the UE performs service transmission in a second area, the downlink DCH service to the UE, where the second area is an area in which common pilot channel quality of the macro base station is between common pilot channel quality of the macro base station that reaches a third threshold value for addition to the third active set and common pilot channel quality of the macro base station that reaches a second condition threshold value for addition to a second active set, and the common pilot channel quality of the macro base station is obtained by the UE in the second area by means of measurement, where the third active set includes an extended DCH active set, where the extended DCH active set supports a macro base station in the third active set to send a downlink DCH service, and the UE receives the downlink DCH service sent by the macro base station in the third active set; and in the third active set, the UE may receive an E-HICH sent by a micro base station in the third active set; the UE transmits a new E-DCH service if the E-HICH indicates an ACK, or the UE retransmits an E-DCH service if the E-HICH indicates a NACK and a maximum quantity of retransmissions is not reached.

In a first possible implementation manner of the eighth aspect, the receiving module is further configured to, after the sending module sends, in the third active set according to the configuration information, the downlink DCH service to the UE, receive an uplink TPC sent by the UE, where the TPC is used to control transmit power of the downlink DCH service.

According to a ninth aspect, an embodiment of the present disclosure provides an access network system, including the user equipment according to any one of the fifth aspect to the sixth possible implementation manner of the fifth aspect, the radio network controller according to any one of the sixth aspect to the fifth possible implementation manner of the sixth aspect, the micro base station according to the seventh aspect or the first possible implementation manner of the seventh aspect, and the macro base station according to the eighth aspect or the first possible implementation manner of the eighth aspect.

According to a tenth aspect, an embodiment of the present disclosure provides a network communications method, including receiving, by a UE, a first E-HICH sent by a first base station in an access network, where the first base station is located within a detection range of the UE and is not in an E-DCH active set of the UE; and sending, by the UE, new E-DCH data when the first E-HICH indicates an ACK.

In a first possible implementation manner of the tenth aspect, that the first base station is located within a detection range of the UE includes that downlink pilot quality that is of the first base station and measured by the UE is greater than a preset first threshold value.

With reference to the tenth aspect or the first possible implementation manner of the tenth aspect, in a second possible implementation manner of the tenth aspect, before the receiving, by a UE, a first E-HICH sent by a first base station, the method further includes receiving, by the UE, first instruction signaling sent by a RNC, where the first instruction signaling is used to instruct the UE to receive the first E-HICH sent by the first base station, and the first instruction signaling includes a channelization code and a signature sequence of the first E-HICH, where the channelization code is used to indicate a spreading code to be used by the UE to decode a channel occupied by the first E-HICH, and the signature sequence is used to indicate an orthogonal sequence to be used by the UE to decode each E-HICH subframe.

With reference to the second possible implementation manner of the tenth aspect, in a third possible implementation manner of the tenth aspect, the first instruction signaling further includes timing information of the first E-HICH, where the timing information of the first E-HICH is used to indicate a start time location for the UE to receive each subframe of the first E-HICH.

With reference to the third possible implementation manner of the tenth aspect, in a fourth possible implementation manner of the tenth aspect, the timing information of the first E-HICH is a timing offset $\tau_{F\text{-}DPCH}$ and/or a symbol location of a fractional downlink physical channel (F-DPCH) of the first base station.

With reference to the method according to any one of the second possible implementation manner of the tenth aspect to the fourth possible implementation manner of the tenth aspect, in a fifth possible implementation manner of the tenth aspect, the first instruction signaling further includes a code channel and a signature sequence of an E-RGCH, where the E-RGCH is used to control E-DCH transmit power of the UE; or a code channel and a signature sequence of an E-RGCH, and timing information of the E-RGCH, where the timing information of the E-RGCH is used to indicate a time when the UE receives the E-RGCH.

With reference to the fifth possible implementation manner of the tenth aspect, in a sixth possible implementation manner of the tenth aspect, the timing information of the E-RGCH is a timing offset $\tau_{F\text{-}DPCH,n}$ and/or a symbol location of a F-DPCH of the first base station.

With reference to the method according to any one of the second possible implementation manner of the tenth aspect to the sixth possible implementation manner of the tenth aspect, in a seventh possible implementation manner of the tenth aspect, before the receiving, by the UE, first instruction signaling sent by a RNC, the method further includes measuring, by the UE, common pilot channel quality of each serving cell; and sending, by the UE, a measurement report to the RNC when the UE measures that common pilot channel quality of the first base station is greater than a preset first threshold, so that the RNC sends the first instruction signaling to the UE according to the measurement report.

According to an eleventh aspect, an embodiment of the present disclosure provides a network communications method, including receiving, by a first base station in an access network, an E-DCH service sent by a UE, where the first base station is located within a detection range of the UE and is not in an E-DCH active set of the UE; sending, by the first base station, a first E-HICH to the UE; and receiving, by the first base station, new E-DCH data that is sent by the UE when the first E-HICH indicates an ACK.

In a first possible implementation manner of the eleventh aspect, that the first base station is located within a detection range of the UE includes that downlink pilot quality that is of the first base station and measured by the UE is greater than a preset first threshold value.

With reference to the eleventh aspect or the first possible implementation manner of the eleventh aspect, in a second possible implementation manner of the eleventh aspect, before the receiving, by a first base station in an access network, an E-DCH service sent by a UE, the method further includes receiving, by the first base station, second instruction signaling sent by a RNC, where the second instruction signaling is used to instruct the first base station to receive the E-DCH service sent by the UE, and the second instruction signaling includes an uplink scrambling code of the UE and a channelization code and a signature sequence of the first E-HICH, where the channelization code is used to indicate a spreading code to be used by the UE to decode a channel occupied by the first E-HICH, and the signature sequence is used to indicate an orthogonal sequence to be used by the UE to decode each E-HICH subframe.

With reference to the second possible implementation manner of the eleventh aspect, in a third possible implementation manner of the eleventh aspect, the second instruction signaling further includes timing information of the first E-HICH, where the timing information of the first E-HICH is used to indicate a start time location for sending each subframe of the first E-HICH.

With reference to the third possible implementation manner of the eleventh aspect, in a fourth possible implementation manner of the eleventh aspect, the timing information of the first E-HICH is a timing offset $\tau_{F\text{-}DPCH,n}$ and/or a symbol location of a F-DPCH of the first base station.

With reference to the method according to any one of the second possible implementation manner of the eleventh aspect to the fourth possible implementation manner of the eleventh aspect, in a fifth possible implementation manner of the eleventh aspect, the second instruction signaling further includes a code channel and a signature sequence of an E-RGCH, where the E-RGCH is used to control E-DCH transmit power of the UE; or a code channel and a signature sequence of an E-RGCH, and timing information of the E-RGCH, where the timing information of the E-RGCH is used to indicate a time when the UE receives the E-RGCH.

With reference to the fifth possible implementation manner of the eleventh aspect, in a sixth possible implementation manner of the eleventh aspect, the timing information of the E-RGCH is a timing offset $\tau_{F\text{-}DPCH,n}$ and/or a symbol location of a F-DPCH of the first base station.

With reference to the method according to any one of the second possible implementation manner of the eleventh aspect to the sixth possible implementation manner of the eleventh aspect, in a seventh possible implementation manner of the eleventh aspect, before the receiving, by the first base station, second instruction signaling sent by the RNC, the method further includes sending, by the first base station, a receiving capability message to the RNC, where the receiving capability message is used to indicate that the first base station can receive an E-DCH service sent by the UE.

According to a twelfth aspect, an embodiment of the present disclosure provides a network communications method, including generating, by a RNC in an access network, first instruction signaling and second instruction signaling, where the first instruction signaling is used to instruct a UE to receive a first E-HICH sent by a first base station, the second instruction signaling is used to instruct the first base station to receive an E-DCH service sent by the UE, and the first base station is located within a detection range of the UE and is not in an enhanced E-DCH active set of the UE; sending, by the RNC, the second instruction signaling to the first base station, where the second instruction signaling includes an uplink scrambling code of the UE and a channelization code and a signature sequence of the first E-HICH, where the channelization code is used to indicate a spreading code to be used by the UE to decode a channel occupied by the first E-HICH, and the signature sequence is used to indicate an orthogonal sequence to be used by the UE to decode each E-HICH subframe; and sending, by the RNC, the first instruction signaling to the UE, where the first instruction signaling includes the channelization code and the signature sequence of the first E-HICH.

In a first possible implementation manner of the twelfth aspect, that the first base station is located within a detection range of the UE includes that downlink pilot quality that is of the first base station and measured by the UE is greater than a preset first threshold value.

With reference to the twelfth aspect or the first possible implementation manner of the twelfth aspect, in a second possible implementation manner of the twelfth aspect, the first instruction signaling further includes timing information of the first E-HICH, where the timing information of the first E-HICH is used to indicate a start time location for the UE to receive each subframe of the first E-HICH; and the second instruction signaling further includes the timing information of the first E-HICH, where the timing information of the first E-HICH is used to indicate a start time location for sending each subframe of the first E-HICH.

With reference to the second possible implementation manner of the twelfth aspect, in a third possible implementation manner of the twelfth aspect, the timing information of the first E-HICH is a timing offset $\tau_{F\text{-}DPCH,n}$ and/or a symbol location of a F-DPCH of the first base station.

With reference to the twelfth aspect, the first possible implementation manner of the twelfth aspect, the second possible implementation manner of the twelfth aspect, or the third possible implementation manner of the twelfth aspect, in a fourth possible implementation manner of the twelfth aspect, the first instruction signaling and the second instruction signaling further include a code channel and a signature sequence of an E-RGCH, where the E-RGCH is used to control E-DCH transmit power of the UE; or a code channel and a signature sequence of an E-RGCH, and timing information of the E-RGCH, where the timing information of the E-RGCH is used to indicate a time when the UE receives the E-RGCH.

With reference to the fourth possible implementation manner of the twelfth aspect, in a fifth possible implementation manner of the twelfth aspect, the timing information of the E-RGCH is a timing offset $\tau_{F\text{-}DPCH,n}$ and/or a symbol location of a F-DPCH of the first base station.

With reference to any one of the twelfth aspect to the fifth possible implementation manner of the twelfth aspect, in a sixth possible implementation manner of the twelfth aspect, before the generating, by an RNC, first instruction signaling and second instruction signaling, the method further includes receiving, by the RNC, a measurement report sent by the UE, where the measurement report is sent UE when the UE measures that common pilot channel quality of the first base station is greater than a preset first threshold.

With reference to any one of the twelfth aspect to the sixth possible implementation manner of the twelfth aspect, in a sixth possible implementation manner of the twelfth aspect, before the sending, by the RNC, the second instruction signaling to the first base station, the method further includes receiving, by the RNC, a receiving capability message sent by the first base station, where the receiving capability message is used to indicate that the first base station can receive an E-DCH service sent by the UE.

According to a thirteenth aspect, an embodiment of the present disclosure provides a user equipment, including a receiving module configured to receive a first E-HICH sent by a first base station in an access network, where the first base station is located within a detection range of the UE and is not in an E-DCH active set of the UE; and a sending module configured to send new E-DCH data when the first E-HICH indicates an ACK.

In a first possible implementation manner of the thirteenth aspect, that the first base station is located within a detection range of the UE includes that downlink pilot quality that is of the first base station and measured by the UE is greater than a preset first threshold value.

With reference to the thirteenth aspect or the first possible implementation manner of the thirteenth aspect, in a second possible implementation manner of the thirteenth aspect, the receiving module is further configured to, before receiving the first E-HICH sent by the first base station, receive first instruction signaling sent by a RNC, where the first instruction signaling is used to instruct the UE to receive the first E-HICH sent by the first base station, and the first instruction signaling includes a channelization code and a signature sequence of the first E-HICH, where the channelization code is used to indicate a spreading code to be used by the UE to decode a channel occupied by the first E-HICH, and the signature sequence is used to indicate an orthogonal sequence to be used by the UE to decode each E-HICH subframe.

With reference to the second possible implementation manner of the thirteenth aspect, in a third possible implementation manner of the thirteenth aspect, the first instruction signaling further includes timing information of the first E-HICH, where the timing information of the first E-HICH is used to indicate a start time location for the UE to receive each subframe of the first E-HICH.

With reference to the third possible implementation manner of the thirteenth aspect, in a fourth possible implementation manner of the thirteenth aspect, the timing information of the first E-HICH is a timing offset $\tau_{F\text{-}DPCH,n}$ and/or a symbol location of a F-DPCH of the first base station.

With reference to the user equipment according to any one of the second possible implementation manner of the thirteenth aspect to the fourth possible implementation manner of the thirteenth aspect, in a fifth possible implementation manner of the thirteenth aspect, the first instruction signaling further includes a code channel and a signature sequence of an E-RGCH, where the E-RGCH is used to control E-DCH transmit power of the UE; or a code channel and a signature sequence of an E-RGCH, and timing information of the E-RGCH, where the timing information of the E-RGCH is used to indicate a time when the UE receives the E-RGCH.

With reference to the fifth possible implementation manner of the thirteenth aspect, in a sixth possible implementation manner of the thirteenth aspect, the timing information of the E-RGCH is a timing offset $\tau_{F\text{-}DPCH,n}$ and/or a symbol location of a F-DPCH of the first base station.

With reference to the user equipment according to any one of the second possible implementation manner of the thirteenth aspect to the sixth possible implementation manner of the thirteenth aspect, in a seventh possible implementation manner of the thirteenth aspect, the user equipment further includes a processing module configured to measure common pilot channel quality of each serving cell before the receiving module receives the first instruction signaling sent by the RNC, where: the sending module is further configured to send, by the UE, a measurement report to the RNC when the processing module measures that common pilot channel quality of the first base station is greater than a preset first threshold, so that the RNC sends the first instruction signaling to the UE according to the measurement report.

According to a fourteenth aspect, an embodiment of the present disclosure provides a base station, including a receiving module configured to receive an E-DCH service sent by a UE, where the base station is located within a detection range of the UE and is not in an E-DCH active set of the UE; and a sending module configured to send a first E-HICH to the UE, where the receiving module is further configured to receive new E-DCH data that is sent by the UE when the first E-HICH indicates an ACK.

In a first possible implementation manner of the fourteenth aspect, that the base station is located within a detection range of the UE includes that downlink pilot quality that is of the base station and measured by the UE is greater than a preset first threshold value. With reference to the fourteenth aspect or the first possible implementation manner of the fourteenth aspect, in a second possible implementation manner of the fourteenth aspect, the receiving module is further configured to, before receiving the E-DCH service sent by the UE, receive second instruction signaling sent by a RNC, where the second instruction signaling is used to instruct the first base station to receive the E-DCH service sent by the UE, and the second instruction signaling includes an uplink scrambling code of the UE and a channelization code and a signature sequence of the first E-HICH, where the channelization code is used to indicate a spreading code to be used by the UE to decode a channel occupied by the first E-HICH, and the signature sequence is used to indicate an orthogonal sequence to be used by the UE to decode each E-HICH subframe.

With reference to the second possible implementation manner of the fourteenth aspect, in a third possible implementation manner of the fourteenth aspect, the second instruction signaling further includes timing information of the first E-HICH, where the timing information of the first E-HICH is used to indicate a start time location for sending each subframe of the first E-HICH.

With reference to the third possible implementation manner of the fourteenth aspect, in a fourth possible implementation manner of the fourteenth aspect, the timing information of the first E-HICH is a timing offset $\tau_{F\text{-}DPCH,n}$ and/or a symbol location of a F-DPCH of the first base station.

With reference to the base station according to any one of the second possible implementation manner of the fourteenth aspect to the fourth possible implementation manner of the fourteenth aspect, in a fifth possible implementation manner of the fourteenth aspect, the second instruction signaling further includes a code channel and a signature sequence of an E-RGCH, where the E-RGCH is used to control E-DCH transmit power of the UE; or a code channel and a signature sequence of an E-RGCH, and timing information of the E-RGCH, where the timing information of the E-RGCH is used to indicate a time when the UE receives the E-RGCH.

With reference to the fifth possible implementation manner of the fourteenth aspect, in a sixth possible implementation manner of the fourteenth aspect, the timing information of the E-RGCH is a timing offset $\tau_{F\text{-}DPCH,n}$ and/or a symbol location of a F-DPCH of the first base station.

With reference to the base station according to any one of the second possible implementation manner of the fourteenth aspect to the sixth possible implementation manner of the fourteenth aspect, in a seventh possible implementation manner of the fourteenth aspect, the sending module is further configured to send a receiving capability message to the RNC before the receiving module receives the second instruction signaling sent by the RNC, where the receiving capability message is used to indicate that the first base station can receive an E-DCH service sent by the UE.

According to a fifteenth aspect, an embodiment of the present disclosure provides an RNC, including a processing module configured to generate first instruction signaling and second instruction signaling, where the first instruction signaling is used to instruct a UE to receive a first E-HICH sent by a first base station, the second instruction signaling is used to instruct the first base station to receive an E-DCH service sent by the UE, and the first base station is located within a detection range of the UE and is not in an E-DCH active set of the UE; and a sending module configured to send the second instruction signaling to the first base station, where the second instruction signaling includes an uplink scrambling code of the UE and a channelization code and a signature sequence of the first E-HICH, where the channelization code is used to indicate a spreading code to be used by the UE to decode a channel occupied by the first E-HICH, and the signature sequence is used to indicate an orthogonal sequence to be used by the UE to decode each E-HICH subframe, where the sending module is further configured to send the first instruction signaling to the UE, where the first instruction signaling includes the channelization code and the signature sequence of the first E-HICH.

In a first possible implementation manner of the fifteenth aspect, that the first base station is located within a detection range of the UE includes that downlink pilot quality that is of the first base station and measured by the UE is greater than a preset first threshold value.

With reference to the fifteenth aspect or the first possible implementation manner of the fifteenth aspect, in a second possible implementation manner of the fifteenth aspect, the first instruction signaling further includes timing information of the first E-HICH, where the timing information of the first E-HICH is used to indicate a start time location for the UE to receive each subframe of the first E-HICH; and the second instruction signaling further includes the timing information of the first E-HICH, where the timing information of the first E-HICH is used to indicate a start time location for sending each subframe of the first E-HICH.

With reference to the second possible implementation manner of the fifteenth aspect, in a third possible implementation manner of the fifteenth aspect, the timing information of the first E-HICH is a timing offset $\tau_{F\text{-}DPCH,n}$ and/or a symbol location of a F-DPCH of the first base station.

With reference to the RNC according to any one of the fifteenth aspect to the third possible implementation manner of the fifteenth aspect, in a fourth possible implementation manner of the fifteenth aspect, the first instruction signaling and the second instruction signaling further include a code channel and a signature sequence of an E-RGCH, where the E-RGCH is used to control E-DCH transmit power of the UE; or a code channel and a signature sequence of an E-RGCH, and timing information of the E-RGCH, where the timing information of the E-RGCH is used to indicate a time when the UE receives the E-RGCH.

With reference to the fourth possible implementation manner of the fifteenth aspect, in a fifth possible implementation manner of the fifteenth aspect, the timing information of the E-RGCH is a timing offset $\tau_{F\text{-}DPCH,n}$ and/or a symbol location of a F-DPCH of the first base station.

With reference to the RNC according to any one of the fifteenth aspect to the fifth possible implementation manner of the fifteenth aspect, in a sixth possible implementation manner of the fifteenth aspect, the RNC further includes a receiving module configured to, before the processing module generates the first instruction signaling and the second instruction signaling, receive a measurement report sent by the UE, where the measurement report is sent when the UE measures that common pilot channel quality of the first base station is greater than a preset first threshold.

With reference to the RNC according to any one of the fifteenth aspect to the sixth possible implementation manner of the fifteenth aspect, in a seventh possible implementation manner of the fifteenth aspect, the receiving module is further configured to, before the sending module sends the second instruction signaling to the first base station, receive a receiving capability message sent by the first base station, where the receiving capability message is used to indicate that the first base station can receive an E-DCH service sent by the UE.

According to the network communications method, apparatus, and system according to the embodiments of the present disclosure, a UE receives instruction information sent by an RNC; and the UE, according to the instruction information, performs uplink and downlink service transmission with a macro base station and performs uplink service transmission with a micro base station in a first area, and/or performs uplink service transmission with a micro base station and performs downlink service transmission with a macro base station in a second area. This may minimize uplink interference that is caused by the UE to the micro base station in the first area and minimize downlink interference that is caused by the macro base station to the micro base station in the second area; and further, uplink coverage of the micro base station and downlink coverage of the macro base station may be fully utilized, which improves a throughput rate and reliability of transmission at an edge area of a HetNet.

An embodiment of the present disclosure further provides a network communications method, including receiving, by a UE in an access network, first radio network control (RRC) signaling of a RNC, and adding, by the UE according to an instruction of the first RRC signaling, a first base station to an extended E-DCH active set of the UE; and receiving, by the UE, an E-HICH of the first base station, and sending, by the UE, new E-DCH data when the E-HICH indicates an ACK; when the UE receives no DCH data from the access network, disabling, by the UE according to an instruction of the first RRC signaling, a function of receiving a F-DPCH of the first base station, where the RNC completes the instruction by removing configuration information of the F-DPCH from the first RRC signaling or by using a preset indication field in the first RRC signaling; and when the UE receives DCH data from the access network, disabling, by the UE according to the instruction of the first RRC signaling, a function of receiving a downlink dedicated physical data channel (DPDCH) of the first base station, where the RNC completes the instruction by removing configuration information of a DPCH from the first RRC signaling or by using a preset indication field in the first RRC signaling.

In an implementation manner, when the UE receives DCH data from the access network, the method further includes receiving, by the UE, an F-DPCH of the first base station according to the instruction of the first RRC signaling, where the F-DPCH is used to perform transmit power control on the UE.

In another implementation manner, when the UE receives DCH data from the access network, the method further includes disabling, by the UE, a function of receiving a downlink DPCCH sent by the first base station.

In another implementation manner, after the adding, by the UE, a first base station to an E-DCH active set of the UE, the method further includes receiving, by the UE, first control signaling sent by a network; and receiving an F-DPCH of the first base station according to an instruction of the first control signaling; or receiving a downlink DPDCH sent by the first base station, where the downlink DPDCH is used to carry DCH data received by the UE from the first base station.

In another implementation manner, the receiving, by the UE, a downlink DPDCH sent by the first base station further includes receiving, by the UE, a downlink DPCCH of the first base station, where the downlink DPCCH is used by the first base station to send physical layer control signaling to the UE.

In another implementation manner, the first control signaling sent by the network includes second RRC signaling sent by the RNC; or first physical layer signaling sent by a second base station in the access network, where the second base station is in the E-DCH active set or a DCH active set of the UE.

In another implementation manner, before the receiving, by the UE, first control signaling sent by a network, the method further includes measuring, by the UE, common pilot channel quality of each cell; and sending, by the UE, a measurement report to the RNC when the UE measures that common pilot channel quality of the first base station is greater than a preset first threshold, so that the RNC sends the second RRC signaling to the UE according to the measurement report, or so that the RNC instructs the second base station to send the first physical layer signaling to the UE.

In another implementation manner, before the receiving, by the UE, an F-DPCH of the first base station, the method further includes receiving, by the UE, configuration information of the F-DPCH of the first base station, where the configuration information includes at least one of a channelization code, a frame offset, and a timeslot format of the F-DPCH.

In another implementation manner, where the configuration information of the F-DPCH of the first base station is carried in the first control signaling.

In another implementation manner, before the receiving, by the UE, a downlink DPDCH of the first base station, the method further includes receiving, by the UE, configuration information of the downlink DPCH of the first base station, where the configuration information of the downlink DPCH includes information about a channelization code or a frame offset of the DPCH.

In another implementation manner, the configuration information of the downlink DPCH is carried in the first control signaling.

An embodiment of the present disclosure further provides a network communications method, including generating, by an RNC in an access network, first RRC signaling or first network signaling, and sending, by the RNC, the first RRC signaling to a UE or the first network signaling to a first base station in the access network, where the first RRC signaling is used to instruct the UE to add the first base station to an E-DCH active set of the UE, and instruct the UE to receive an E-HICH of the first base station, and the first network signaling is used to instruct the first base station to receive E-DCH data sent by the UE, and instruct the first base station to send the E-HICH to the UE, where, when the UE receives no DCH data from the access network, the first RRC signaling instructs the UE to disable a function of receiving an F-DPCH of the first base station, where the RNC completes the instruction by removing configuration information of the F-DPCH from the first RRC signaling or by setting a preset indication field in the first RRC signaling; or the first network signaling instructs the first base station to disable a function of sending an F-DPCH, where the RNC completes the instruction by removing configuration information of the F-DPCH from the first network signaling or by setting a preset indication field in the first network signaling; and when the UE receives DCH data from the access network, the first RRC signaling instructs the UE to disable a function of receiving a downlink DPDCH of the first base station, where the RNC completes the instruction by removing configuration information of a DPCH from the first RRC signaling or by using a preset indication field in the first RRC signaling; or the first network signaling instructs the first base station to disable a function of sending a downlink DPDCH, where the RNC completes the instruction by removing configuration information of a DPCH from the first network signaling or by setting a preset indication field in the first network signaling.

In an implementation manner, when the UE receives DCH data from the access network, that the RNC completes the instruction by removing the configuration information of a DPCH from the first RRC signaling further includes that the first RRC signaling instructs the UE to receive an F-DPCH of the first base station, where the F-DPCH is used to perform uplink transmit power control on the UE; and the first network signaling instructs the first base station to send the F-DPCH to the UE.

In another implementation manner, that the first RRC signaling instructs the UE to disable a function of receiving a downlink DPDCH of the first base station further includes that the first network signaling instructs the first base station to disable a function of sending a DPCCH to the UE; or the first RRC signaling further instructs the UE to disable a function of receiving a downlink DPCCH of the first base station.

In another implementation manner, after the sending, by the RNC, the first RRC signaling to the UE and the first network signaling to the first base station, the method further includes generating, by the RNC, second RRC signaling, and sending, by the RNC, the second RRC signaling to the UE, where, when the UE receives no DCH data from the access network, the second RRC signaling is used to instruct the UE to receive an F-DPCH sent by the first base station; and when the UE receives DCH data from the access network, the second RRC signaling is used to instruct the UE to receive a downlink DPDCH sent by the first base station.

In another implementation manner, when the UE receives DCH data from the access network, that the second RRC signaling is used to instruct the UE to receive a downlink DPDCH sent by the first base station further includes that the second RRC signaling instructs the UE to receive a downlink DPCCH sent by the first base station.

In another implementation manner, the method further includes that, when the UE receives no DCH data from the access network, the second RRC signaling includes configuration information of the F-DPCH; and when the UE receives DCH data from the access network, the second RRC signaling includes configuration information of the downlink DPCH of the first base station.

In another implementation manner, the method further includes that generating, by the RCN, second network signaling, and sending, by the RNC, the second network signaling to the first base station, where, when the UE receives no DCH data from the access network, the second network signaling is used to instruct the first base station to send the F-DPCH to the UE; and when the UE receives DCH data from the access network, the second network signaling is used to instruct the first base station to send the DPDCH to the UE.

In another implementation manner, when the UE receives DCH data from the access network, that the second network signaling is used to instruct the first base station to send the DPDCH to the UE further includes that the second network signaling instructs the first base station to send a downlink DPCCH to the UE.

In another implementation manner, the method further includes that, when the UE receives no DCH data from the access network, the second network signaling includes configuration information of the F-DPCH; and when the UE receives DCH data from the access network, the second network signaling includes configuration information of the downlink DPCH of the first base station.

In another implementation manner, before the RNC generates the second RRC signaling, the method further includes receiving, by the RNC, a measurement report sent by the UE, where the measurement report is used to instruct the RNC to send the second RRC signaling to the UE.

An embodiment of the present disclosure further provides a network communications method, including receiving, by a first base station in an access network, first network signaling sent by a RNC, and according to an instruction of the first network signaling, receiving E-DCH data sent by a UE in the access network and sending an E-HICH to the UE; when the UE receives no DCH data from the access network, disabling, by the first base station according to the instruction of the first network signaling, a function of sending an F-DPCH to the UE; and when the UE receives DCH data from the access network, disabling, by the first base station according to the instruction of the first network signaling, a function of sending a downlink DPDCH to the UE.

In an implementation manner, the RNC completes the instruction by removing configuration information of the F-DPCH from the first network signaling or by setting a preset indication field in the first network signaling.

In another implementation manner, when the UE receives DCH data from the access network, the disabling, by the first base station, a function of sending a downlink DPDCH to the UE further includes sending, by the first base station, an F-DPCH to the UE, where the F-DPCH is used by the first base station to perform uplink transmit power control on the UE.

In another implementation manner, when the UE receives DCH data from the access network, the disabling, by the first base station, a function of sending a downlink DPDCH to the UE further includes disabling, by the first base station, a function of sending a downlink DPCCH to the UE.

In another implementation manner, after the receiving, by the first base station, the first RRC signaling, the method further includes receiving, by the first base station, second RRC signaling sent by the RNC; when the UE receives no DCH data from the access network, sending, by the first base station, an F-DPCH to the UE according to an instruction of the second RRC signaling; and when the UE receives DCH data from the access network, sending, by the first base station, a downlink DPDCH to the UE according to the instruction of the second RRC signaling.

In another implementation manner, the method further includes that: when the UE receives no DCH data from the access network, the first network signaling received by the first base station includes configuration information of the F-DPCH; and when the UE receives DCH data from the access network, the first network signaling received by the first base station includes configuration information of the downlink DPCH.

In another implementation manner, when the UE receives DCH data from the access network, the sending, by the first base station, a downlink DPDCH to the UE further includes sending, by the first base station, a downlink DPCCH to the UE.

An embodiment of the present disclosure further provides a UE in an access network, including a radio transceiver unit configured to receive first RRC signaling of a RNC, and add a first base station to an extended E-DCH active set of the UE according to an instruction of the first RRC signaling; and receive an E-HICH of the first base station, and send new E-DCH data when the E-HICH indicates an ACK; and a processing unit configured to, when the UE receives no DCH data from the access network, disable, according to the instruction of the first RRC signaling, a function of receiving a F-DPCH of the first base station, where the RNC completes the instruction by removing configuration information of the F-DPCH from the first RRC signaling or by using a preset indication field in the first RRC signaling; and when the UE receives DCH data from the access network, disable, according to the instruction of the first RRC signaling, a function of receiving a downlink DPDCH of the first base station, where the RNC completes the instruction by removing configuration information of a DPCH from the first RRC signaling or by using a preset indication field in the first RRC signaling.

In an implementation manner, when the UE receives DCH data from the access network, the radio transceiver unit is further configured to receive an F-DPCH of the first base station according to the instruction of the first RRC signaling, where the F-DPCH is used to perform transmit power control on the UE.

In another implementation manner, when the UE receives DCH data from the access network, the processing unit is further configured to disable a function of receiving a downlink DPCCH sent by the first base station.

In another implementation manner, after adding the first base station to the E-DCH active set of the UE, the radio transceiver unit is further configured to receive first control signaling sent by a network; and receive an F-DPCH of the first base station according to an instruction of the first control signaling; or receive a downlink DPDCH sent by the first base station, where the downlink DPDCH is used to carry DCH data received by the UE from the first base station.

In another implementation manner, the radio transceiver unit is further configured to receive a downlink DPCCH of the first base station, where the downlink DPCCH is used by the first base station to send physical layer control signaling to the UE.

In another implementation manner, the first control signaling sent by the network includes second RRC signaling sent by the RNC; or first physical layer signaling sent by a second base station in the access network, where the second base station is in the E-DCH active set or a DCH active set of the UE.

In another implementation manner, before receiving the first control signaling sent by the network, the radio transceiver unit is further configured to measure common pilot channel quality of each cell; and send a measurement report to the RNC when measuring that common pilot channel quality of the first base station is greater than a preset first threshold, so that the RNC sends the second RRC signaling to the UE according to the measurement report, or so that the RNC instructs the second base station to send the first physical layer signaling to the UE.

In another implementation manner, before receiving the F-DPCH of the first base station, the radio transceiver unit is further configured to receive configuration information of the F-DPCH of the first base station, where the configuration information includes at least one of a channelization code, a frame offset, and a timeslot format of the F-DPCH.

In another implementation manner, the configuration information of the F-DPCH of the first base station is carried in the first control signaling.

In another implementation manner, before receiving the downlink DPDCH of the first base station, the radio transceiver unit is further configured to receive configuration information of the downlink DPCH of the first base station, where the configuration information of the downlink DPCH includes information about a channelization code or a frame offset of the DPCH.

In another implementation manner, the configuration information of the downlink DPCH is carried in the first control signaling.

An embodiment of the present disclosure further provides an RNC in an access network, including a processing unit configured to generate first RRC signaling or first network signaling; and a radio transceiver unit configured to send the first RRC signaling to a UE or send the first network signaling to a first base station in the access network, where the first RRC signaling is used to instruct the UE to add the first base station to an E-DCH active set of the UE, and instruct the UE to receive an E-HICH of the first base station, and the first network signaling is used to instruct the first base station to receive E-DCH data sent by the UE, and instruct the first base station to send the E-HICH to the UE, where, when the UE receives no DCH data from the access network, the first RRC signaling instructs the UE to disable a function of receiving an F-DPCH of the first base station, where the processing unit completes the instruction by removing configuration information of the F-DPCH from the first RRC signaling or by setting a preset indication field in the first RRC signaling; or the first network signaling instructs the first base station to disable a function of sending an F-DPCH, where the processing unit completes the instruction by removing configuration information of the F-DPCH from the first network signaling or by setting a preset indication field in the first network signaling; and when the UE receives DCH data from the access network, the first RRC signaling instructs the UE to disable a function of receiving a downlink DPDCH of the first base station, where the processing unit completes the instruction by removing configuration information of a DPCH from the first RRC signaling or by using a preset indication field in the first RRC signaling; or the first network signaling instructs the first base station to disable a function of sending a downlink DPDCH, where the processing unit completes the instruction by removing configuration information of a DPCH from the first network signaling or by setting a preset indication field in the first network signaling.

In an implementation manner, when the UE receives DCH data from the access network, the first RRC signaling instructs the UE to receive an F-DPCH of the first base station, where the F-DPCH is used to perform uplink transmit power control on the UE; and the first network signaling instructs the first base station to send the F-DPCH to the UE.

In another implementation manner, the first network signaling instructs the first base station to disable a function of sending a DPCCH to the UE; or the first RRC signaling further instructs the UE to disable a function of receiving a downlink DPCCH of the first base station.

In another implementation manner, after the radio transceiver unit sends the first RRC signaling to the UE and sends the first network signaling to the first base station, the processing unit is further configured to generate second RRC signaling, and the radio transceiver unit is further configured to send the second RRC signaling to the UE, where, when the UE receives no DCH data from the access network, the second RRC signaling is used to instruct the UE to receive an F-DPCH sent by the first base station; and when the UE receives DCH data from the access network, the second RRC signaling is used to instruct the UE to receive a downlink DPDCH sent by the first base station.

In another implementation manner, when the UE receives DCH data from the access network, the second RRC signaling further instructs the UE to receive a downlink DPCCH sent by the first base station.

In another implementation manner, when the UE receives no DCH data from the access network, the second RRC signaling includes configuration information of the F-DPCH; and when the UE receives DCH data from the access network, the second RRC signaling includes configuration information of the downlink DPCH of the first base station.

In another implementation manner, the processing unit is further configured to generate second network signaling, and the radio transceiver unit is further configured to send the second network signaling to the first base station, where, when the UE receives no DCH data from the access network, the second network signaling is used to instruct the first base station to send the F-DPCH to the UE; and when the UE receives DCH data from the access network, the second network signaling is used to instruct the first base station to send the DPDCH to the UE.

In another implementation manner, when the UE receives DCH data from the access network, the second network signaling further instructs the first base station to send a downlink DPCCH to the UE.

In another implementation manner, when the UE receives no DCH data from the access network, the second network signaling includes configuration information of the F-DPCH; and when the UE receives DCH data from the access network, the second network signaling includes configuration information of the downlink DPCH of the first base station.

In another implementation manner, before the processing unit generates the second RRC signaling, the radio transceiver unit is further configured to receive a measurement report sent by the UE, where the measurement report is used to instruct the RNC to send the second RRC signaling to the UE.

An embodiment of the present disclosure further provides a first base station in an access network, including a radio transceiver unit configured to receive first network signaling sent by a RNC, and according to an instruction of the first network signaling, receive E-DCH data sent by a UE in the access network and send an E-HICH to the UE; and a processing unit configured to, when the UE receives no DCH data from the access network, disable, according to the instruction of the first network signaling, a function of sending an F-DPCH to the UE; and when the UE receives DCH data from the access network, disable, according to the instruction of the first network signaling, a function of sending a downlink DPDCH to the UE.

In an implementation manner, the RNC completes the instruction by removing configuration information of the F-DPCH from the first network signaling or by setting a preset indication field in the first network signaling.

In another implementation manner, when the UE receives DCH data from the access network, the radio transceiver unit is further configured to send an F-DPCH to the UE, where the F-DPCH is used by the first base station to perform uplink transmit power control on the UE.

In another implementation manner, when the UE receives DCH data from the access network, the radio transceiver unit is further configured to disable a function of sending a downlink DPCCH to the UE.

In another implementation manner, the radio transceiver unit is further configured to: after receiving the first RRC signaling, receive second RRC signaling sent by the RNC; and the processing unit is further configured to, when the UE receives no DCH data from the access network, send an F-DPCH to the UE according to an instruction of the second RRC signaling; and when the UE receives DCH data from the access network, send a downlink DPDCH to the UE according to the instruction of the second RRC signaling.

In another implementation manner, the radio transceiver unit is further configured to, when the UE receives no DCH data from the access network, the received first network signaling includes configuration information of the F-DPCH; and when the UE receives DCH data from the access network, the received first network signaling includes configuration information of the downlink DPCH.

In another implementation manner, when the UE receives DCH data from the access network, the radio transceiver unit is further configured to send a downlink DPCCH to the UE.

According to the embodiments, an explicit or implicit manner is used so that a UE receives no an F-DPCH, a DPCCH, or a DPDCH when necessary. For example, when downlink quality from one base station to the UE deteriorates, some receiving functions of the UE may be flexibly disabled or a corresponding sending function for the UE may be disabled, so as to reduce impact of the deteriorated link quality on network communication.

BRIEF DESCRIPTION OF DRAWINGS

To describe the technical solutions in the embodiments of the present disclosure or in the prior art more clearly, the following briefly introduces the accompanying drawings required for describing the embodiments or the prior art. The accompanying drawings in the following description show some embodiments of the present disclosure, and a person of ordinary skill in the art may still derive other drawings from these accompanying drawings without creative efforts.

DESCRIPTION OF EMBODIMENTS

To make the objectives, technical solutions, and advantages of the embodiments of the present disclosure clearer, the following clearly describes the technical solutions in the embodiments of the present disclosure with reference to the accompanying drawings in the embodiments of the present disclosure. The described embodiments are a part rather than all of the embodiments of the present disclosure. All other embodiments obtained by a person of ordinary skill in the art based on the embodiments of the present disclosure without creative efforts shall fall within the protection scope of the present disclosure.

Figure 2:
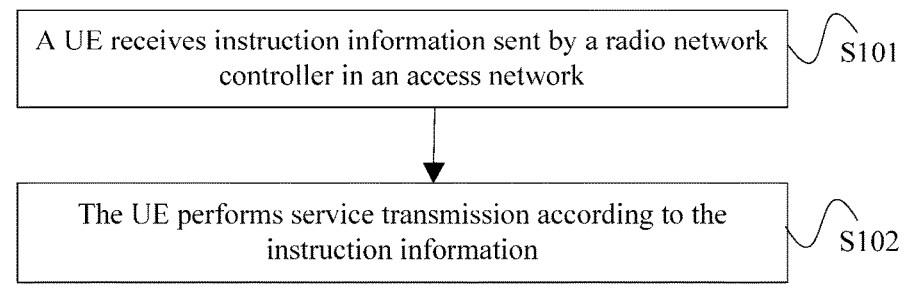
FIG. 2 is a flowchart of a network communications method according to Embodiment 1 of the present disclosure.

FIG. 2 is a flowchart of Embodiment 1 of a network communications method according to the present disclosure. This embodiment is described by using an example in which a UE is an execution body. As shown in FIG. 2, the method according to this embodiment may include the following.

S101. The UE receives instruction information sent by a radio network controller (RNC) in an access network, where the instruction information is used to instruct the UE to, in a first area, perform uplink and downlink service transmission with a macro base station of the access network and perform uplink service transmission with a micro base station of the access network, where the first area is an area in which common pilot channel quality of the micro base station is between common pilot channel quality of the micro base station that reaches a first threshold value for addition to a first active set and common pilot channel quality of the micro base station that reaches a first condition threshold value for addition to a second active set, and the common pilot channel quality of the micro base station is obtained by the UE in the first area by means of measurement; and/or in a second area, perform uplink and downlink service transmission with a micro base station and perform downlink service transmission with a macro base station, where the second area is an area in which common pilot channel quality of the macro base station is between common pilot channel quality of the macro base station that reaches a third threshold value for addition to a third active set and common pilot channel quality of the macro base station that reaches a second condition threshold value for addition to a second active set, and the common pilot channel quality of the macro base station is obtained by the UE in the second area by means of measurement.

The first condition threshold value is a threshold for addition of the micro base station to the second active set, and the second condition threshold value is a threshold for addition of the macro base station to the second active set.

S102. The UE performs service transmission according to the instruction information.

In a HetNet, the first active set includes an extended dedicated channel (DCH) active set and/or an extended enhanced dedicated channel (E-DCH) active set, where the extended DCH active set supports the UE to send an uplink DCH service, a micro base station in the extended DCH active set receives the uplink DCH service sent by the UE, the extended E-DCH active set supports the UE to send an E-DCH service, and a micro base station in the extended E-DCH active set receives the E-DCH service sent by the UE. In the first active set, the UE may receive and calculate a log-likelihood ratio (LLR) of a DCH service of a macro base station in the first active set, and input the LLR as a Viterbi decoder to perform Viterbi decoding.

The second active set includes a DCH active set and/or an E-DCH active set. In the second active set, both the macro base station and the micro base station may send a downlink DCH service to the UE and receive an uplink DCH service and/or E-DCH service sent by the UE, and the UE may receive downlink DCH services sent by the macro base station and the micro base station. When the UE moves from a serving cell (or a serving base station) to another macro base station or micro base station (collectively referred to as a target base station), signal quality of a communication link between the UE and the target base station gradually improves; when common pilot channel quality of the target base station reaches the first condition threshold value (where the target base station is the micro base station) or the second condition threshold value (where the target base station is the macro base station), the UE may report a common pilot channel quality improvement event of the target base station to a network side through the communication link, so that the RNC adds the target base station to the second active set.

The third active set includes an extended DCH active set, where the extended DCH active set supports a macro base station in the third active set to send a downlink DCH service, and the UE receives the downlink DCH service sent by the macro base station in the third active set. In the third active set, the UE may receive an enhanced dedicated channel hybrid automatic repeat request indicator channel (E-HICH) sent by a micro base station in the third active set; the UE transmits new data if the E-HICH indicates an acknowledgement (ACK), and the UE retransmits data if the E-HICH indicates a negative acknowledgement (NACK) and a maximum quantity of retransmissions is not reached.

Figure 1:
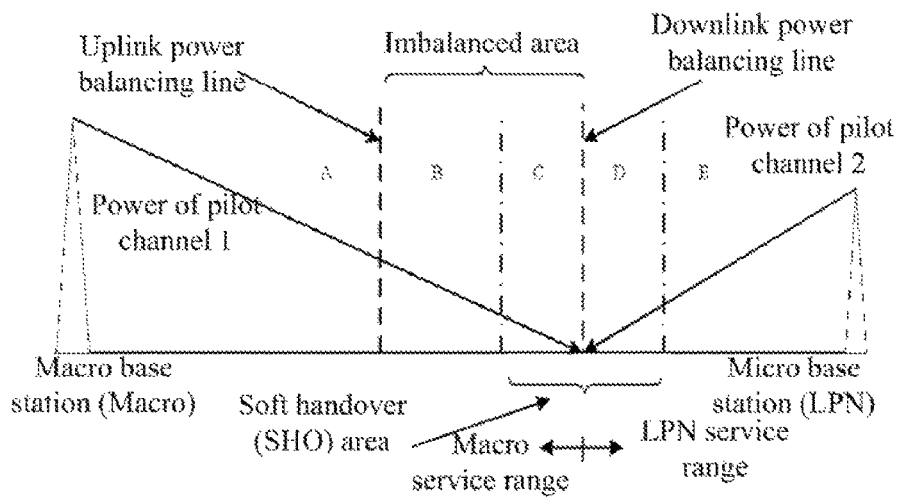
FIG. 1 is a schematic diagram of an uplink power balance line, a downlink power balance line, and a soft handover area in the prior art.

With reference to FIG. 1, the first area is area B and the second area is area E. In the first area B, downlink reception on the UE for a macro base station is better than that for a micro base station, but on an uplink, reception on the micro base station for the UE is better than that on the macro base station. Therefore, the UE performs uplink and downlink service transmission with the macro base station and performs uplink service transmission with the micro base station in the first area B according to an instruction of the instruction information. In the transmission process, the micro base station may perform uplink power control on the UE, so as to minimize uplink interference that is caused by the UE to the micro base station in the first area B; moreover, in this area, the micro base station has better uplink signal quality, and therefore, uplink coverage of the micro base station may be further fully utilized to improve an uplink throughput rate and reliability of a network.

In the second area E, for both an uplink and a downlink, the UE has better link quality for the micro base station; however, the UE still has higher receive power for a downlink signal of the macro base station. Therefore, the UE performs uplink and downlink service transmission with the micro base station and performs downlink service transmission with the macro base station in this area according to the instruction of the instruction information. In the transmission process, the UE may perform downlink power control on the macro base station, so as to minimize downlink interference that is caused by the macro base station to the micro base station in the second area E, and further, downlink coverage of the macro base station may be fully utilized.

In the network communications method provided by this embodiment, a UE receives instruction information sent by an RNC; and the UE, according to the instruction information, performs uplink and downlink service transmission with a macro base station and performs uplink service transmission with a micro base station in a first area, and/or performs uplink and downlink service transmission with a micro base station and performs downlink service transmission with a macro base station in a second area. This may minimize uplink interference that is caused by the UE to the micro base station in the first area and minimize downlink interference that is caused by the macro base station to the micro base station in the second area; and further, uplink coverage of the micro base station and downlink coverage of the macro base station may be fully utilized, which improves a throughput rate and reliability of transmission at an edge area of a HetNet.

Figure 3:
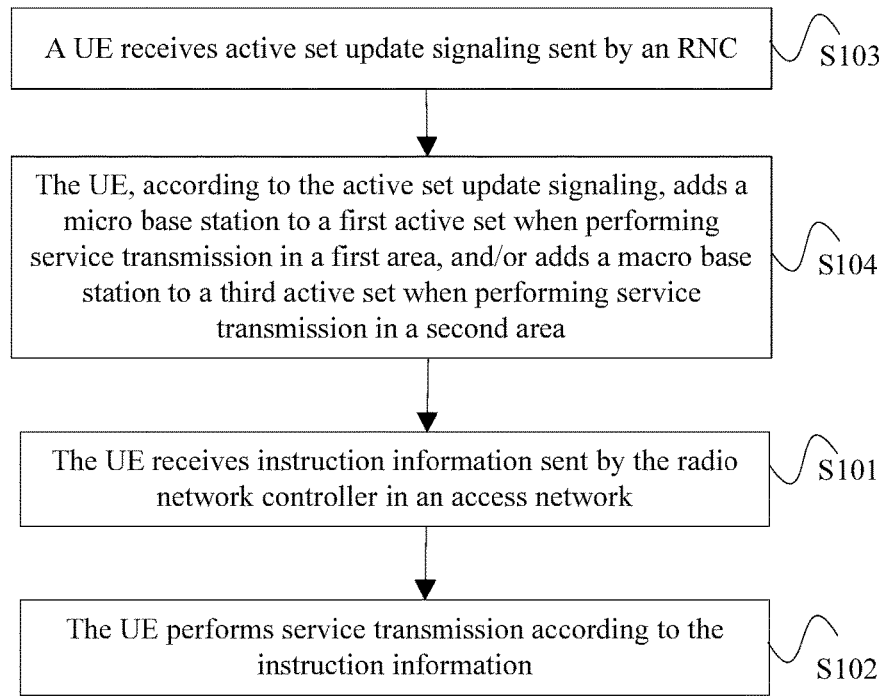
FIG. 3 is a flowchart of Embodiment 2 of a network communications method according to the present disclosure.

FIG. 3 is a flowchart of Embodiment 2 of a network communications method according to the present disclosure. As shown in FIG. 3, on a basis of the embodiment shown in FIG. 2, this embodiment provides a specific implementation method, which further includes the following before the UE performs the service transmission according to the instruction information in S102.

S103. The UE receives active set update signaling sent by the RNC.

S104. The UE, according to the active set update signaling, adds the micro base station to the first active set when performing service transmission in the first area, and/or adds the micro base station to the third active set when performing service transmission in the second area.

With reference to FIG. 1, near the first area B, before S103 in which the UE receives the active set update signaling sent by the RNC, the method further includes that the UE measures common pilot channel quality of each cell; and when the UE is in a non-soft handover area, that is, when a serving cell of the UE is the macro base station and the UE moves from area A to area B, and when the UE measures that the common pilot channel quality of the micro base station is greater than the preset first threshold value for addition to the first active set and less than the first condition threshold value for addition to the second active set, the UE sends a first measurement report to the RNC, so that the RNC sends the active set update signaling to the UE according to the first measurement report, which is that the UE sends the first measurement report to the macro base station, and the macro base station forwards the first measurement report to the RNC; or when the UE is in a soft handover area corresponding to the second active set, that is, when the UE moves from area C to area B, and when the UE measures that the common pilot channel quality of the micro base station decreases to be less than a third condition threshold value for removal of the micro base station from the second active set and greater than a preset second threshold value, the UE sends a first measurement report to the RNC, so that the RNC sends the active set update signaling to the UE according to the first measurement report, which is that the UE sends the first measurement report to the macro base station or the micro base station, and the macro base station or the micro base station forwards the first measurement report to the RNC.

Here, it should be noted that the first threshold value and the second threshold value may be equal.

The UE adds the micro base station to the first active set after receiving the active set update signaling, and then the UE performs service transmission according to the received instruction information and an active set on which addition is performed.

After the UE performs service transmission according to the instruction information, that is, after the UE moves out of area B, the method further includes that the UE continues to measure the common pilot channel quality of the micro base station, and when the common pilot channel quality of the micro base station is greater than the first condition threshold value for addition to the second active set, the UE sends a second measurement report to the RNC, which is that the UE sends the second measurement report to the macro base station or the micro base station, and then the macro base station or the micro base station forwards the second measurement report to the RNC, so that the RNC sends first control information to the UE, and the UE adds the micro base station to the second active set according to the first control information; or the UE continues to measure the common pilot channel quality of the micro base station, and when the common pilot channel quality of the micro base station is less than the second threshold value, the UE sends a second measurement report to the RNC. The UE sends the second measurement report to the macro base station or the micro base station, and then the macro base station or the micro base station forwards the second measurement report to the RNC, so that the RNC sends second control information to the UE, and the UE removes the micro base station from the first active set according to the second control information.

Further, if a service transmitted by the UE includes a DCH service, when the UE sends an uplink signal, the UE further needs to receive a TPC sent by the micro base station, where the TPC is used to adjust uplink transmit power of the UE.

If a service transmitted by the UE includes an E-DCH service, when the UE sends an uplink signal, the UE further needs to receive a TPC, an enhanced dedicated channel relative grant channel (E-RGCH), and an E-HICH that are sent by the micro base station, where the TPC is used to adjust uplink transmit power of the UE, the E-RGCH is used to adjust an uplink scheduling grant value obtained by the UE, and the E-HICH is used to feed back to the UE whether the micro base station correctly receives the data of the UE.

With reference to FIG. 1, near the second area E, before S103 in which the UE receives the active set update signaling sent by the RNC, the method further includes that the UE measures common pilot channel quality of each cell; and when the UE is in a non-soft handover area, that is, when the UE moves from an area close to the micro base station to area E, and when the UE measures that the common pilot channel quality of the macro base station is greater than the preset third threshold value and less than the second condition threshold value for addition to the second active set, the UE sends a third measurement report to the RNC, so that the RNC sends the active set update signaling to the UE according to the third measurement report, which is that the UE sends the third measurement report to the micro base station, and then the micro base station forwards the third measurement report to the RNC; or when the UE is in a soft handover area corresponding to the second active set, that is, when the UE moves from area D to area E, and when the UE measures that the common pilot channel quality of the macro base station is less than a fourth condition threshold value for removal of the macro base station from the second active set and greater than a preset fourth threshold value, the UE sends a third measurement report to the RNC, which is that the UE sends the third measurement report to the macro base station or the micro base station, and then the macro base station or the micro base station forwards the third measurement report to the RNC, so that the RNC sends the active set update signaling to the UE according to the third measurement report.

Here, it should be noted that the third threshold value and the fourth threshold value may be equal.

The UE adds the macro base station to the third active set after receiving the active set update signaling, and then the UE performs service transmission according to the received instruction information and an active set on which addition is performed.

After the UE performs service transmission according to the instruction information, that is, after the UE moves out of area E, the method further includes that the UE continues to measure the common pilot channel quality of the macro base station, and when the common pilot channel quality of the macro base station is greater than the second condition threshold value for addition to the second active set, the UE sends a fourth measurement report to the RNC, which is that the UE sends the fourth measurement report to the micro base station, and then the micro base station forwards the fourth measurement report to the RNC, so that the RNC sends third control information to the UE, and the UE adds the macro base station to the second active set according to the third control information; or the UE continues to measure the common pilot channel quality of the macro base station, and when the common pilot channel quality of the macro base station is less than a fourth threshold value, the UE sends a fourth measurement report to the RNC, which is that the UE sends the fourth measurement report to the micro base station, and then the micro base station forwards the fourth measurement report to the RNC, so that the RNC sends fourth control information to the UE, and the UE removes the macro base station from the third active set according to the fourth control information.

In the network communications method provided by this embodiment, a UE adds a micro base station to a first active set after receiving active set update signaling, and then the UE performs service transmission according to received instruction information and an active set on which addition is performed; and/or a UE adds a macro base station to a third active set after receiving active set update signaling, and then the UE performs service transmission according to received instruction information and an active set on which addition is performed. This may minimize uplink interference that is caused by the UE to the micro base station in a first area and minimize downlink interference that is caused by the macro base station to the micro base station in a second area; and further, uplink coverage of the micro base station and downlink coverage of the macro base station may be fully utilized, which improves a throughput rate and reliability of transmission at an edge area of a HetNet.

Figure 4:
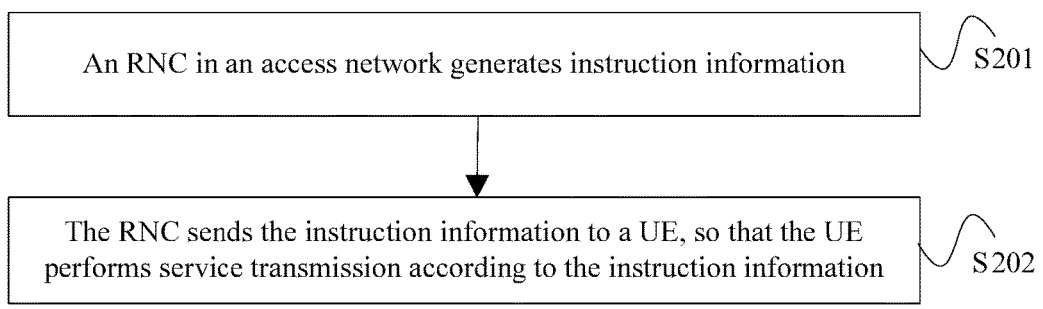
FIG. 4 is a flowchart of Embodiment 3 of a network communications method according to the present disclosure.

FIG. 4 is a flowchart of Embodiment 3 of a network communications method according to the present disclosure. This embodiment is described by using an example in which an RNC is an execution body. As shown in FIG. 4, the method according to this embodiment may include the following.

S201. The RNC in an access network generates instruction information, where the instruction information is used to instruct a UE to, in a first area, perform uplink and downlink service transmission with a macro base station of the access network and perform uplink service transmission with a micro base station of the access network, where the first area is an area in which common pilot channel quality of the micro base station is between common pilot channel quality of the micro base station that reaches a first threshold value for addition to a first active set and common pilot channel quality of the micro base station that reaches a first condition threshold value for addition to a second active set, and the common pilot channel quality of the micro base station is obtained by the UE in the first area by means of measurement; and/or in a second area, perform uplink and downlink service transmission with a micro base station and perform downlink service transmission with a macro base station, where the second area is an area in which common pilot channel quality of the macro base station is between common pilot channel quality of the macro base station that reaches a third threshold value for addition to a third active set and common pilot channel quality of the macro base station that reaches a second condition threshold value for addition to a second active set, and the common pilot channel quality of the macro base station is obtained by the UE in the second area by means of measurement.

S202. The RNC sends the instruction information to the UE, so that the UE performs service transmission according to the instruction information.

The first active set includes an extended DCH active set and/or an extended E-DCH active set, where the extended DCH active set supports the UE to send an uplink DCH service, a micro base station in the extended DCH active set receives the uplink DCH service sent by the UE, the extended E-DCH active set supports the UE to send an E-DCH service, and a micro base station in the extended E-DCH active set receives the E-DCH service sent by the UE. In the first active set, the UE may receive and calculate an LLR of a DCH service of a macro base station in the first active set, and input the LLR as a Viterbi decoder to perform Viterbi decoding.

The second active set includes a DCH active set and/or an E-DCH active set. In the second active set, both the macro base station and the micro base station may send a downlink DCH service to the UE and receive an uplink DCH service and/or E-DCH service sent by the UE, and the UE may receive downlink DCH services sent by the macro base station and the micro base station.

The third active set includes an extended DCH active set, where the extended DCH active set supports a macro base station in the third active set to send a downlink DCH service, and the UE receives the downlink DCH service sent by the macro base station in the third active set. In the third active set, the UE may receive an E-HICH sent by a micro base station in the third active set; the UE transmits new data if the E-HICH indicates an ACK, or the UE retransmits data if the E-HICH indicates an NACK and a maximum quantity of retransmissions is not reached.

With reference to FIG. 1, the first area is area B and the second area is area E. In the first area B, downlink reception on the UE for a macro base station is better than that for a micro base station, but on an uplink, reception on the micro base station for the UE is better than that on the macro base station. Therefore, the RNC sends the instruction information to the UE, so that the UE performs uplink and downlink service transmission with the macro base station and performs uplink service transmission with the micro base station in the first area B according to the instruction information. In the transmission process, the micro base station may perform uplink power control on the UE, so as to minimize uplink interference that is caused by the UE to the micro base station in the first area B; moreover, in this area, the micro base station has better uplink signal quality, and therefore, uplink coverage of the micro base station may be further fully utilized to improve an uplink throughput rate and reliability of a network.

In the second area E, for both an uplink and a downlink, the UE has better link quality for the micro base station; however, the UE still has higher receive power for a downlink signal of the macro base station. Therefore, the RNC sends the instruction information to the UE, so that the UE performs uplink and downlink service transmission with the micro base station and performs downlink service transmission with the macro base station in this area according to the instruction information. In the transmission process, the UE may perform downlink power control on the macro base station, so as to minimize downlink interference that is caused by the macro base station to the micro base station in the second area E, and further, downlink coverage of the macro base station may be fully utilized.

In the network communications method provided by this embodiment, an RNC generates and sends instruction information to a UE, so that the UE performs uplink and downlink service transmission with a macro base station and performs uplink service transmission with a micro base station in a first area, and/or performs uplink service transmission with a micro base station and performs downlink service transmission with a macro base station in a second area. This may minimize uplink interference that is caused by the UE to the micro base station in the first area and minimize downlink interference that is caused by the macro base station to the micro base station in the second area; and further, uplink coverage of the micro base station and downlink coverage of the macro base station may be fully utilized, which improves a throughput rate and reliability of transmission at an edge area of a HetNet.

Figure 5:
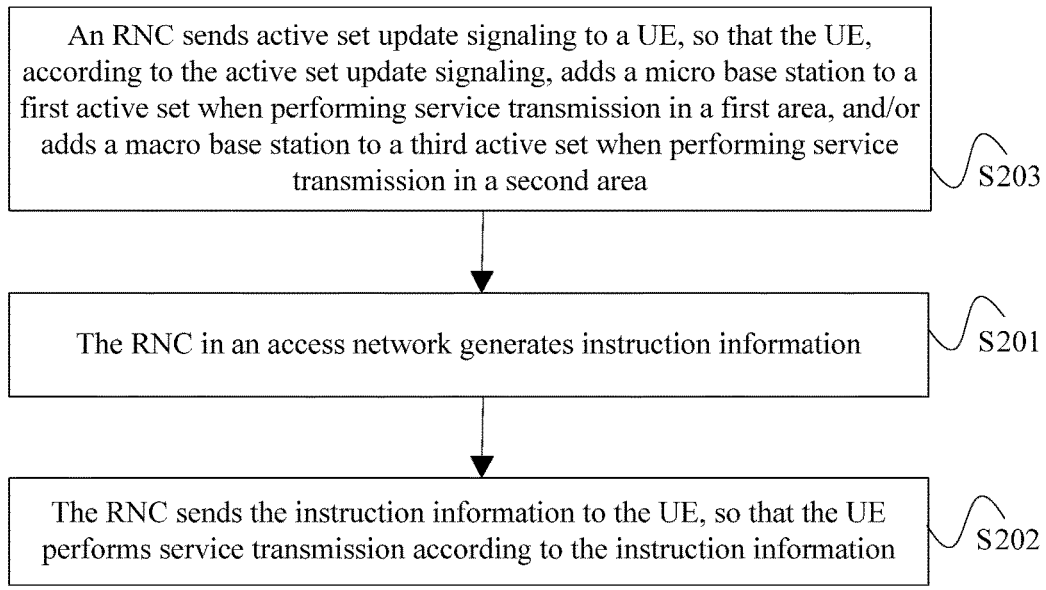
FIG. 5 is a flowchart of Embodiment 4 of a network communications method according to the present disclosure.

FIG. 5 is a flowchart of Embodiment 4 of a network communications method according to the present disclosure. As shown in FIG. 5, on a basis of the embodiment shown in FIG. 4, this embodiment provides a specific implementation method, which further includes the following before the RNC sends the instruction information to the UE in S202.

S203. The RNC sends active set update signaling to the UE, so that the UE, according to the active set update signaling, adds the micro base station to the first active set when performing service transmission in the first area, and/or adds the macro base station to the third active set when performing service transmission in the second area.

With reference to FIG. 1, near the first area B, before S203 in which the RNC sends the active set update signaling to the UE, the method further includes that the RNC receives a first measurement report sent by the UE, where the first measurement report is sent to the RNC when the UE is in a non-soft handover area, that is, when a serving cell of the UE is the macro base station and the UE moves from area A to area B, and when the UE measures that the common pilot channel quality of the micro base station is greater than the preset first threshold value and less than the first condition threshold value for addition to the second active set, or the first measurement report is sent to the RNC when the UE is in a soft handover area corresponding to the second active set, that is, when the UE moves from area C to area B, and when the UE measures that the common pilot channel quality of the micro base station is less than a third condition threshold value for removal of the micro base station from the second active set and greater than a preset second threshold value.

Here, it should be noted that the first threshold value and the second threshold value may be equal.

Further, after the RNC sends the instruction information to the UE, and correspondingly, after the UE performs service transmission according to the instruction information, that is, after the UE moves out of area B, the method further includes that the RNC receives a second measurement report sent by the UE, where the second measurement report is sent by the UE to the RNC when the common pilot channel quality of the micro base station is greater than the first condition threshold value for addition to the second active set; and the RNC sends first control information to the UE, so that the UE adds the micro base station to the second active set according to an instruction of the first control information.

Alternatively, after the RNC sends the instruction information to the UE, the method further includes that the RNC receives a second measurement report sent by the UE, where the second measurement report is sent by the UE to the RNC when the common pilot channel quality of the micro base station is less than the second threshold value; and the RNC sends second control information to the UE, so that the UE removes the micro base station from the first active set according to the second control information.

With reference to FIG. 1, near the second area E, before S203 in which the RNC sends the active set update signaling to the UE, the method further includes that the RNC receives a third measurement report sent by the UE, where the third measurement report is sent by the UE to the RNC when the UE is in a non-soft handover area, that is, when the UE moves from an area close to the micro base station to area E, and when the UE measures that the common pilot channel quality of the macro base station is greater than the preset third threshold value and less than the second condition threshold value for addition to the second active set; or the third measurement report is sent by the UE to the RNC when the UE is in a soft handover area corresponding to the second active set, that is, when the UE moves from area D to area E, and when the UE measures that the common pilot channel quality of the macro base station is less than a fourth condition threshold value for removal of the macro base station from the second active set and greater than a preset fourth threshold value.

Here, it should be noted that the third threshold value and the fourth threshold value may be equal.

Further, after the RNC sends the instruction information to the UE, and correspondingly, after the UE performs service transmission according to the instruction information, that is, after the UE moves out of area E, the method further includes that the RNC receives a fourth measurement report sent by the UE, where the fourth measurement report is sent by the UE to the RNC when the common pilot channel quality of the macro base station is greater than the second condition threshold value for addition to the second active set; and the RNC sends third control information to the UE, so that the UE adds the macro base station to the second active set according to the third control information.

Alternatively, after the RNC sends the instruction information to the UE, the method further includes that the RNC receives a fourth measurement report sent by the UE, where the fourth measurement report is sent by the UE to the RNC when the common pilot channel quality of the macro base station is less than the fourth threshold value; and the RNC sends fourth control information to the UE, so that the UE removes the macro base station from the third active set according to the fourth control information.

In the network communications method provided by this embodiment, an RNC sends active set update signaling to a UE, so that the UE adds a micro base station to a first active set after receiving the active set update signaling, and then the UE performs service transmission according to instruction information sent by the RNC and an active set on which addition is performed; and/or an RNC sends active set update signaling to a UE, so that the UE adds a macro base station to a third active set after receiving the active set update signaling, and then the UE performs service transmission according to instruction information sent by the RNC and an active set on which addition is performed. This may minimize uplink interference that is caused by the UE to the micro base station in a first area and minimize downlink interference that is caused by the macro base station to the micro base station in a second area; and further, uplink coverage of the micro base station and downlink coverage of the macro base station may be fully utilized, which improves a throughput rate and reliability of transmission at an edge area of a HetNet.

Figure 6:
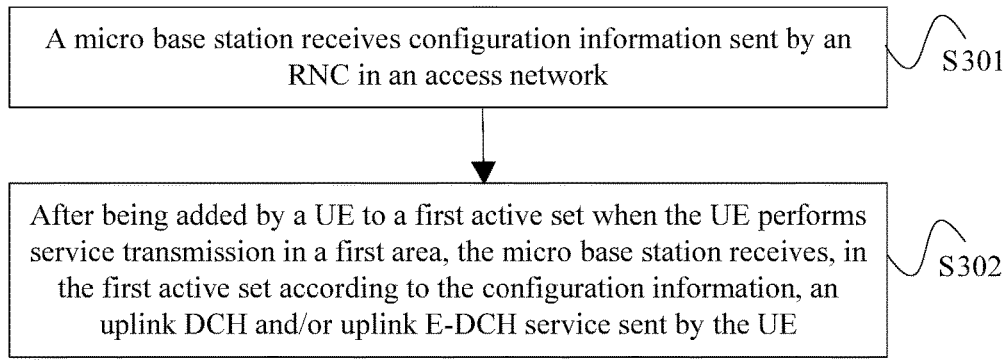
FIG. 6 is a flowchart of Embodiment 5 of a network communications method according to the present disclosure.

FIG. 6 is a flowchart of Embodiment 5 of a network communications method according to the present disclosure. As shown in FIG. 6, the method according to this embodiment includes the following.

S301. A micro base station receives configuration information sent by an RNC in an access network, where the configuration information is used to instruct the micro base station to receive an uplink DCH and/or uplink E-DCH service sent by a UE.

S302. After being added by the UE to a first active set when the UE performs service transmission in a first area, the micro base station receives, in the first active set according to the configuration information, the uplink DCH and/or uplink E-DCH service sent by the UE, where the first area is an area in which common pilot channel quality of the micro base station is between common pilot channel quality of the micro base station that reaches a first threshold value for addition to the first active set and common pilot channel quality of the micro base station that reaches a first condition threshold value for addition to a second active set, and the common pilot channel quality of the micro base station is obtained by the UE in the first area by means of measurement.

The first active set includes an extended DCH active set and/or an extended E-DCH active set, where the extended DCH active set supports the UE to send an uplink DCH service, a micro base station in the extended DCH active set receives the uplink DCH service sent by the UE, the extended E-DCH active set supports the UE to send an E-DCH service, and a micro base station in the extended E-DCH active set receives the E-DCH service sent by the UE. In the first active set, the UE may receive and calculate an LLR of a DCH service of a macro base station in the first active set, and input the LLR as a Viterbi decoder to perform Viterbi decoding.

Further, if a service received by the micro base station is a DCH service, the method further includes that the micro base station sends a TPC to the UE, where the TPC is used to adjust uplink transmit power of the UE.

If a service received by the micro base station is an E-DCH service, the method further includes that the micro base station sends a TPC, an E-RGCH, and an E-HICH to the UE, where the TPC is used to adjust uplink transmit power of the UE, the E-RGCH is used to adjust a scheduling grant value obtained by the UE, and the E-HICH is used to feed back to the UE whether the micro base station correctly receives data of the UE.

In the network communications method provided by this embodiment, a micro base station receives configuration information sent by an RNC; and after being added by the UE to a first active set when the UE performs service transmission in a first area, the micro base station receives, in the first active set according to the configuration information, an uplink DCH and/or uplink E-DCH service sent by the UE. This may minimize uplink interference that is caused by the UE to the micro base station in the first area; further, uplink coverage of the micro base station may be fully utilized, which improves a throughput rate and reliability of transmission at an edge area of a HetNet.

Figure 7:
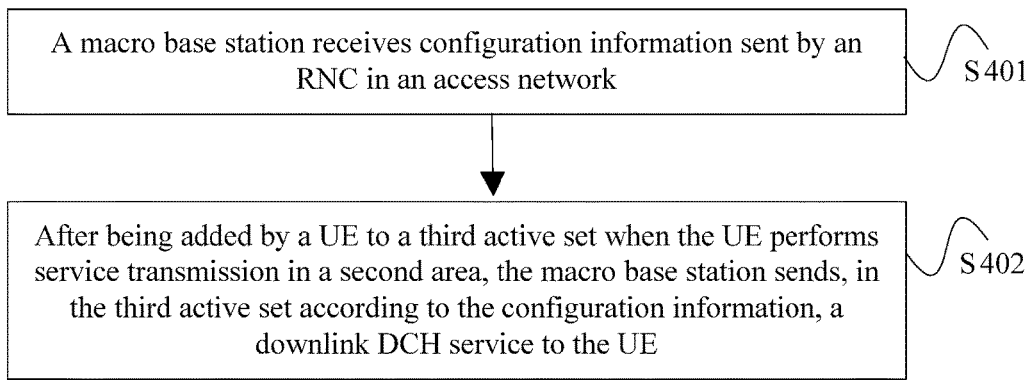
FIG. 7 is a flowchart of Embodiment 6 of a network communications method according to the present disclosure.

FIG. 7 is a flowchart of Embodiment 6 of a network communications method according to the present disclosure. As shown in FIG. 7, the method according to this embodiment includes the following.

S401. A macro base station receives configuration information sent by an RNC in an access network, where the configuration information is used to instruct the macro base station to send a downlink DCH service to a UE.

S402. After being added by the UE to a third active set when the UE performs service transmission in a second area, the macro base station sends, in the third active set according to the configuration information, the downlink DCH service to the UE, where the second area is an area in which common pilot channel quality of the macro base station is between common pilot channel quality of the macro base station that reaches a third threshold value for addition to the third active set and common pilot channel quality of the macro base station that reaches a second condition threshold value for addition to a second active set, and the common pilot channel quality of the macro base station is obtained by the UE in the second area by means of measurement.

The third active set includes an extended DCH active set, where the extended DCH active set supports a macro base station in the third active set to send a downlink DCH service, and the UE receives the downlink DCH service sent by the macro base station in the third active set. The UE may receive an E-HICH sent by a micro base station in the third active set; the UE transmits a new E-DCH service if the E-HICH indicates an ACK, or the UE retransmits an E-DCH service if the E-HICH indicates an NACK and a maximum quantity of retransmissions is not reached.

Further, after the macro base station sends, in the third active set according to the configuration information, the downlink DCH service to the UE, the method further includes receiving an uplink TPC sent by the UE, where the TPC is used to control transmit power of the downlink DCH service.

In the network communications method provided by this embodiment, a macro base station receives configuration information sent by an RNC in an access network; and after being added by the UE to a third active set when the UE performs service transmission in a second area, the macro base station sends, in the third active set according to the configuration information, a downlink DCH service to the UE. This may minimize downlink interference that is caused by the macro base station to a micro base station in the second area; further, downlink coverage of the macro base station may be fully utilized, which improves a throughput rate and reliability of transmission at an edge area of a HetNet.

The following describes the technical solutions in detail according to the method embodiments shown in FIG. 2 to FIG. 7 by using several specific embodiments.

Figure 8:
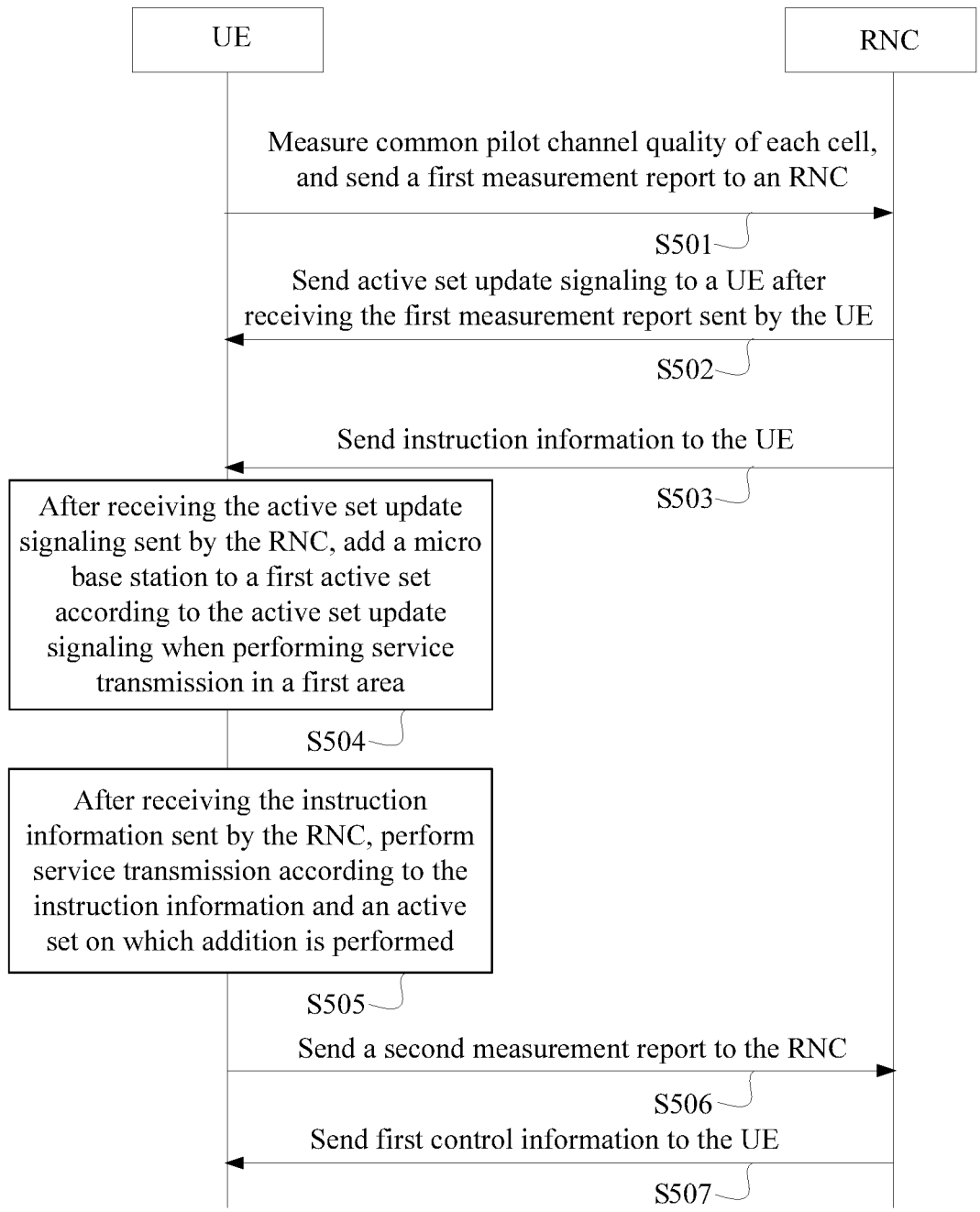
FIG. 8 is a flowchart of Embodiment 7 of a network communications method according to the present disclosure.

FIG. 8 is a flowchart of Embodiment 7 of a network communications method according to the present disclosure. As shown in FIG. 8, this embodiment is described by using an example in which a UE is close to a first area B. The method according to this embodiment may include the following.

S501. The UE measures common pilot channel quality of each cell, and sends a first measurement report to an RNC.

When the UE is in a non-soft handover area, that is, when the UE moves from area A to area B, and when the UE measures that common pilot channel quality of a micro base station is greater than a preset first threshold value and less than a first condition threshold value for addition to a second active set, the UE sends the first measurement report to the RNC.

When the UE is in a soft handover area corresponding to a second active set, that is, when the UE moves from area C to area B, and when the UE measures that the common pilot channel quality of the micro base station is less than a third condition threshold value for removal of the micro base station from the second active set and greater than a preset second threshold value, the UE sends the first measurement report to the RNC.

S502. The RNC sends active set update signaling to the UE after receiving the first measurement report sent by the UE.

S503. The RNC sends instruction information to the UE, where the instruction information is used to instruct the UE to perform uplink and downlink service transmission with a macro base station and perform uplink service transmission with a micro base station in a first area, where the first area is an area in which common pilot channel quality of the micro base station is between common pilot channel quality of the micro base station that reaches a first threshold value for addition to a first active set and common pilot channel quality of the micro base station that reaches a first condition threshold value for addition to a second active set.

S504. After receiving the active set update signaling sent by the RNC, the UE adds the micro base station to the first active set according to the active set update signaling when performing service transmission in the first area.

S505. After receiving the instruction information sent by the RNC, the UE performs service transmission according to the instruction information and an active set on which addition is performed.

S506. The UE continues to measure the common pilot channel quality of the micro base station, and when the common pilot channel quality of the micro base station is greater than the first condition threshold value for addition to the second active set, the UE sends a second measurement report to the RNC.

S507. The RNC sends first control information to the UE, so that the UE adds the micro base station to the second active set according to the first control information.

Alternatively,

S506'. The UE continues to measure the common pilot channel quality of the micro base station, and when the common pilot channel quality of the micro base station is less than a second threshold value, the UE sends a second measurement report to the RNC.

S507'. The RNC sends second control information to the UE, so that the UE removes the micro base station from the first active set according to the second control information.

Further, if a service transmitted by the UE includes a DCH service, when the UE sends an uplink signal, the UE further needs to receive a TPC sent by the micro base station, where the TPC is used to adjust uplink transmit power of the UE.

If a service transmitted by the UE includes an E-DCH service, when the UE sends an uplink signal, the UE further needs to receive a TPC, an E-RGCH, and an E-HICH that are sent by the micro base station, where the TPC is used to adjust uplink transmit power of the UE, the E-RGCH is used to adjust an uplink scheduling grant value obtained by the UE, and the E-HICH is used to feed back to the UE whether the micro base station correctly receives the data of the UE.

Figure 9:
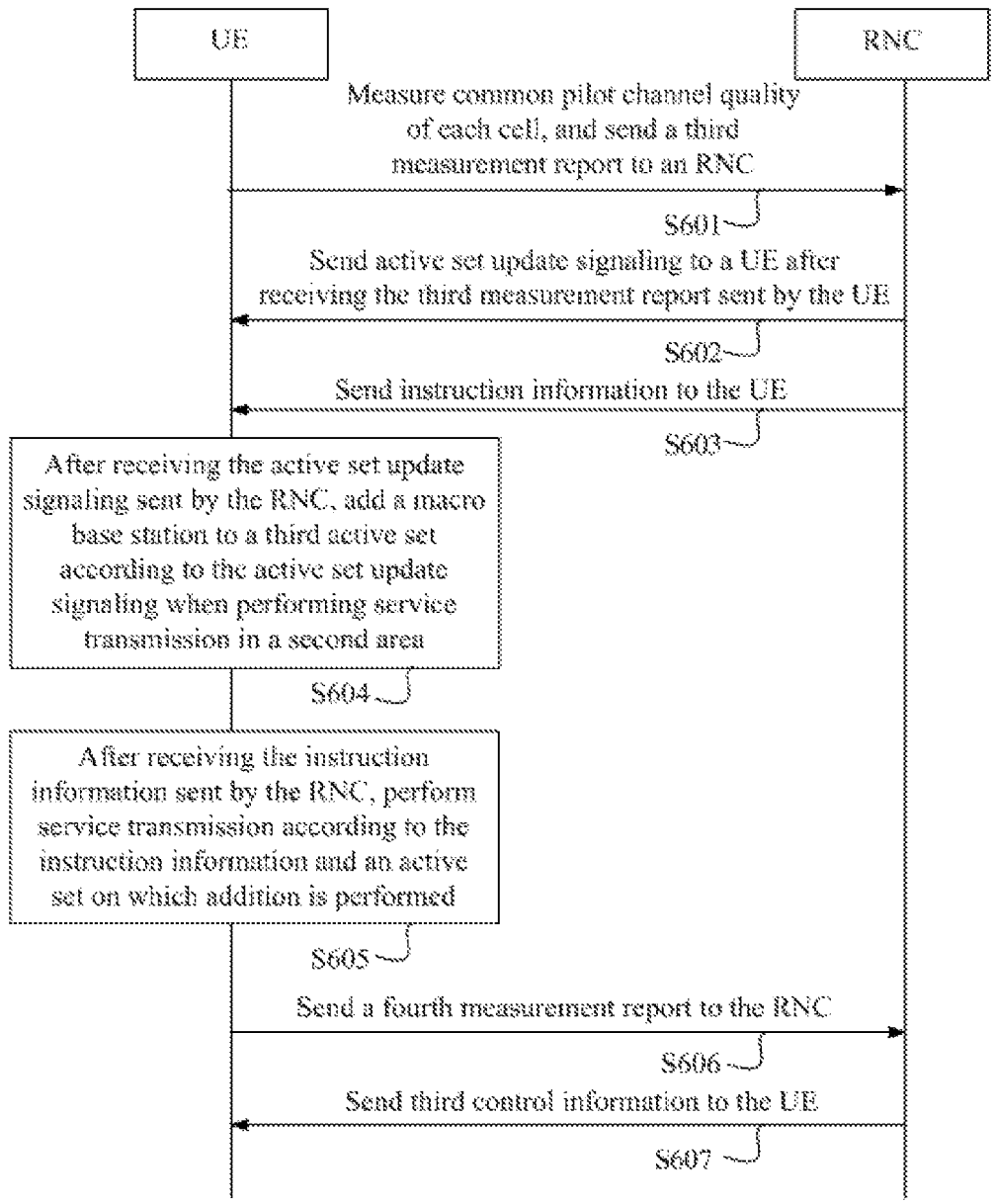
FIG. 9 is a flowchart of Embodiment 8 of a network communications method according to the present disclosure.

FIG. 9 is a flowchart of Embodiment 8 of a network communications method according to the present disclosure. As shown in FIG. 9, this embodiment is described by using an example in which a UE is close to a second area E. The method according to this embodiment may include the following.

S601. The UE measures common pilot channel quality of each cell, and sends a third measurement report to an RNC.

When the UE is in a non-soft handover area, that is, when the UE moves from an area close to a micro base station to area E, and when the UE measures that common pilot channel quality of a macro base station is greater than a preset third threshold value and less than a second condition threshold value for addition to a second active set, the UE sends the third measurement report to the RNC.

When the UE is in a soft handover area corresponding to a second active set, that is, when the UE moves from area D to area E, and when the UE measures that the common pilot channel quality of the macro base station is less than a fourth condition threshold value for removal of the macro base station from the second active set and greater than a preset fourth threshold value, the UE sends the third measurement report to the RNC.

S602. The RNC sends active set update signaling to the UE after receiving the third measurement report sent by the UE.

S603. The RNC sends instruction information to the UE, where the instruction information is used to instruct the UE to perform uplink and downlink service transmission with a micro base station and perform downlink service transmission with a macro base station in a second area, where the second area is an area in which common pilot channel quality of the macro base station is between common pilot channel quality of the macro base station that reaches a third threshold value for addition to a third active set and common pilot channel quality of the macro base station that reaches a second condition threshold value for addition to a second active set.

S604. After receiving the active set update signaling sent by the RNC, the UE adds the macro base station to the third active set according to the active set update signaling when performing service transmission in the second area.

S605. After the UE receives the instruction information sent by the RNC, the UE performs service transmission according to the instruction information and an active set on which addition is performed.

S606. The UE continues to measure the common pilot channel quality of the macro base station, and when the common pilot channel quality of the macro base station is greater than the second condition threshold value for addition to the second active set, the UE sends a fourth measurement report to the RNC.

S607. The RNC sends third control information to the UE, so that the UE adds the macro base station to the second active set according to the third control information.

Alternatively,

S606'. The UE continues to measure the common pilot channel quality of the macro base station, and when the common pilot channel quality of the macro base station is less than the fourth threshold value, the UE sends a fourth measurement report to the RNC.

S607'. The RNC sends fourth control information to the UE, so that the UE removes the macro base station from the third active set according to the fourth control information.

Figure 10:
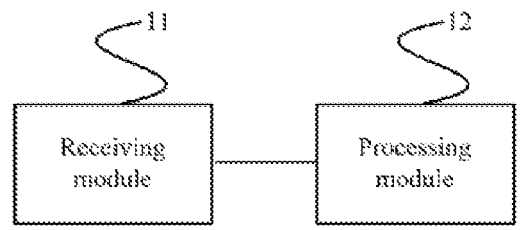
FIG. 10 is a schematic structural diagram of Embodiment 1 of a user equipment according to the present disclosure.

FIG. 10 is a schematic structural diagram of Embodiment 1 of a user equipment according to the present disclosure. As shown in FIG. 10, the user equipment according to this embodiment may include a receiving module 11 and a processing module 12, where the receiving module 11 is configured to receive instruction information sent by an RNC in an access network, where the instruction information is used to instruct the UE to, in a first area, perform uplink and downlink service transmission with a macro base station and perform uplink service transmission with a micro base station, where the first area is an area in which common pilot channel quality of the micro base station is between common pilot channel quality of the micro base station that reaches a first threshold value for addition to a first active set and common pilot channel quality of the micro base station that reaches a first condition threshold value for addition to a second active set, and the common pilot channel quality of the micro base station is obtained by the UE in the first area by means of measurement; and/or in a second area, perform uplink and downlink service transmission with a micro base station and perform downlink service transmission with a macro base station, where the second area is an area in which common pilot channel quality of the macro base station is between common pilot channel quality of the macro base station that reaches a third threshold value for addition to a third active set and common pilot channel quality of the macro base station that reaches a second condition threshold value for addition to a second active set, and the common pilot channel quality of the macro base station is obtained by the UE in the second area by means of measurement; and the processing module 12 is configured to perform service transmission according to the instruction information.

The first active set includes an extended DCH active set and/or an extended E-DCH active set, where the extended DCH active set supports the UE to send an uplink DCH service, a micro base station in the extended DCH active set receives the uplink DCH service sent by the UE, the extended E-DCH active set supports the UE to send an E-DCH service, and a micro base station in the extended E-DCH active set receives the E-DCH service sent by the UE. In the first active set, the UE may receive and calculate an LLR of a DCH service of a macro base station in the first active set, and input the LLR as a Viterbi decoder to perform Viterbi decoding.

The second active set includes a DCH active set and/or an E-DCH active set.

The third active set includes an extended DCH active set, where the extended DCH active set supports a macro base station in the third active set to send a downlink DCH service, and the UE receives the downlink DCH service sent by the macro base station in the third active set. In the third active set, the UE may receive an E-HICH sent by a micro base station in the third active set; the UE transmits new data if the E-HICH indicates an ACK, or the UE retransmits data if the E-HICH indicates an NACK and a maximum quantity of retransmissions is not reached.

The user equipment in this embodiment may be configured to execute the technical solution in the method embodiment shown in FIG. 2, and implementation principles of the user equipment are similar and are not described herein again.

According to the user equipment provided by this embodiment, a receiving module receives instruction information sent by an RNC; and a processing module, according to the instruction information, performs uplink and downlink service transmission with a macro base station and performs uplink service transmission with a micro base station in a first area, and/or performs uplink and downlink service transmission with a micro base station and performs downlink service transmission with a macro base station in a second area. This may minimize uplink interference that is caused by the UE to the micro base station in the first area and minimize downlink interference that is caused by the macro base station to the micro base station in the second area; and further, uplink coverage of the micro base station and downlink coverage of the macro base station may be fully utilized, which improves a throughput rate and reliability of transmission at an edge area of a HetNet.

On a basis of the structure of the user equipment shown in FIG. 10, further, the receiving module 11 is configured to receive, before the processing module 12 performs service transmission according to the instruction information, active set update signaling sent by the RNC; and the processing module 12 is further configured to, according to the active set update signaling, add the micro base station to the first active set when performing service transmission in the first area, and/or add the macro base station to the third active set when performing service transmission in the second area.

Figure 11:
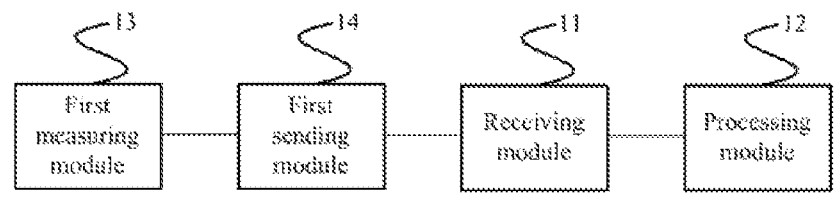
FIG. 11 is a schematic structural diagram of Embodiment 2 of a user equipment according to the present disclosure.

FIG. 11 is a schematic structural diagram of Embodiment 2 of a user equipment according to the present disclosure. As shown in FIG. 11, on a basis of the structure of the apparatus shown in FIG. 10, further, an apparatus according to this embodiment further includes a first measuring module 13 and a first sending module 14, where the first measuring module 13 is configured to measure common pilot channel quality of each cell before the receiving module 11 receives the active set update signaling sent by the RNC; and the first sending module 14 is configured to, when the UE is in a non-soft handover area, and when the first measuring module 13 measures that the common pilot channel quality of the micro base station is greater than the preset first threshold value and less than the first condition threshold value for addition to the second active set, send a first measurement report to the RNC, so that the RNC sends the active set update signaling to the UE according to the first measurement report.

The first sending module 14 is further configured to, when the UE is in a soft handover area corresponding to the second active set, and when the UE measures that the common pilot channel quality of the micro base station is less than a second condition threshold value for removal of the micro base station from the second active set and greater than a preset second threshold value, send a first measurement report to the RNC, so that the RNC sends the active set update signaling to the UE according to the first measurement report.

Further, the first measuring module 13 is configured to, after the processing module 12 performs service transmission according to the instruction information, continue to measure the common pilot channel quality of the micro base station; when the common pilot channel quality of the micro base station is greater than the first condition threshold value for addition to the second active set, the first sending module 14 is further configured to send a second measurement report to the RNC, so that the RNC sends first control information to the UE; and the processing module 12 is further configured to add the micro base station to the second active set according to the first control information.

Alternatively, the first measuring module 13 is further configured to, after the processing module 12 performs service transmission according to the instruction information, continue to measure the common pilot channel quality of the micro base station; when the common pilot channel quality of the micro base station is less than the second threshold value, the first sending module 14 is further configured to send a second measurement report to the RNC, so that the RNC sends second control information to the UE; and the processing module 12 is further configured to remove the micro base station from the first active set according to the second control information.

Further, a service transmitted by the UE includes a DCH service, and the receiving module 11 is further configured to receive a TPC sent by the micro base station, where the TPC is used to adjust uplink transmit power of the UE.

A service transmitted by the UE includes an E-DCH service, and the receiving module 11 is further configured to receive a TPC, an E-RGCH, and an E-HICH that are sent by the micro base station, where the TPC is used to adjust uplink transmit power of the UE, the E-RGCH is used to adjust a scheduling grant value obtained by the UE, and the E-HICH is used to feed back to the UE whether the micro base station correctly receives data of the UE.

Figure 12:
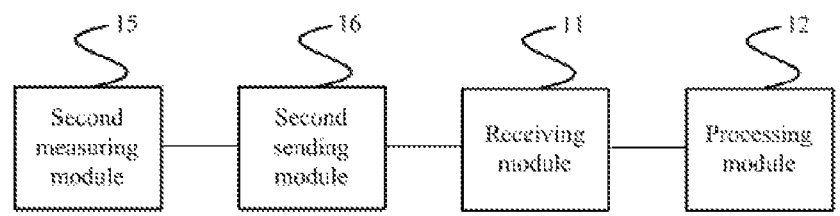
FIG. 12 is a schematic structural diagram of Embodiment 3 of a user equipment according to the present disclosure.

FIG. 12 is a schematic structural diagram of Embodiment 3 of a user equipment according to the present disclosure. As shown in FIG. 12, on a basis of the structure of the apparatus shown in FIG. 10, an apparatus according to this embodiment further includes a second measuring module 15 and a second sending module 16, where the second measuring module 15 is configured to measure common pilot channel quality of each cell before the receiving module 11 receives the active set update signaling sent by the RNC; and the second sending module 16 is configured to, when the UE is in a non-soft handover area, and when the second measuring module 15 measures that the common pilot channel quality of the macro base station is greater than the preset third threshold value and less than the second condition threshold value for addition to the second active set, send a third measurement report to the RNC, so that the RNC sends the active set update signaling to the UE according to the third measurement report.

The second sending module 16 is further configured to, when the UE is in a soft handover area corresponding to the second active set, and when the second measuring module 15 measures that the common pilot channel quality of the macro base station is less than a fourth condition threshold value for removal of the macro base station from the second active set and greater than a preset fourth threshold value, send a third measurement report to the RNC, so that the RNC sends the active set update signaling to the UE according to the third measurement report.

Further, the second measuring module 15 is further configured to, after the processing module 12 performs service transmission according to the instruction information, continue to measure the common pilot channel quality of the macro base station; when the common pilot channel quality of the macro base station is greater than the second condition threshold value for addition to the second active set, the second sending module 16 is further configured to send a fourth measurement report to the RNC, so that the RNC sends third control information to the UE; and the processing module 12 is further configured to add the macro base station to the second active set according to the third control information.

Alternatively, the second measuring module 15 is further configured to, after the processing module 12 performs service transmission according to the instruction information, continue to measure the common pilot channel quality of the macro base station; when the common pilot channel quality of the macro base station is less than the fourth threshold value, the second sending module 16 is further configured to send a fourth measurement report to the RNC, so that the RNC sends fourth control information to the UE; and the processing module 12 is further configured to remove the macro base station from the third active set according to the fourth control information.

The user equipment in the embodiments shown in FIG. 11 and FIG. 12 may be configured to execute the technical solution in the method embodiment shown in FIG. 3, and implementation principles of the user equipment are similar and are not described herein again.

According to the user equipment provided by the embodiments shown in FIG. 11 and FIG. 12, after a receiving module receives active set update signaling, a processing module adds a micro base station to a first active set, and then performs service transmission according to received instruction information and an active set on which addition is performed; and/or, after a receiving module receives active set update signaling, a processing module adds a macro base station to a third active set, and then performs service transmission according to received instruction information and an active set on which addition is performed. This may minimize uplink interference that is caused by the UE to the micro base station in a first area and minimize downlink interference that is caused by the macro base station to the micro base station in a second area; and further, uplink coverage of the micro base station and downlink coverage of the macro base station may be fully utilized, which improves a throughput rate and reliability of transmission at an edge area of a HetNet.

Figure 13:
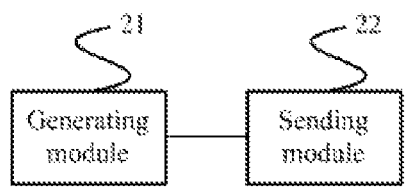
FIG. 13 is a schematic structural diagram of Embodiment 1 of a radio network controller according to the present disclosure.

FIG. 13 is a schematic structural diagram of Embodiment 1 of a radio network controller according to the present disclosure. As shown in FIG. 13, the radio network controller according to this embodiment may include a generating module 21 and a sending module 22, where the generating module 21 is configured to generate instruction information, where the instruction information is used to instruct a UE to, in a first area, perform uplink and downlink service transmission with a macro base station of an access network and perform uplink service transmission with a micro base station, where the first area is an area in which common pilot channel quality of the micro base station is between common pilot channel quality of the micro base station that reaches a first threshold value for addition to a first active set and common pilot channel quality of the micro base station that reaches a first condition threshold value for addition to a second active set, and the common pilot channel quality of the micro base station is obtained by the UE in the first area by means of measurement; and/or in a second area, perform uplink and downlink service transmission with a micro base station and perform downlink service transmission with a macro base station, where the second area is an area in which common pilot channel quality of the macro base station is between common pilot channel quality of the macro base station that reaches a third threshold value for addition to a third active set and common pilot channel quality of the macro base station that reaches a second condition threshold value for addition to a second active set, and the common pilot channel quality of the macro base station is obtained by the UE in the second area by means of measurement; and the sending module 22 is configured to send the instruction information to the UE, so that the UE performs service transmission according to the instruction information.

The first active set includes an extended DCH active set and/or an extended E-DCH active set, where the extended DCH active set supports the UE to send an uplink DCH service, a micro base station in the extended DCH active set receives the uplink DCH service sent by the UE, the extended E-DCH active set supports the UE to send an E-DCH service, and a micro base station in the extended E-DCH active set receives the E-DCH service sent by the UE. In the first active set, the UE may receive and calculate an LLR of a DCH service of a macro base station in the first active set, and input the LLR as a Viterbi decoder to perform Viterbi decoding.

The second active set includes a DCH active set and/or an E-DCH active set.

The third active set includes an extended DCH active set, where the extended DCH active set supports a macro base station in the third active set to send a downlink DCH service, and the UE receives the downlink DCH service sent by the macro base station in the third active set. In the third active set, the UE may receive an E-HICH sent by a micro base station in the third active set; the UE transmits new data on an E-DCH if the E-HICH indicates an ACK, or the UE retransmits data on the E-DCH if the E-HICH indicates an NACK and a maximum quantity of retransmissions is not reached.

The radio network controller according to this embodiment may be configured to execute the technical solution in the method embodiment shown in FIG. 4, and implementation principles of the radio network controller are similar and are not described herein again.

According to the radio network controller provided by this embodiment, a generating module generates instruction information, and a sending module sends the instruction information to a UE, so that the UE performs uplink and downlink service transmission with a macro base station and performs uplink service transmission with a micro base station in a first area, and/or performs uplink and downlink service transmission with a micro base station and performs downlink service transmission with a macro base station in a second area. This may minimize uplink interference that is caused by the UE to the micro base station in the first area and minimize downlink interference that is caused by the macro base station to the micro base station in the second area; and further, uplink coverage of the micro base station and downlink coverage of the macro base station may be fully utilized, which improves a throughput rate and reliability of transmission at an edge area of a HetNet.

Further, the sending module 22 is configured to, before sending the instruction information, send active set update signaling to the UE, so that the UE, according to the active set update signaling, adds the micro base station to the first active set when performing service transmission in the first area, and/or adds the macro base station to the third active set when performing service transmission in the second area.

Figure 14:
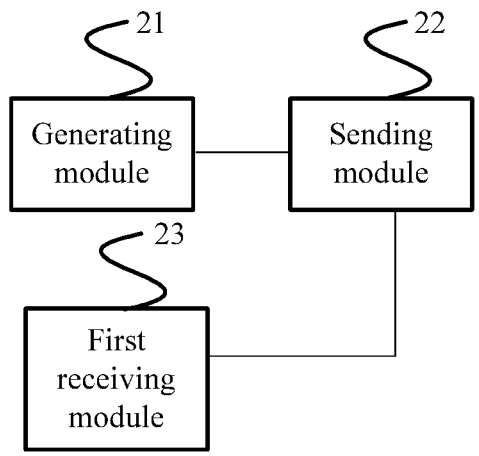
FIG. 14 is a schematic structural diagram of Embodiment 2 of a radio network controller according to the present disclosure.

FIG. 14 is a schematic structural diagram of Embodiment 2 of a radio network controller according to the present disclosure. As shown in FIG. 14, on a basis of the structure of the apparatus shown in FIG. 13, the radio network controller according to this embodiment may further include a first receiving module 23, where the first receiving module 23 is configured to, before the sending module 22 sends the active set update signaling to the UE, receive a first measurement report sent by the UE, where the first measurement report is sent to the RNC when the UE is in a non-soft handover area and when the UE measures that the common pilot channel quality of the micro base station is greater than the preset first threshold value and less than the first condition threshold value for addition to the second active set; or the first measurement report is sent to the RNC when the UE is in a soft handover area corresponding to the second active set and when the UE measures that the common pilot channel quality of the micro base station is less than a third condition threshold value for removal of the micro base station from the second active set and greater than a preset second threshold value.

Further, the first receiving module 23 is further configured to, after the sending module 22 sends the instruction information to the UE, receive a second measurement report sent by the UE, where the second measurement report is sent by the UE to the RNC when the common pilot channel quality of the micro base station is greater than the first condition threshold value for addition to the second active set. The sending module 22 is further configured to send first control information to the UE, so that the UE adds the micro base station to the second active set according to an instruction of the first control information.

Alternatively, the first receiving module 23 is further configured to, after the sending module 22 sends the instruction information to the UE, receive a second measurement report sent by the UE, where the second measurement report is sent by the UE to the RNC when the common pilot channel quality of the micro base station is less than the second threshold value. The sending module 22 is further configured to send second control information to the UE, so that the UE removes the micro base station from the first active set according to the second control information.

Figure 15:
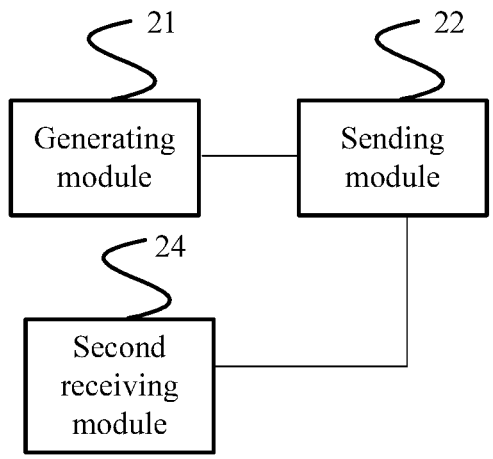
FIG. 15 is a schematic structural diagram of Embodiment 3 of a radio network controller according to the present disclosure.

FIG. 15 is a schematic structural diagram of Embodiment 3 of a radio network controller according to the present disclosure. As shown in FIG. 15, on a basis of the structure of the apparatus shown in FIG. 13, the radio network controller according to this embodiment may further include a second receiving module 24, where the second receiving module 24 is configured to, before the sending module 22 sends the active set update signaling to the UE, receive a third measurement report sent by the UE, where the third measurement report is sent by the UE to the RNC when the UE is in a non-soft handover area and when the UE measures that the common pilot channel quality of the macro base station is greater than the preset third threshold value and less than the second condition threshold value for addition to the second active set, or the third measurement report is sent by the UE to the RNC when the UE is in a soft handover area corresponding to the second active set and when the UE measures that the common pilot channel quality of the macro base station is less than a fourth condition threshold value for removal of the macro base station from the second active set and greater than a preset fourth threshold value.

Further, the second receiving module 24 is configured to, after the sending module 22 sends the instruction information to the UE, receive a fourth measurement report sent by the UE, where the fourth measurement report is sent by the UE to the RNC when the common pilot channel quality of the macro base station is greater than the second condition threshold value for addition to the second active set. The sending module 22 is further configured to send third control information to the UE, so that the UE adds the macro base station to the second active set according to the third control information.

Alternatively, the second receiving module 24 is further configured to, after the sending module 22 sends the instruction information to the UE, receive a fourth measurement report sent by the UE, where the fourth measurement report is sent by the UE to the RNC when the common pilot channel quality of the macro base station is less than the fourth threshold value. The sending module 22 is further configured to send fourth control information to the UE, so that the UE removes the macro base station from the third active set according to the fourth control information.

The radio network controller shown in FIGS. 14 and 15 may be configured to execute the technical solution in the method embodiment shown in FIG. 5, and implementation principles of the radio network controller are similar and are not described herein again.

According to the radio network controller provided by the embodiments shown in FIG. 14 and FIG. 15, a sending module sends active set update signaling to a UE, so that the UE adds a micro base station to a first active set after receiving the active set update signaling, and then the UE performs service transmission according to instruction information sent by the sending module and an active set on which addition is performed; and/or, a sending module sends active set update signaling to a UE, so that the UE adds a macro base station to a third active set after receiving the active set update signaling, and then the UE performs service transmission according to instruction information sent by the sending module and an active set on which addition is performed. This may minimize uplink interference that is caused by the UE to the micro base station in a first area and minimize downlink interference that is caused by the macro base station to the micro base station in a second area; and further, uplink coverage of the micro base station and downlink coverage of the macro base station may be fully utilized, which improves a throughput rate and reliability of transmission at an edge area of a HetNet.

Figure 16:
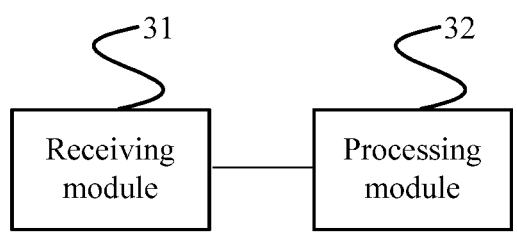
FIG. 16 is a schematic structural diagram of Embodiment 1 of a micro base station according to the present disclosure.

FIG. 16 is a schematic structural diagram of Embodiment 1 of a micro base station according to the present disclosure. As shown in FIG. 16, the micro base station according to this embodiment may include a receiving module 31 and a processing module 32, where: the receiving module 31 is configured to receive configuration information sent by an RNC in an access network, where the configuration information is used to instruct the micro base station to receive an uplink DCH and/or uplink E-DCH service sent by a UE; and the processing module 32 is configured to receive, in a first active set according to the configuration information after the micro base station is added by the UE to the first active set when the UE performs service transmission in a first area, the uplink DCH and/or uplink E-DCH service sent by the UE, where the first area is an area in which common pilot channel quality of the micro base station is between common pilot channel quality of the micro base station that reaches a first threshold value for addition to the first active set and common pilot channel quality of the micro base station that reaches a first condition threshold value for addition to a second active set, and the common pilot channel quality of the micro base station is obtained by the UE in the first area by means of measurement.

The first active set includes an extended DCH active set and/or an extended E-DCH active set, where the extended DCH active set supports the UE to send an uplink DCH service, a micro base station in the extended DCH active set receives the uplink DCH service sent by the UE, the extended E-DCH active set supports the UE to send an E-DCH service, and a micro base station in the extended E-DCH active set receives the E-DCH service sent by the UE. In the first active set, the UE may receive and calculate an LLR of a DCH service of a macro base station in the first active set, and input the LLR as a Viterbi decoder to perform Viterbi decoding.

The micro base station according to this embodiment may be configured to execute the technical solution in the method embodiment shown in FIG. 6, and implementation principles of the micro base station are similar and are not described herein again.

According to the micro base station provided by this embodiment, a receiving module receives configuration information sent by an RNC, and after the micro base station is added by a UE to a first active set when the UE performs service transmission in a first area, a processing module receives, in a first active set according to the configuration information, an uplink DCH and/or uplink E-DCH service sent by the UE. This may minimize uplink interference that is caused by the UE to the micro base station in the first area; further, uplink coverage of the micro base station may be fully utilized, which improves a throughput rate and reliability of transmission at an edge area of a HetNet.

Figure 17:
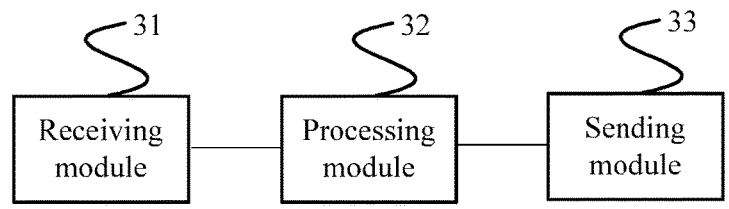
FIG. 17 is a schematic structural diagram of Embodiment 2 of a micro base station according to the present disclosure.

FIG. 17 is a schematic structural diagram of Embodiment 2 of a micro base station according to the present disclosure. As shown in FIG. 17, on a basis of the structure of the apparatus shown in FIG. 16, the micro base station according to this embodiment may further include a sending module 33, where if a service received by the micro base station is a DCH service, the sending module 33 is configured to send a TPC to the UE, where the TPC is used to adjust uplink transmit power of the UE.

If a service received by the micro base station is an E-DCH service, the sending module 33 is configured to send a TPC, an E-RGCH, and an E-HICH to the UE, where the TPC is used to adjust uplink transmit power of the UE, the E-RGCH is used to adjust a scheduling grant value obtained by the UE, and the E-HICH is used to feed back to the UE whether the micro base station correctly receives data of the UE.

Figure 18:
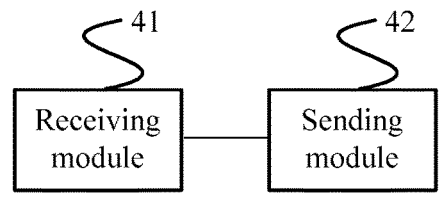
FIG. 18 is a schematic structural diagram of Embodiment 1 of a macro base station according to the present disclosure.

FIG. 18 is a schematic structural diagram of Embodiment 1 of a macro base station according to the present disclosure. As shown in FIG. 18, the macro base station according to this embodiment may include a receiving module 41 and a sending module 42, where the receiving module 41 is configured to receive configuration information sent by an RNC in an access network, where the configuration information is used to instruct the macro base station to send a downlink DCH service to a UE; and the sending module 42 is configured to send, in a third active set according to the configuration information after the macro base station is added by the UE to the third active set when the UE performs service transmission in a second area, the downlink DCH service to the UE, where the second area is an area in which common pilot channel quality of the macro base station is between common pilot channel quality of the macro base station that reaches a third threshold value for addition to the third active set and common pilot channel quality of the macro base station that reaches a second condition threshold value for addition to a second active set, and the common pilot channel quality of the macro base station is obtained by the UE in the second area by means of measurement.

The third active set includes an extended DCH active set, where the extended DCH active set supports a macro base station in the third active set to send a downlink DCH service, and the UE receives the downlink DCH service sent by the macro base station in the third active set. In the third active set, the UE may receive an E-HICH sent by a micro base station in the third active set; the UE transmits new data on an E-DCH if the E-HICH indicates an ACK, or the UE retransmits data on the E-DCH if the E-HICH indicates an NACK and a maximum quantity of retransmissions is not reached.

Further, the receiving module 41 is configured to, after the sending module sends, in the third active set according to the configuration information, the downlink DCH service to the UE, receive an uplink TPC sent by the UE, where the TPC is used to control transmit power of the downlink DCH service.

The macro base station according to this embodiment may be configured to execute the technical solution in the method embodiment shown in FIG. 7, and implementation principles of the macro base station are similar and are not described herein again.

According to the macro base station provided by this embodiment, a receiving module receives configuration information sent by an RNC, and after the macro base station is added by a UE to a third active set when the UE performs service transmission in a second area, a sending module sends, in the third active set according to the configuration information, a downlink DCH service to the UE. This may minimize downlink interference that is caused by the macro base station to a micro base station in the second area; further, downlink coverage of the macro base station may be fully utilized, which improves a throughput rate and reliability of transmission at an edge area of a HetNet.

An access network system provided by an embodiment includes the user equipment shown in any one of FIG. 10 to FIG. 12, the radio network controller shown in any one of FIG. 13 to FIG. 15, the micro base station shown in FIG. 16 or FIG. 17, and the macro base station shown in FIG. 18.

With reference to FIG. 1, in area B shown in the figure, downlink reception on a UE for a macro base station is better than that for a micro base station in this area, where an HSDPA serving cell is the macro base station; but on an uplink, a path loss from the UE to the micro base station is less than a path loss from the UE to the macro base station, and reception on the micro base station for the UE is better than that on the macro base station; however, a serving cell of the UE is the macro base station. In this case, the micro base station is relatively idle on the uplink and has a larger uplink capacity. Therefore, throughput performance on a network uplink is poor. Moreover, the UE has not entered a soft handover (SHO) area and the micro base station cannot perform power control on the UE; as a result, receive power on the micro base station for an uplink service of the UE is excessively high, which causes uplink interference to the micro base station.

In addition, because of base station deployment environments, for example, factors such as buildings and terrain blocking, a scenario of unbalanced uplink and downlink similar to that in a heterogeneous network may be caused between two macro base stations. The foregoing problem also exists in this scenario.

Based on the foregoing problem, an embodiment of the present disclosure further provides a network communications method, which may make good use of uplink coverage of a micro base station to improve a throughput rate and reliability of transmission at an edge area in a HetNet, and may also reduce uplink interference that is caused to the micro base station when a UE, in area B shown in the figure, performs service transmission in a HetNet.

Figure 19:
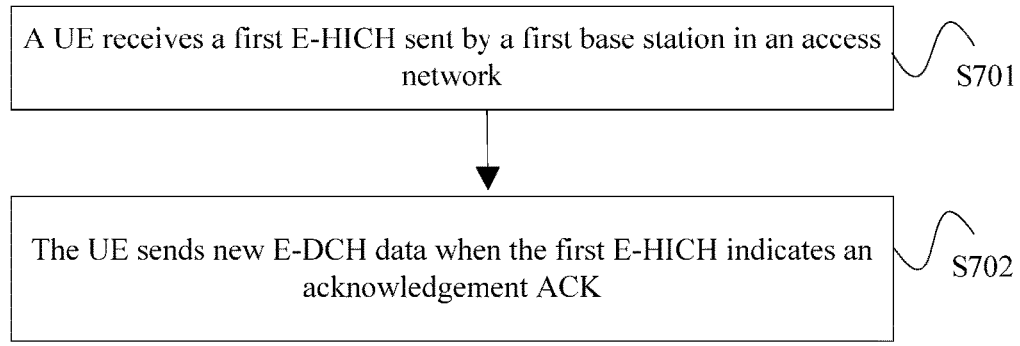
FIG. 19 is a flowchart of Embodiment 9 of a network communications method according to the present disclosure.

FIG. 19 is a flowchart of Embodiment 9 of a network communications method according to the present disclosure. This embodiment is described by using an example in which a UE is an execution body. As shown in FIG. 19, the method according to this embodiment may include the following.

S701. The UE receives a first enhanced dedicated channel hybrid automatic repeat request indicator channel (E-HICH) sent by a first base station in an access network, where the first base station is located within a detection range of the UE and is not in an enhanced dedicated channel E-DCH active set of the UE.

The first base station may be any micro base station or macro base station in the access network. The macro base station herein refers to that, for two macro base stations affected by conditions such as surrounding environments and building blocking, a case similar to that of a macro base station and a micro base station in a heterogeneous network may be caused; in this case, one of the two macro base station is similar to a micro base station in the heterogeneous network. The first base station in the access network is not in the E-DCH active set of the UE, that is, the UE has not entered an SHO area (for example, in area B shown in FIG. 1). The E-HICH may carry an acknowledgement (ACK) or a negative acknowledgement (NACK), where the ACK represents that a base station correctly receives an E-DCH service in a previous process, and the NACK represents that a base station fails to receive an E-DCH service in a previous process. After receiving an ACK, the UE sends new data in a next process; if an NACK is received, the UE retransmits data in a next process, and if the data is not sent successfully when a maximum quantity of retransmissions is reached, the UE also sends new data. If the UE receives E-HICHs of a plurality of cells, the UE transmits new data provided that one E-HICH indicates an ACK. The UE retransmits previously sent E-DCH data only when all E-HICHs indicate an NACK.

S702. The UE sends new E-DCH data when the first E-HICH indicates an ACK.

After the UE receives the first E-HICH sent by the first base station, if the received first E-HICH sends an ACK indicating to the UE that the first base station correctly received an E-DCH service sent by the UE, and then the UE sends new E-DCH data.

In area B in a heterogeneous network and a similar environment, because quality of an uplink channel from the UE to the first base station is better than quality of an uplink channel from the UE to another base station (for example, a macro base station), it is more probable that the first base station correctly receives the E-DCH data sent by the UE. Therefore, the first base station may be used to receive new E-DCH data sent by the UE and then send the new E-DCH data in an uplink direction to an RNC. By using the technical solution in the present disclosure, more E-HICHs feed back an ACK to the UE. This reduces a case in which all E-HICHs of the UE feed back an NACK, reduces a quantity of times that the UE retransmits E-DCH, and improves E-DCH transmission efficiency.

When the first E-HICH indicates a NACK, the UE retransmits E-DCH data.

That the first base station is located within a detection range of the UE includes that downlink pilot quality that is of the first base station and measured by the UE is greater than a preset first threshold value. The first threshold value refers to a minimum value of pilot quality at which the UE correctly decodes the E-HICH sent by the first base station.

Further, before the UE receives the first E-HICH sent by the first base station, the method may further include the following.

S703. The UE receives first instruction signaling sent by an RNC, where the first instruction signaling is used to instruct the UE to receive the first E-HICH sent by the first base station, and the first instruction signaling includes a channelization code and a signature sequence of the first E-HICH, where the channelization code is used to indicate a spreading code to be used by the UE to decode a channel occupied by the first E-HICH, and the signature sequence is used to indicate an orthogonal sequence to be used by the UE to decode each E-HICH subframe.

The channelization code is used in a Wideband Code Division Multiple Access system (WCDMA) to distinguish a plurality of channels of air interfaces. Because channelization codes are orthogonal to each other, in a case that is free of multipath interference and intersymbol interference, no mutual interference occurs between channels on which spreading transmission is performed by using different channelization codes, which produces good performance. When receiving a signal, a receiver first despreads the signal by using a channelization code, and the receiver may correctly obtain data by despreading only when a channelization code for despreading is a channelization code for spreading. The signature sequence is used to distinguish users. A user may obtain, from a channel by means of decoding, data that is sent to the user only by decoding an E-HICH and an enhanced dedicated channel relative grant channel (E-RGCH) by using the signature sequence of the user.

Further, the first instruction signaling includes timing information of the first E-HICH, where the timing information of the first E-HICH is used to indicate a start time location for the UE to receive each subframe of the first E-HICH. The UE may determine a start location of the E-HICH on each subframe according to the timing information, so as to correctly receive and decode information on the E-HICH.

The timing information of the first E-HICH may be a timing offset $\tau_{F\text{-}DPCH}$ and/or a symbol location of a fractional downlink physical channel (F-DPCH) of the first base station. For example, a reference channel is a primary common control physical channel (P-CCPCH), and a timing offset is $\tau_{F\text{-}DPCH,n}$, which indicates that each F-DPCH frame/subframe is $\tau_{F\text{-}DPCH,n}$ later than the P-CCPCH. Channel timing of the first E-HICH may be known by using the timing offset $\tau_{F\text{-}DPCH,n}$ of the F-DPCH.

In another implementable manner, further, the first instruction signaling may further include: a code channel and a signature sequence of an E-RGCH, where the E-RGCH is used to control E-DCH transmit power of the UE; or a code channel and a signature sequence of an E-RGCH, and timing information of the E-RGCH, where the timing information of the E-RGCH is used to indicate a time when the UE receives the E-RGCH, and the timing information of the E-RGCH is a timing offset $\tau_{F\text{-}DPCH,n}$ and/or a symbol location of a fractional downlink physical channel F-DPCH of the first base station.

The E-DCH transmit power of the UE is controlled by using the E-RGCH. When the E-DCH transmit power of the UE is excessively high, the first base station may send a power-reducing instruction to the UE by using the E-RGCH, which may avoid interference that is caused by excessively high power to the first base station. For example, uplink interference that is caused to a micro base station when the UE, in area B shown in the figure, performs service transmission in a HetNet may be reduced.

In this embodiment, further, before the UE receives the first instruction signaling sent by the RNC, the method may further include the following.

S704. The UE measures common pilot channel quality of each serving cell.

S705. The UE sends a measurement report to the RNC when the UE measures that common pilot channel quality of the first base station is greater than a preset first threshold, so that the RNC sends the first instruction signaling to the UE according to the measurement report.

According to the network communications method provided by this embodiment, when a first base station in an access network is not in an E-DCH active set of a UE, the UE may receive an E-HICH sent by the first base station, so that the UE may send an E-DCH service to the first base station when the UE learns, according to the E-HICH, that the first base station correctly received an E-DCH service sent by the UE. Therefore, uplink coverage of the first base station may be well utilized to improve a throughput rate and reliability of transmission at an edge area of a HetNet; further, uplink interference that is caused to the first base station when the UE, in area B shown in the figure, performs service transmission in a HetNet may be reduced.

Figure 20:
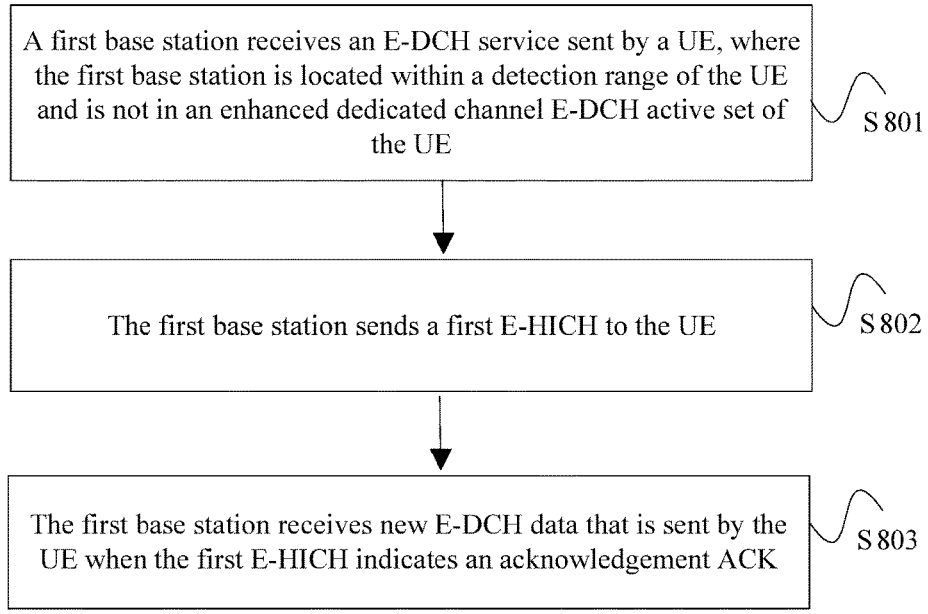
FIG. 20 is a flowchart of Embodiment 10 of a network communications method according to the present disclosure.

FIG. 20 is a flowchart of Embodiment 10 of a network communications method according to the present disclosure. This embodiment is described by using an example in which a base station is an execution body. As shown in FIG. 20, the method according to this embodiment may include the following.

S801. A first base station in an access network receives an E-DCH service sent by a UE, where the first base station is located within a detection range of the UE and is not in an E-DCH active set of the UE.

The first base station may be any micro base station or macro base station in the access network. The macro base station herein refers to that: for two macro base stations affected by conditions such as surrounding environments and building blocking, a case similar to that of a macro base station and a micro base station in a heterogeneous network may be caused; in this case, one macro base station is similar to a micro base station in the heterogeneous network. The first base station in the access network is not in the E-DCH active set of the UE, that is, the UE has not entered an SHO area (for example, in area B shown in FIG. 1).

S802. The first base station sends a first E-HICH to the UE.

S803. The first base station receives new E-DCH data that is sent by the UE when the first E-HICH indicates an ACK.

Alternatively, the first base station receives E-DCH data that is retransmitted by the UE when the first E-HICH indicates a NACK.

The E-HICH may carry an acknowledgement (ACK) or a negative acknowledgement (NACK), where the ACK represents that a base station correctly receives an E-DCH service in a previous process, and the NACK represents that a base station fails to receive an E-DCH service in a previous process. After receiving the ACK, the UE sends new data in a next process; if the NACK is received, the UE retransmits data in a next process, and if the data is not sent successfully when a maximum quantity of retransmissions is reached, the UE also sends new data. If the UE receives E-HICHs of a plurality of cells (an E-DCH active set of the UE has more than one cell), the UE transmits new data provided that one E-HICH indicates an ACK.

That the first base station is located within a detection range of the UE includes that: downlink pilot quality that is of the first base station and measured by the UE is greater than a preset first threshold value. The first threshold value refers to a minimum value of pilot quality at which the UE correctly decodes the E-HICH sent by the first base station.

Further, before the first base station receives the E-DCH service sent by the UE, the method may further include the following.

S804. The first base station receives second instruction signaling sent by an RNC, where the second instruction signaling is used to instruct the first base station to receive the E-DCH service sent by the UE, and the second instruction signaling includes an uplink scrambling code of the UE and a channelization code and a signature sequence of the first E-HICH, where the channelization code is used to indicate a spreading code to be used by the UE to decode a channel occupied by the first E-HICH, and the signature sequence is used to indicate an orthogonal sequence to be used by the UE to decode each E-HICH subframe.

The scrambling code is a series of pseudo random code; on an uplink, a base station distinguishes and identifies users by identifying the scrambling code. The channelization code of the first E-HICH indicates which code channel is used by the first E-HICH sent to the UE. The signature sequence of the first E-HICH indicates a signature sequence used by the UE.

Further, the second instruction signaling includes timing information of the first E-HICH, where the timing information of the first E-HICH is used to indicate a start time location for sending each subframe of the first E-HICH.

The timing information of the first E-HICH is a timing offset $\tau_{F\text{-}DPCH,n}$ and/or a symbol location of a fractional downlink physical channel F-DPCH of the first base station. For example, a reference channel is a P-CCPCH, and a timing offset is $\tau_{F\text{-}DPCH,n}$, which indicates that each F-DPCH frame/subframe is $\tau_{F\text{-}DPCH,n}$ later than the P-CCPCH. Channel timing of the first E-HICH may be known by using the timing offset $\tau_{F\text{-}DPCH,n}$ of the F-DPCH.

In another implementable manner, further, the second instruction signaling further includes a code channel and a signature sequence of an E-RGCH, where the E-RGCH is used to control E-DCH transmit power of the UE; or a code channel and a signature sequence of an E-RGCH, and timing information of the E-RGCH, where the timing information of the E-RGCH is used to indicate a time when the UE receives the E-RGCH, and the timing information of the E-RGCH is a timing offset $\tau_{F\text{-}DPCH,n}$ and/or a symbol location of a fractional downlink physical channel F-DPCH of the first base station.

The E-DCH transmit power of the UE is controlled by using the E-RGCH, which may avoid interference that is caused by excessively high power to the first base station. For example, uplink interference that is caused to a micro base station when the UE, in area B shown in the figure, performs service transmission in a HetNet may be reduced.

In this embodiment, further, before the first base station receives the second instruction signaling sent by the RNC, the method further includes that the first base station sends a receiving capability message to the RNC, where the receiving capability message is used to indicate that the first base station can receive an E-DCH service sent by the UE.

According to the network communications method provided by this embodiment, when a first base station in an access network is not in an E-DCH active set of a UE, the first base station sends an E-HICH to the UE after receiving an E-DCH service sent by the UE, so that the UE may continue to send an E-DCH service to the first base station when the UE learns, according to the E-HICH, that the first base station correctly received the E-DCH service sent by the UE. Therefore, uplink coverage of the first base station may be well utilized to improve a throughput rate and reliability of transmission at an edge area of a HetNet; further, uplink interference that is caused to the first base station when the UE, in area B shown in the figure, performs service transmission in a HetNet may be reduced.

Figure 21:
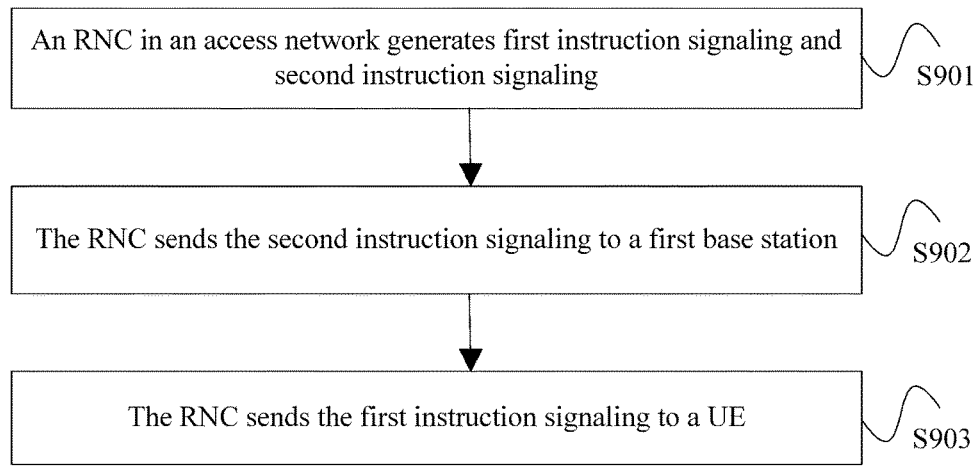
FIG. 21 is a flowchart of Embodiment 11 of a network communications method according to the present disclosure.

FIG. 21 is a flowchart of Embodiment 11 of a network communications method according to the present disclosure. This embodiment is described by using an example in which an RNC is an execution body. As shown in FIG. 21, the method according to this embodiment may include the following.

S901. The RNC in an access network generates first instruction signaling and second instruction signaling, where the first instruction signaling is used to instruct a UE to receive a first enhanced dedicated channel hybrid automatic repeat request indicator channel E-HICH sent by a first base station, the second instruction signaling is used to instruct the first base station to receive an E-DCH service sent by the UE, and the first base station is located within a detection range of the UE and is not in an enhanced dedicated channel E-DCH active set of the UE.

In the first instruction signaling, a channelization code of the first E-HICH indicates to the UE which spreading codes are used by the first E-HICH to perform spreading; and a signature sequence of the first E-HICH indicates a signature sequence used by the UE.

In the second instruction signaling, a scrambling code is a series of pseudo random code; on an uplink, a base station distinguishes and identifies users by identifying the scrambling code. The channelization code of the first E-HICH indicates which code channel is used by the first E-HICH sent to the UE. The signature sequence of the first E-HICH indicates a signature sequence used by the UE.

The first base station may be any micro base station or macro base station in the access network. The macro base station herein refers to that, for two macro base stations affected by conditions such as surrounding environments and building blocking, a case similar to that of a macro base station and a micro base station in a heterogeneous network may be caused; in this case, one macro base station is similar to a micro base station in the heterogeneous network. The first base station in the access network is not in the E-DCH active set of the UE, that is, the UE has not entered an SHO area (for example, in area B shown in FIG. 1). The E-HICH may carry an acknowledgement (ACK) or a negative acknowledgement (NACK), where the ACK represents that a base station correctly receives an E-DCH service in a previous process, and the NACK represents that a base station fails to receive an E-DCH service in a previous process. After receiving an ACK, the UE sends new data in a next process; if an NACK is received, the UE retransmits data in a next process, and if the data is not sent successfully when a maximum quantity of retransmissions is reached, the UE also sends new data. If the UE receives E-HICHs of a plurality of cells (an E-DCH active set of the UE has more than one cell), the UE transmits new data provided that one E-HICH indicates an ACK.

S902. The RNC sends the second instruction signaling to the first base station, where the second instruction signaling includes an uplink scrambling code of the UE and a channelization code and a signature sequence of the first E-HICH, where the channelization code is used to indicate a spreading code to be used by the UE to decode a channel occupied by the first E-HICH, and the signature sequence is used to indicate an orthogonal sequence to be used by the UE to decode each E-HICH subframe.

A specific sending manner may be that, for example, the second instruction signaling may be sent through an Iub interface between the RNC and a base station. For example, the RNC may send the second instruction signaling by using base station application part signaling (Node B Application Part, (NBAP)).

S903. The RNC sends the first instruction signaling to the UE, where the first instruction signaling includes the channelization code and the signature sequence of the first E-HICH.

A specific sending manner may be that, for example, the RNC sends the first instruction signaling to the UE by using radio resource control signaling (RRC).

That the first base station is located within a detection range of the UE includes that downlink pilot quality that is of the first base station and measured by the UE is greater than a preset first threshold value. The first threshold value refers to a minimum value of pilot quality at which the UE correctly decodes the E-HICH sent by the first base station.

Further, the first instruction signaling may include timing information of the first E-HICH, where the timing information of the first E-HICH is used to indicate a start time location for the UE to receive each subframe of the first E-HICH.

The second instruction signaling further includes timing information of the first E-HICH, where the timing information of the first E-HICH is used to indicate a start time location for sending each subframe of the first E-HICH.

The timing information of the first E-HICH is a timing offset $\tau_{F\text{-}DPCH,n}$ and/or a symbol location of a F-DPCH of the first base station. For example, a reference channel is a P-CCPCH, and a timing offset is $\tau_{F\text{-}DPCH,n}$, which indicates that each F-DPCH frame/subframe is $\tau_{F\text{-}DPCH,n}$ later than the P-CCPCH. Channel timing of the first E-HICH may be known by using the timing offset $\tau_{F\text{-}DPCH,n}$ of the F-DPCH.

In another possible implementation manner, the first instruction signaling and the second instruction signaling further include a code channel and a signature sequence of an E-RGCH, where the E-RGCH is used to control E-DCH transmit power of the UE; or a code channel and a signature sequence of an E-RGCH, and timing information of the E-RGCH, where the timing information of the E-RGCH is used to indicate a time when the UE receives the E-RGCH, and the timing information of the E-RGCH is a timing offset $\tau_{F\text{-}DPCH,n}$ and/or a symbol location of a F-DPCH of the first base station.

The E-DCH transmit power of the UE is controlled by using the E-RGCH, which may avoid interference that is caused by excessively high power to the first base station. For example, uplink interference that is caused to a micro base station when the UE, in area B shown in the figure, performs service transmission in a HetNet may be reduced.

In this embodiment, further, before the RNC generates the first instruction signaling and the second instruction signaling, the method may further include that the RNC receives a measurement report sent by the UE, where the measurement report is sent when the UE measures that common pilot channel quality of the first base station is greater than a preset first threshold.

Further, before the RNC sends the second instruction signaling to the first base station, the method may include that the RNC receives a receiving capability message sent by the first base station, where the receiving capability message is used to indicate that the first base station can receive an E-DCH service sent by the UE.

According to the network communications method provided by this embodiment, when a first base station in an access network is not in an E-DCH active set of a UE, an RNC generates first instruction signaling and second instruction signaling and sends the first instruction signaling and the second instruction signaling respectively to the UE and the first base station, so that the UE may receive an E-HICH sent by the first base station, and the UE may send an E-DCH service to the first base station when the UE learns, according to the E-HICH, that the first base station correctly received an E-DCH service sent by the UE. Therefore, uplink coverage of the first base station may be well utilized to improve a throughput rate and reliability of transmission at an edge area of a HetNet; further, uplink interference that is caused to the first base station when the UE, in area B shown in the figure, performs service transmission in a HetNet may be reduced.

Figure 22:
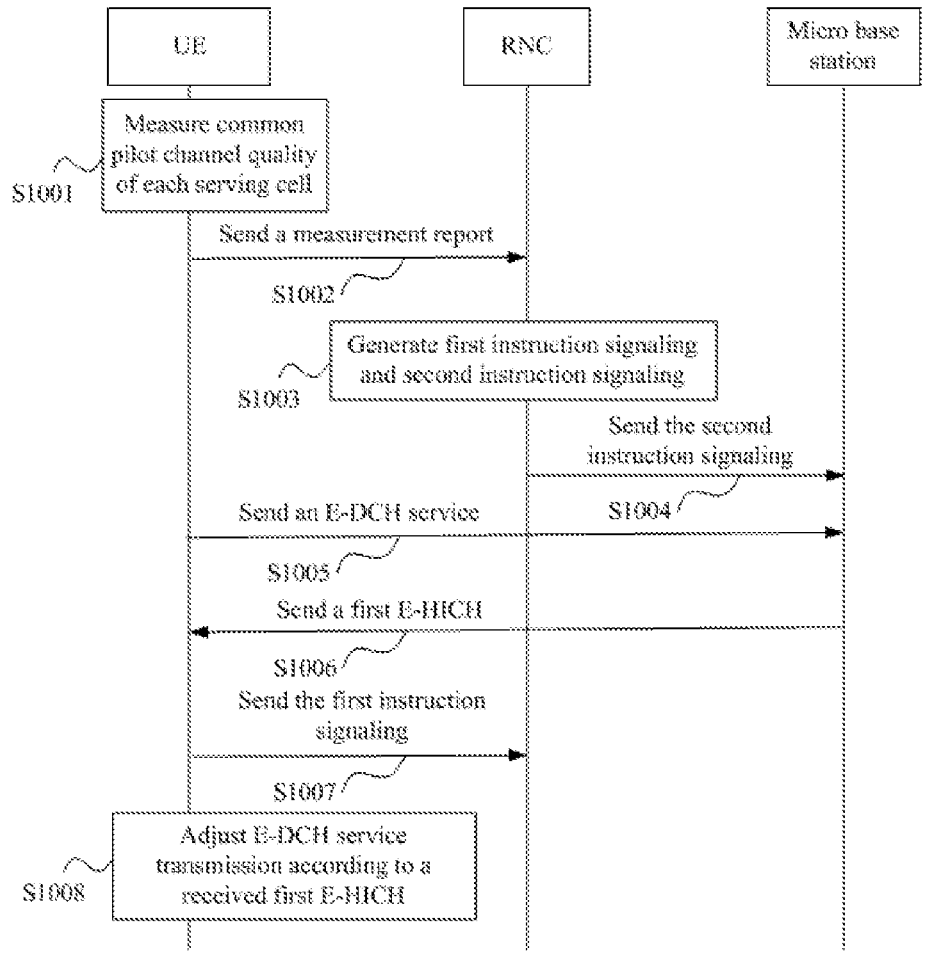
FIG. 22 is an interaction flowchart of Embodiment 12 of a network communications method according to the present disclosure.

FIG. 22 is an interaction flowchart of Embodiment 12 of a network communications method according to the present disclosure. This embodiment is described by using an example in which when a UE has not entered a soft handover area, a serving base station of the UE is a macro base station, and in this case, a micro base station in an access network is not in an E-DCH active set of the UE. As shown in FIG. 22, the method according to this embodiment may include the following.

S1001. The UE measures common pilot channel quality of each serving cell.

S1002. The UE sends a measurement report to an RNC when the UE measures that common pilot channel quality of the micro base station is greater than a preset first threshold.

S1003. The RNC generates first instruction signaling and second instruction signaling after receiving the measurement report.

Further, after S1003, the method may include that the RNC receives a receiving capability message sent by the micro base station, where the receiving capability message is used to indicate that the micro base station can receive an E-DCH service sent by the UE.

S1004. The RNC sends the second instruction signaling to the micro base station.

The second instruction signaling is used to instruct the micro base station to receive an E-DCH service sent by the UE. The second instruction signaling includes an uplink scrambling code of the UE, a channelization code and a signature sequence of a first E-HICH.

Further, the second instruction signaling further includes timing information of the first E-HICH, where the timing information of the first E-HICH is used to indicate a time for sending the first E-HICH. The timing information of the first E-HICH is a timing offset $\tau_{F\text{-}DPCH,n}$ and/or a symbol location of a fractional downlink physical channel F-DPCH of the micro base station.

Further, the first instruction signaling and the second instruction signaling further include a code channel and a signature sequence of an E-RGCH, where the E-RGCH is used to control E-DCH transmit power of the UE; or a code channel and a signature sequence of an E-RGCH, and timing information of the E-RGCH, where the timing information of the E-RGCH is used to indicate a time when the UE receives the E-RGCH, and the timing information of the E-RGCH is a timing offset $\tau_{F\text{-}DPCH,n}$ and/or a symbol location of a fractional downlink physical channel F-DPCH of the micro base station.

The E-DCH transmit power of the UE is controlled by the E-RGCH. When the E-DCH transmit power of the UE is excessively high, the micro base station may send a power-reducing instruction to the UE by using the E-RGCH, which may avoid interference that is caused by excessively high power to the micro base station. For example, uplink interference that is caused to a micro base station when the UE, in area B shown in the figure, performs service transmission in a HetNet may be reduced.

S1005. The UE sends an E-DCH service to the micro base station.

S1006. The micro base station sends a first E-HICH to the UE after receiving the E-DCH service.

S1007. The RNC sends the first instruction signaling to the UE.

The first instruction signaling is used to instruct the UE to receive the first E-HICH sent by the micro base station, where the first E-HICH is used to indicate to the UE whether the micro base station correctly receives the E-DCH service sent by the UE. The first instruction signaling includes the channelization code and the signature sequence of the first E-HICH.

Further, the first instruction signaling includes the timing information of the first E-HICH, where the timing information of the first E-HICH is used to indicate a time for the UE to receive the first E-HICH.

The timing information of the first E-HICH may be a timing offset $\tau_{F\text{-}DPCH}$ and/or a symbol location of an F-DPCH of the micro base station.

Further, the first instruction signaling may include the code channel and the signature sequence of the E-RGCH, where the E-RGCH is used to control E-DCH transmit power of the UE; or the code channel and the signature sequence of the E-RGCH, and the timing information of the E-RGCH, where the timing information of the E-RGCH is used to indicate a time when the UE receives the E-RGCH, and the timing information of the E-RGCH is a timing offset $\tau_{F\text{-}DPCH,n}$ and/or a symbol location of a fractional downlink physical channel F-DPCH of the micro base station.

S1008. The UE adjust E-DCH service transmission according to the received first E-HICH.

This embodiment is also applicable to, for two macro base stations affected by conditions such as surrounding environments and building blocking, a case similar to that of a macro base station and a micro base station in a heterogeneous network may be caused; in this case, one macro base station is similar to the micro base station in this embodiment.

Figure 23:
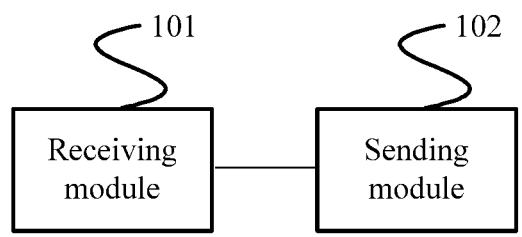
FIG. 23 is a schematic structural diagram of Embodiment 4 of a user equipment according to the present disclosure.

FIG. 23 is a schematic structural diagram of Embodiment 4 of a user equipment according to the present disclosure. As shown in FIG. 23, the user equipment according to this embodiment may include a receiving module 101 and a sending module 102, where the receiving module 101 is configured to receive a first E-HICH sent by a first base station in an access network, where the first base station is located within a detection range of the UE and is not in an E-DCH active set of the UE; and the sending module 102 is configured to send new E-DCH data when the first E-HICH indicates an ACK.

The sending module 102 is further configured to retransmit E-DCH data when the first E-HICH indicates a NACK.

That the first base station is located within a detection range of the UE includes that the downlink pilot quality that is of the first base station and measured by the UE is greater than a preset first threshold value.

Further, the receiving module 101 is configured to, before receiving the first E-HICH sent by the first base station, receive first instruction signaling sent by an RNC, where the first instruction signaling includes a channelization code and a signature sequence of the first E-HICH, where the channelization code is used to indicate a spreading code to be used by the UE to decode a channel occupied by the first E-HICH, and the signature sequence is used to indicate an orthogonal sequence to be used by the UE to decode each E-HICH subframe.

The first instruction signaling may further include timing information of the first E-HICH, where the timing information of the first E-HICH is used to indicate a start time location for the UE to receive each subframe of the first E-HICH. The timing information of the first E-HICH may be a timing offset $\tau_{F\text{-}DPCH,n}$ and/or a symbol location of a fractional downlink physical channel F-DPCH of the first base station.

Further, the first instruction signaling includes a code channel and a signature sequence of an E-RGCH, where the E-RGCH is used to control E-DCH transmit power of the UE; or a code channel and a signature sequence of an E-RGCH, and timing information of the E-RGCH, where the timing information of the E-RGCH is used to indicate a time when the UE receives the E-RGCH.

The timing information of the E-RGCH is a timing offset $\tau_{F\text{-}DPCH,n}$ and/or a symbol location of a F-DPCH of the first base station.

Further, the user equipment includes a processing module configured to measure common pilot channel quality of each serving cell before the receiving module 101 receives the first instruction signaling sent by the RNC. The sending module 102 is further configured to send a measurement report to the RNC when the processing module measures that common pilot channel quality of the first base station is greater than a preset first threshold, so that the RNC sends the first instruction signaling to the UE according to the measurement report.

The user equipment in this embodiment may be used to implement the technical solution in the method embodiment shown in FIG. 19, and implementation principles of the user equipment are similar and are not described herein again.

According to the user equipment provided by this embodiment, when a first base station in an access network is not in an E-DCH active set of a UE, the UE may receive an E-HICH sent by the first base station, so that the UE may send an E-DCH service to the first base station when the UE learns, according to the E-HICH, that the first base station correctly received an E-DCH service sent by the UE. Therefore, uplink coverage of the first base station may be well utilized to improve a throughput rate and reliability of transmission at an edge area of a HetNet; further, uplink interference that is caused to the first base station when the UE, in area B shown in the figure, performs service transmission in a HetNet may be reduced.

Figure 24:
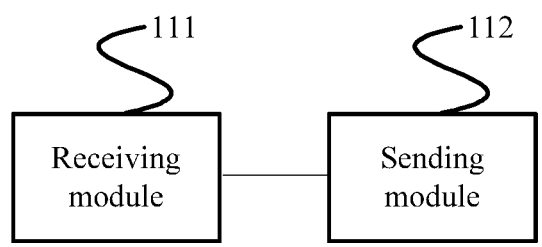
FIG. 24 is a schematic structural diagram of Embodiment 1 of a base station according to the present disclosure.

FIG. 24 is a schematic structural diagram of Embodiment 1 of a base station according to the present disclosure. As shown in FIG. 24, the base station according to this embodiment may include a receiving module 111 and a sending module 112, where the receiving module 111 is configured to receive an E-DCH service sent by a UE, where the base station is located within a detection range of the UE and is not in an E-DCH active set of the UE; and the sending module 112 is configured to send a first E-HICH to the UE. The receiving module 111 is further configured to receive new E-DCH data that is sent by the UE when the first E-HICH indicates an ACK.

The receiving module is further configured to receive E-DCH data that is retransmitted by the UE when the first E-HICH indicates a NACK.

That the base station is located within a detection range of the UE includes that downlink pilot quality that is of the base station and measured by the UE is greater than a preset first threshold value.

Further, the receiving module 111 is configured to, before receiving the E-DCH service sent by the UE, receive second instruction signaling sent by an RNC, where the second instruction signaling is used to instruct the first base station to receive the E-DCH service sent by the UE, and the second instruction signaling includes an uplink scrambling code of the UE and a channelization code and a signature sequence of the first E-HICH, where the channelization code is used to indicate a spreading code to be used by the UE to decode a channel occupied by the first E-HICH, and the signature sequence is used to indicate an orthogonal sequence to be used by the UE to decode each E-HICH subframe.

The second instruction signaling may further include timing information of the first E-HICH, where the timing information of the first E-HICH is used to indicate a start time location for sending each subframe of the first E-HICH. The timing information of the first E-HICH may be a timing offset $\tau_{F\text{-}DPCH,n}$ and/or a symbol location of a F-DPCH of the first base station.

Further, the second instruction signaling may include a code channel and a signature sequence of an E-RGCH, where the E-RGCH is used to control E-DCH transmit power of the UE; or a code channel and a signature sequence of an E-RGCH, and timing information of the E-RGCH, where the timing information of the E-RGCH is used to indicate a time when the UE receives the E-RGCH.

The timing information of the E-RGCH is a timing offset $\tau_{F\text{-}DPCH,n}$ and/or a symbol location of an F-DPCH of the first base station.

In this embodiment, the sending module 112 is further configured to send a receiving capability message to the RNC before the receiving module 111 receives the second instruction signaling sent by the RNC, where the receiving capability message is used to indicate that the first base station can receive an E-DCH service sent by the UE.

The base station according to this embodiment may be configured to execute the technical solution in the method embodiment shown in FIG. 20, and implementation principles of the base station are similar and are not described herein again.

According to the base station provided by this embodiment, when a first base station in an access network is not in an E-DCH active set of a UE, a sending module sends an E-HICH to the UE after a receiving module receives an E-DCH service sent by the UE, so that the sending module may continuously send an E-DCH service to the first base station when the UE learns, according to the E-HICH, that the first base station correctly received the E-DCH service sent by the UE. Therefore, uplink coverage of the first base station may be well utilized to improve a throughput rate and reliability of transmission at an edge area of a HetNet; further, uplink interference that is caused to the first base station when the UE, in area B shown in the figure, performs service transmission in a HetNet may be reduced.

Figure 25:
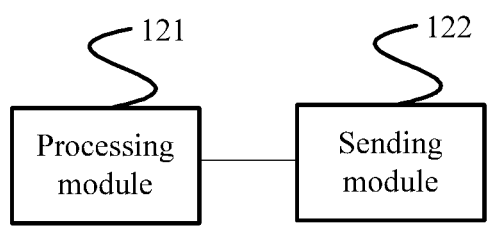
FIG. 25 is a schematic structural diagram of Embodiment 4 of a radio network controller according to the present disclosure.

FIG. 25 is a schematic structural diagram of Embodiment 4 of a radio network controller according to the present disclosure. As shown in FIG. 25, the radio network controller according to this embodiment may include a processing module 121 and a sending module 122, where the processing module 121 is configured to generate first instruction signaling and second instruction signaling, where the first instruction signaling is used to instruct a UE to receive a first E-HICH sent by a first base station, the second instruction signaling is used to instruct the first base station to receive an E-DCH service sent by the UE, and the first base station is located within a detection range of the UE and is not in an E-DCH active set of the UE; and the sending module 122 is configured to send the second instruction signaling to the first base station, where the second instruction signaling includes an uplink scrambling code of the UE and a channelization code and a signature sequence of the first E-HICH, where the channelization code is used to indicate a spreading code to be used by the UE to decode a channel occupied by the first E-HICH, and the signature sequence is used to indicate an orthogonal sequence to be used by the UE to decode each E-HICH subframe. The sending module 122 is further configured to send the first instruction signaling to the UE, where the first instruction signaling includes the channelization code and the signature sequence of the first E-HICH.

That the first base station is located within a detection range of the UE includes that the downlink pilot quality that is of the first base station and measured by the UE is greater than a preset first threshold value.

The first instruction signaling may further include: timing information of the first E-HICH, where the timing information of the first E-HICH is used to indicate a start time location for the UE to receive each subframe of the first E-HICH.

The second instruction signaling may further include the timing information of the first E-HICH, where the timing information of the first E-HICH is used to indicate a start time location for sending each subframe of the first E-HICH. The timing information of the first E-HICH may be a timing offset $\tau_{F\text{-}DPCH,n}$ and/or a symbol location of a F-DPCH of the first base station.

Further, the first instruction signaling and the second instruction signaling may include a code channel and a signature sequence of an E-RGCH, where the E-RGCH is used to control E-DCH transmit power of the UE; or a code channel and a signature sequence of an E-RGCH, and timing information of the E-RGCH, where the timing information of the E-RGCH is used to indicate a time when the UE receives the E-RGCH. The timing information of the E-RGCH may be a timing offset $\tau_{F\text{-}DPCH,n}$ and/or a symbol location of a F-DPCH of the first base station.

Further, the RNC may include a receiving module, where the receiving module is configured to, before the processing module 121 generates the first instruction signaling and the second instruction signaling, receive a measurement report sent by the UE, where the measurement report is sent when the UE measures that common pilot channel quality of the first base station is greater than a preset first threshold.

In this embodiment, the receiving module is further configured to, before the sending module 122 sends the second instruction signaling to the first base station, receive a receiving capability message sent by the first base station, where the receiving capability message is used to indicate that the first base station can receive an E-DCH service sent by the UE.

The RNC according to this embodiment may be configured to execute the technical solution in the method embodiment shown in FIG. 21, and implementation principles of the RNC are similar and are not described herein again.

According to the RNC provided by this embodiment, when a first base station in an access network is not in an E-DCH active set of a UE, a sending module respectively sends first instruction signaling and second instruction signaling to the UE and the first base station after a processing module generates the first instruction signaling and the second instruction signaling, so that the UE may receive an E-HICH sent by the first base station, and the UE may send an E-DCH service to the first base station when the UE learns, according to the E-HICH, that the first base station correctly received an E-DCH service sent by the UE. Therefore, uplink coverage of the first base station may be well utilized to improve a throughput rate and reliability of transmission at an edge area of a HetNet; further, uplink interference that is caused to the first base station when the UE, in area B shown in the figure, performs service transmission in a HetNet may be reduced.

Figure 26:
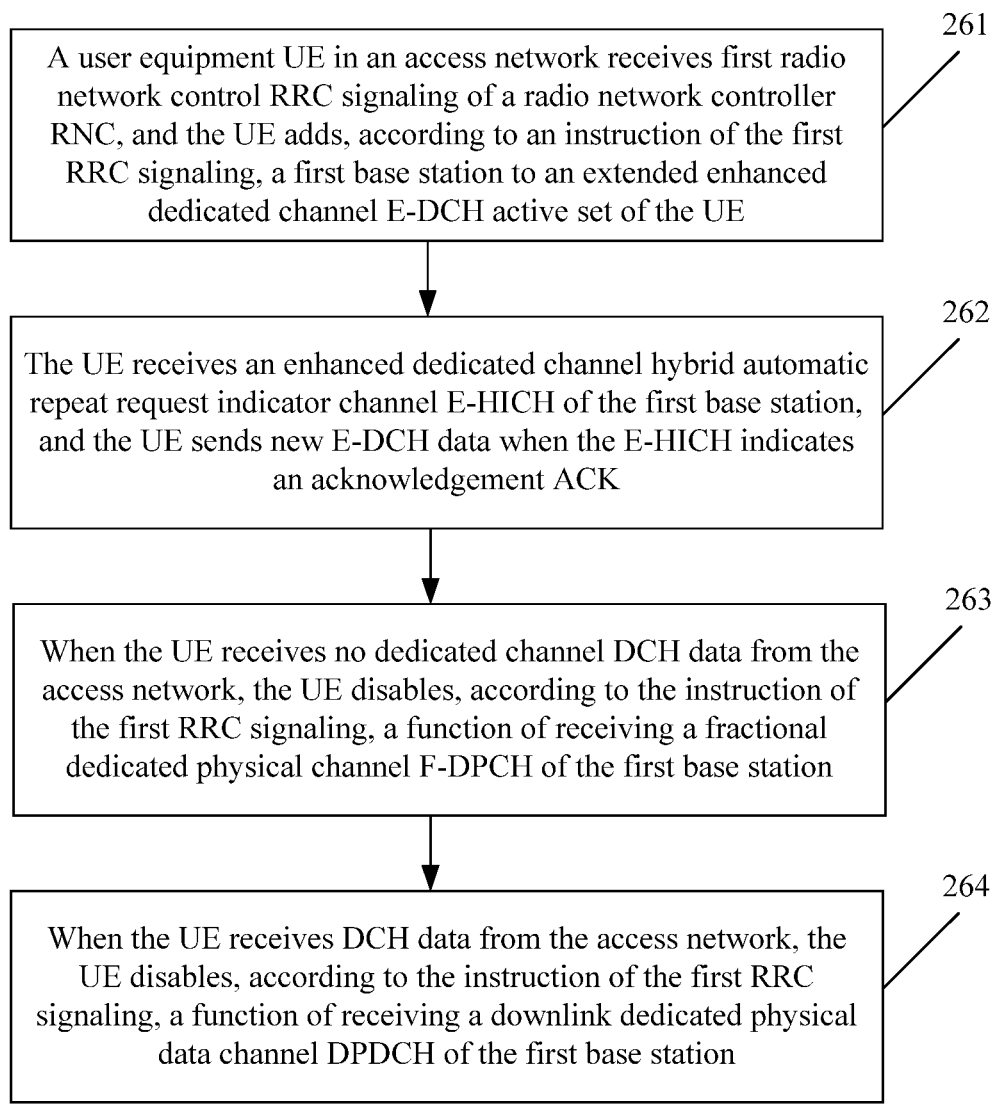
FIG. 26 is a flowchart of another embodiment of a network communications method according to the present disclosure.

As shown in FIG. 26, an embodiment of the present disclosure further provides a network communications method, which includes the following.

S261. A UE in an access network receives first RRC signaling of a RNC, and the UE adds, according to an instruction of the first RRC signaling, a first base station to an extended enhanced dedicated channel E-DCH active set of the UE.

S262. The UE receives an E-HICH of the first base station, and the UE sends new E-DCH data when the E-HICH indicates an ACK.

S263. When the UE receives no DCH data from the access network, the UE disables, according to the instruction of the first RRC signaling, a function of receiving a F-DPCH of the first base station, where the RNC completes the instruction by removing configuration information of the F-DPCH from the first RRC signaling or by using a preset indication field in the first RRC signaling.

S264. When the UE receives DCH data from the access network, the UE disables, according to the instruction of the first RRC signaling, a function of receiving a downlink DPDCH of the first base station, where the RNC completes the instruction by removing configuration information of a DPCH from the first RRC signaling or by using a preset indication field in the first RRC signaling.

In the embodiments of the present disclosure, existing signaling, for example, the foregoing first RRC signaling, may be modified, and some fields or configuration information therein may be removed to instruct the UE to skip executing a function related to the field or configuration information. Certainly, the instruction may also be implemented by adding an indication field to the existing first RRC signaling, or the first RRC signaling may be newly defined signaling and an indication field may be added thereto to implement the instruction.

In an implementation manner, when the UE receives DCH data from the access network, the method further includes receiving, by the UE, an F-DPCH of the first base station according to the instruction of the first RRC signaling, where the F-DPCH is used to perform transmit power control on the UE.

In another implementation manner, when the UE receives DCH data from the access network, the method further includes disabling, by the UE, a function of receiving a downlink DPCCH sent by the first base station.

In another implementation manner, after the UE adds the first base station to the E-DCH active set of the UE, the method further includes receiving, by the UE, first control signaling sent by a network; and receiving an F-DPCH of the first base station according to an instruction of the first control signaling; or receiving a downlink DPDCH sent by the first base station, where the downlink DPDCH is used to carry DCH data received by the UE from the first base station.

In another implementation manner, the receiving, by the UE, a downlink DPDCH sent by the first base station further includes receiving, by the UE, a downlink DPCCH of the first base station, where the downlink DPCCH is used by the first base station to send physical layer control signaling to the UE.

In another implementation manner, the first control signaling sent by the network includes second RRC signaling sent by the RNC; or first physical layer signaling sent by a second base station in the access network, where the second base station is in the E-DCH active set or a DCH active set of the UE.

In another implementation manner, before the receiving, by the UE, first control signaling sent by a network, the method further includes measuring, by the UE, common pilot channel quality of each cell; and sending, by the UE, a measurement report to the RNC when the UE measures that common pilot channel quality of the first base station is greater than a preset first threshold, so that the RNC sends the second RRC signaling to the UE according to the measurement report, or so that the RNC instructs the second base station to send the first physical layer signaling to the UE.

In another implementation manner, before the receiving, by the UE, an F-DPCH of the first base station, the method further includes receiving, by the UE, configuration information of the F-DPCH of the first base station, where the configuration information includes at least one of a channelization code, a frame offset, and a timeslot format of the F-DPCH.

In another implementation manner, where the configuration information of the F-DPCH of the first base station is carried in the first control signaling.

In another implementation manner, before the receiving, by the UE, a downlink DPDCH of the first base station, the method further includes receiving, by the UE, configuration information of the downlink DPCH of the first base station, where the configuration information of the downlink DPCH includes information about a channelization code or a frame offset of the DPCH.

In another implementation manner, the configuration information of the downlink DPCH is carried in the first control signaling.

Figure 27:
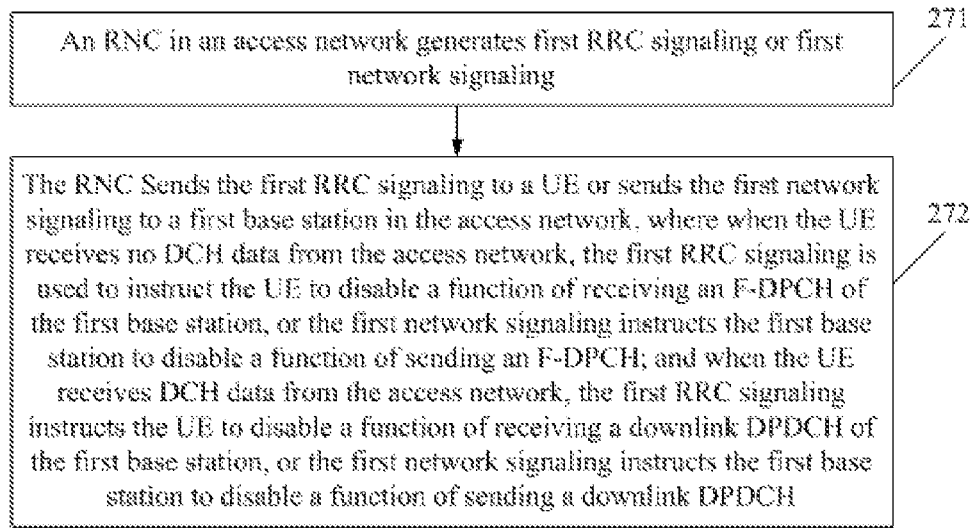
FIG. 27 is a flowchart of another embodiment of a network communications method according to the present disclosure.

As shown in FIG. 27, an embodiment of the present disclosure further provides a network communications method, which includes the following.

S271. An RNC in an access network generates first RRC signaling or first network signaling.

S272. The RNC sends the first RRC signaling to a UE or sends the first network signaling to a first base station in the access network, where the first RRC signaling is used to instruct the UE to add the first base station to an E-DCH active set of the UE, and instruct the UE to receive an E-HICH of the first base station, and the first network signaling is used to instruct the first base station to receive E-DCH data sent by the UE, and instruct the first base station to send the E-HICH to the UE, where when the UE receives no DCH data from the access network, the first RRC signaling instructs the UE to disable a function of receiving an F-DPCH of the first base station, where the RNC completes the instruction by removing configuration information of the F-DPCH from the first RRC signaling or by setting a preset indication field in the first RRC signaling; or the first network signaling instructs the first base station to disable a function of sending an F-DPCH, where the RNC completes the instruction by removing configuration information of the F-DPCH from the first network signaling or by setting a preset indication field in the first network signaling; and when the UE receives DCH data from the access network, the first RRC signaling instructs the UE to disable a function of receiving a downlink DPDCH of the first base station, where the RNC completes the instruction by removing configuration information of a DPCH from the first RRC signaling or by using a preset indication field in the first RRC signaling; or the first network signaling instructs the first base station to disable a function of sending a downlink DPDCH, where the RNC completes the instruction by removing configuration information of a DPCH from the first network signaling or by setting a preset indication field in the first network signaling.

In an implementation manner of the method, when the UE receives DCH data from the access network, that the RNC completes the instruction by removing the configuration information of a DPCH from the first RRC signaling further includes that the first RRC signaling instructs the UE to receive an F-DPCH of the first base station, where the F-DPCH is used to perform uplink transmit power control on the UE; and the first network signaling instructs the first base station to send the F-DPCH to the UE.

In another implementation manner of the method, that the first RRC signaling instructs the UE to disable a function of receiving a downlink DPDCH of the first base station further includes that the first network signaling instructs the first base station to disable a function of sending a DPCCH to the UE; or the first RRC signaling further instructs the UE to disable a function of receiving a downlink DPCCH of the first base station.

In another implementation manner of the method, after the sending, by the RNC, the first RRC signaling to the UE and the first network signaling to the first base station, the method further includes generating, by the RNC, second RRC signaling, and sending, by the RNC, the second RRC signaling to the UE, where, when the UE receives no DCH data from the access network, the second RRC signaling is used to instruct the UE to receive an F-DPCH sent by the first base station; and when the UE receives DCH data from the access network, the second RRC signaling is used to instruct the UE to receive a downlink DPDCH sent by the first base station.

In another implementation manner of the method, when the UE receives DCH data from the access network, that the second RRC signaling is used to instruct the UE to receive a downlink DPDCH sent by the first base station further includes that the second RRC signaling instructs the UE to receive a downlink DPCCH sent by the first base station.

In another implementation manner of the method, the method further includes that, when the UE receives no DCH data from the access network, the second RRC signaling includes configuration information of the F-DPCH; and when the UE receives DCH data from the access network, the second RRC signaling includes configuration information of the downlink DPCH of the first base station.

In another implementation manner of the method, the method further includes that generating, by the RNC, second network signaling, and sending, by the RNC, the second network signaling to the first base station, where: when the UE receives no DCH data from the access network, the second network signaling is used to instruct the first base station to send the F-DPCH to the UE; and when the UE receives DCH data from the access network, the second network signaling is used to instruct the first base station to send the downlink DPDCH to the UE.

In another implementation manner of the method, when the UE receives DCH data from the access network, that the second network signaling is used to instruct the first base station to send the DPDCH to the UE further includes that: the second network signaling instructs the first base station to send a downlink DPCCH to the UE.

In another implementation manner of the method, the method further includes that, when the UE receives no DCH data from the access network, the second network signaling includes configuration information of the F-DPCH; and when the UE receives DCH data from the access network, the second network signaling includes configuration information of the downlink DPCH of the first base station.

In another implementation manner, before the RNC generates the second RRC signaling, the method further includes receiving, by the RNC, a measurement report sent by the UE, where the measurement report is used to instruct the RNC to send the second RRC signaling to the UE.

Figure 28:
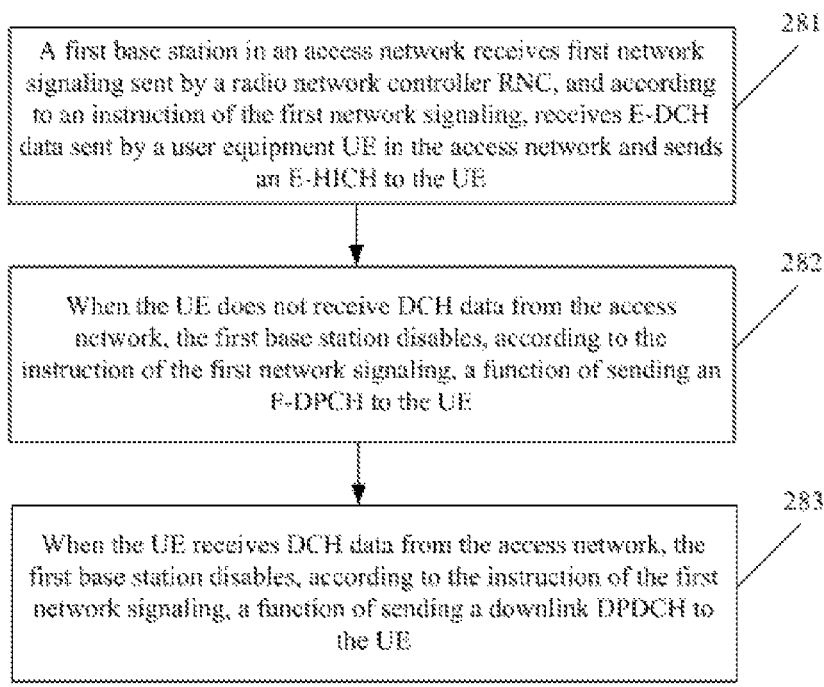
FIG. 28 is a flowchart of another embodiment of a network communications method according to the present disclosure.

As shown in FIG. 28, an embodiment of the present disclosure further provides a network communications method, which includes the following.

S281. A first base station in an access network receives first network signaling sent by a RNC, and according to an instruction of the first network signaling, receives E-DCH data sent by a UE in the access network and sends an E-HICH to the UE.

S282. When the UE receives no DCH data from the access network, the first base station disables, according to the instruction of the first network signaling, a function of sending an F-DPCH to the UE.

S283. When the UE receives DCH data from the access network, the first base station disables, according to the instruction of the first network signaling, a function of sending a downlink DPDCH to the UE.

In an implementation manner of the method, the RNC completes the instruction by removing configuration information of the F-DPCH from the first network signaling or by setting a preset indication field in the first network signaling.

In another implementation manner of the method, when the UE receives DCH data from the access network, that the first base station disables a function of sending a downlink DPDCH to the UE further includes sending, by the first base station, an F-DPCH to the UE, where the F-DPCH is used by the first base station to perform uplink transmit power control on the UE.

In another implementation manner of the method, when the UE receives DCH data from the access network, that the first base station disables a function of sending a downlink DPDCH to the UE further includes disabling, by the first base station, a function of sending a downlink DPCCH to the UE.

In another implementation manner of the method, after the first base station receives the first network signaling, the method further includes receiving, by the first base station, second network signaling sent by the RNC; when the UE receives no DCH data from the access network, sending, by the first base station, an F-DPCH to the UE according to an instruction of the second network signaling; and when the UE receives DCH data from the access network, sending, by the first base station, a downlink DPDCH to the UE according to the instruction of the second network signaling.

In another implementation manner of the method, the method further includes that, when the UE receives no DCH data from the access network, the first network signaling received by the first base station includes configuration information of the F-DPCH; and when the UE receives DCH data from the access network, the first network signaling received by the first base station includes configuration information of the downlink DPCH.

In another implementation manner of the method, when the UE receives DCH data from the access network, the sending, by the first base station, a downlink DPDCH to the UE further includes sending, by the first base station, a downlink DPCCH to the UE.

Figure 29:
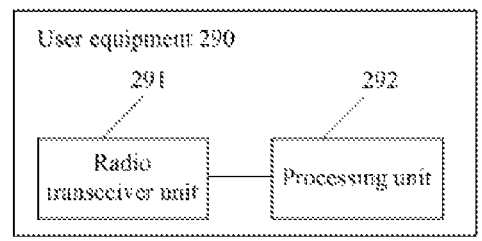
FIG. 29 is a schematic diagram of an embodiment of another user equipment according to the present disclosure.

As shown in FIG. 29, an embodiment of the present disclosure further provides a UE 290 in an access network, including a radio transceiver unit 291 configured to receive first RRC signaling of a RNC, and add a first base station to an extended E-DCH active set of the UE according to an instruction of the first RRC signaling; and receive an E-HICH of the first base station, and send new E-DCH data when the E-HICH indicates an ACK; and a processing unit 292 configured to, when the UE receives no DCH data from the access network, disable, according to the instruction of the first RRC signaling, a function of receiving a F-DPCH of the first base station, where the RNC completes the instruction by removing configuration information of the F-DPCH from the first RRC signaling or by using a preset indication field in the first RRC signaling; and when the UE receives DCH data from the access network, disable, according to the instruction of the first RRC signaling, a function of receiving a downlink DPDCH of the first base station, where the RNC completes the instruction by removing configuration information of a DPCH from the first RRC signaling or by using a preset indication field in the first RRC signaling.

In an implementation manner, when the UE receives DCH data from the access network, the radio transceiver unit 291 is further configured to receive an F-DPCH of the first base station according to the instruction of the first RRC signaling, where the F-DPCH is used to perform transmit power control on the UE.

In another implementation manner, when the UE receives DCH data from the access network, the processing unit 292 is further configured to disable a function of receiving a downlink DPCCH sent by the first base station.

In another implementation manner, after adding the first base station to the E-DCH active set of the UE, the radio transceiver unit 291 is further configured to receive first control signaling sent by a network; and receive an F-DPCH of the first base station according to an instruction of the first control signaling; or receive a downlink DPDCH sent by the first base station, where the downlink DPDCH is used to carry DCH data received by the UE from the first base station.

In another implementation manner, the radio transceiver unit 291 is further configured to receive a downlink DPCCH of the first base station, where the downlink DPCCH is used by the first base station to send physical layer control signaling to the UE.

In another implementation manner, the first control signaling sent by the network includes second RRC signaling sent by the RNC; or first physical layer signaling sent by a second base station in the access network, where the second base station is in the E-DCH active set or a DCH active set of the UE.

In another implementation manner of the method, before receiving the first control signaling sent by the network, the radio transceiver unit 291 is further configured to measure common pilot channel quality of each cell; and send a measurement report to the RNC when measuring that common pilot channel quality of the first base station is greater than a preset first threshold, so that the RNC sends the second RRC signaling to the UE according to the measurement report, or so that the RNC instructs the second base station to send the first physical layer signaling to the UE.

In another implementation manner, before receiving the F-DPCH of the first base station, the radio transceiver unit 291 is further configured to receive configuration information of the F-DPCH of the first base station, where the configuration information includes at least one of a channelization code, a frame offset, and a timeslot format of the F-DPCH.

In another implementation manner, the configuration information of the F-DPCH of the first base station is carried in the first control signaling.

In another implementation manner, before receiving the downlink DPDCH of the first base station, the radio transceiver unit 291 is further configured to receive configuration information of the downlink DPCH of the first base station, where the configuration information of the downlink DPCH includes information about a channelization code or a frame offset of the DPCH.

In another implementation manner, the configuration information of the downlink DPCH is carried in the first control signaling.

Figure 30:
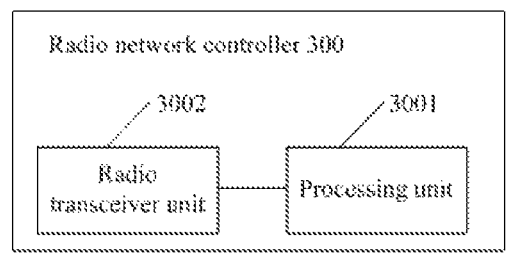
FIG. 30 is a schematic diagram of an embodiment of another radio network controller according to the present disclosure.

As shown in FIG. 30, an embodiment of the present disclosure further provides an RNC 300 in an access network, including a processing unit 3001 configured to generate first RRC signaling or first network signaling; and a radio transceiver unit 3002 configured to send the first RRC signaling to the UE or send the first network signaling to a first base station in the access network, where the first RRC signaling is used to instruct the UE to add the first base station to an E-DCH active set of the UE, and instruct the UE to receive an E-HICH of the first base station, and the first network signaling is used to instruct the first base station to receive E-DCH data sent by the UE, and instruct the first base station to send the E-HICH to the UE, where, when the UE receives no DCH data from the access network, the first RRC signaling instructs the UE to disable a function of receiving an F-DPCH of the first base station, where the processing unit 3001 completes the instruction by removing configuration information of the F-DPCH from the first RRC signaling or by setting a preset indication field in the first RRC signaling; or the first network signaling instructs the first base station to disable a function of sending an F-DPCH, where the processing unit 3001 completes the instruction by removing configuration information of the F-DPCH from the first network signaling or by setting a preset indication field in the first network signaling; and when the UE receives DCH data from the access network, the first RRC signaling instructs the UE to disable a function of receiving a downlink DPDCH of the first base station, where the processing unit 3001 completes the instruction by removing configuration information of a DPCH from the first RRC signaling or by using a preset indication field in the first RRC signaling; or the first network signaling instructs the first base station to disable a function of sending a downlink DPDCH, where the processing unit 3001 completes the instruction by removing configuration information of a DPCH from the first network signaling or by setting a preset indication field in the first network signaling.

In an implementation manner, when the UE receives DCH data from the access network, the first RRC signaling instructs the UE to receive an F-DPCH of the first base station, where the F-DPCH is used to perform uplink transmit power control on the UE; and the first network signaling instructs the first base station to send the F-DPCH to the UE.

In another implementation manner, the first network signaling instructs the first base station to disable a function of sending a DPCCH to the UE; or the first RRC signaling further instructs the UE to disable a function of receiving a downlink DPCCH of the first base station.

In another implementation manner, after the radio transceiver unit 3002 sends the first RRC signaling to the UE and sends the first network signaling to the first base station, the processing unit 3001 is further configured to generate second RRC signaling, and the radio transceiver unit 3002 is further configured to send the second RRC signaling to the UE, where, when the UE receives no DCH data from the access network, the second RRC signaling is used to instruct the UE to receive an F-DPCH sent by the first base station; and when the UE receives DCH data from the access network, the second RRC signaling is used to instruct the UE to receive a downlink DPDCH sent by the first base station.

In another implementation manner, when the UE receives DCH data from the access network, the second RRC signaling further instructs the UE to receive a downlink DPCCH sent by the first base station.

In another implementation manner, when the UE receives no DCH data from the access network, the second RRC signaling includes configuration information of the F-DPCH; and when the UE receives DCH data from the access network, the second RRC signaling includes configuration information of the downlink DPCH of the first base station.

In another implementation manner, the processing unit 3001 is further configured to generate second network signaling, and the radio transceiver unit 3002 is further configured to send the second network signaling to the first base station, where, when the UE receives no DCH data from the access network, the second network signaling is used to instruct the first base station to send the F-DPCH to the UE; and when the UE receives DCH data from the access network, the second network signaling is used to instruct the first base station to send the DPDCH to the UE.

In another implementation manner, when the UE receives DCH data from the access network, the second network signaling further instructs the first base station to send a downlink DPCCH to the UE.

In another implementation manner, when the UE receives no DCH data from the access network, the second network signaling includes configuration information of the F-DPCH; and when the UE receives DCH data from the access network, the second network signaling includes configuration information of the downlink DPCH of the first base station.

In another implementation manner, before the processing unit 3001 generates the second RRC signaling, the radio transceiver unit 3002 is further configured to receive a measurement report sent by the UE, where the measurement report is used to instruct the RNC to send the second RRC signaling to the UE.

Figure 31:
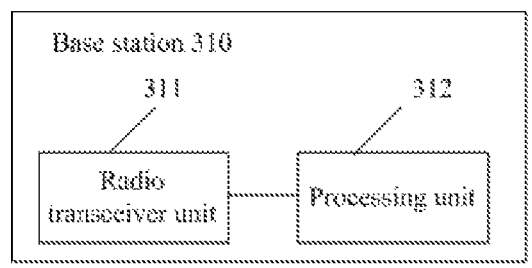
FIG. 31 is a schematic diagram of an embodiment of another base station according to the present disclosure.

As shown in FIG. 31, an embodiment of the present disclosure further provides a first base station 310 in an access network, including a radio transceiver unit 311 configured to receive first network signaling sent by a RNC, and according to an instruction of the first network signaling, receive E-DCH data sent by a user equipment UE in the access network and send an E-HICH to the UE; and a processing unit 312 configured to, when the UE receives no DCH data from the access network, disable, according to the instruction of the first network signaling, a function of sending an F-DPCH to the UE; and when the UE receives DCH data from the access network, disable, according to the instruction of the first network signaling, a function of sending a downlink DPDCH to the UE.

In an implementation manner, the RNC completes the instruction by removing configuration information of the F-DPCH from the first network signaling or by setting a preset indication field in the first network signaling.

In another implementation manner, when the UE receives DCH data from the access network, the radio transceiver unit 311 is further configured to send an F-DPCH to the UE, where the F-DPCH is used by the first base station to perform uplink transmit power control on the UE.

In another implementation manner, when the UE receives DCH data from the access network, the radio transceiver unit 311 is further configured to disable a function of sending a downlink DPCCH to the UE.

In another implementation manner, the radio transceiver unit 311 is further configured to, after receiving the first network signaling, receive second network signaling sent by the RNC; and the processing unit 312 is further configured to, when the UE receives no DCH data from the access network, send an F-DPCH to the UE according to an instruction of the second network signaling; and when the UE receives DCH data from the access network, send a downlink DPDCH to the UE according to the instruction of the second network signaling.

In another implementation manner, the radio transceiver unit 311 is further configured to: when the UE receives no DCH data from the access network, the received first network signaling includes configuration information of the F-DPCH; and when the UE receives DCH data from the access network, the received first network signaling includes configuration information of the downlink DPCH.

In another implementation manner, when the UE receives DCH data from the access network, the radio transceiver unit 311 is further configured to send a downlink DPCCH to the UE.

It should be noted that in the embodiments, the apparatuses, such as the UE, the RNC, or the base station, may be implemented by using hardware, for example, an integrated circuit or a printed circuit board (PCB) board. Any radio transceiver unit may be a radio frequency unit, for example, a transceiver; and any processing unit may be a processor, including but not limited to a baseband processor or a central processing unit (CPU).

It should be noted that in the embodiments, when the UE sends E-DCH data (high speed uplink packet service) to the base station Node B, a received downlink channel may be in two cases: the UE also receives DCH data (which generally is voice or upper-layer control signaling) when sending the E-DCH data, where the DCH data is carried on a downlink DPCH; the DPCH may be divided into two parts in terms of time, that is, a DPDCH and a DPCCH, where the DPDCH carries the DCH data, and the DPCCH carries physical control information, such as TPC, pilot, and transmit format combination indication Transmit Format Combination Indication (TFCI), which is required to receive the DCH data; and if the UE receives no DCH data when sending the E-DCH data, in the prior art, the UE does not need to receive a DPCH, but needs to receive an F-DPCH, where the F-DPCH carries TPC, so as to perform uplink power control on the UE.

In this embodiment of the present disclosure, the UE may add, in area B shown in FIG. 1, an low power node (LPN), that is, the micro base station, which corresponds to the first base station mentioned in FIG. 26 to FIG. 31) to an E-DCH active set, and the LPN may receive E-DCH data sent by the UE; however, downlink quality of the LPN is poor. In view of this:

If the UE only sends E-DCH data and receives no DCH data from a network, according to the prior art, the UE should receive an F-DPCH from the LPN. However, because downlink quality of the LPN is poor, in this embodiment of the present disclosure, the UE may not receive the F-DPCH of the LPN, and the LPN may not send the F-DPCH either, so as to reduce a power overhead of the LPN, reduce a power overhead of the UE, and avoid impact on uplink transmission of the UE by a very high error rate caused by the poor downlink transmission quality of the LPN.

If the UE also receives DCH data from a network when sending E-DCH data, according to the prior art, the UE should also receive a DCH from the LPN, that is, receive both a DPCCH and a DPDCH. However, because downlink quality of the LPN is poor, error rates of the DPCCH and the DPDCH are higher. In this embodiment, the UE does not receive the DPDCH from the LPN but still receives some control information that is carried on the DPCCH; or the UE receives no DPCCH either, which further reduces a power overhead for the UE to receive a downlink channel. If the LPN needs to perform uplink power control on the UE, the UE may receive an F-DPCH sent by the LPN, where a transmit power overhead and a receive power overhead of the F-DPCH are less than those of the DPCCH; and the UE decodes a TPC on the F-DPCH to adjust uplink power transmission of the UE. When the UE moves from area B to area C, the downlink quality of the LPN gradually gets better, and the RNC controls the UE to return to a soft handover process in the prior art. If the UE receives the DCH data from the network, in this embodiment, network signaling is used to instruct the UE to start to receive a DPCH sent by the LPN; and if the UE receives no the DCH data from the network, in this embodiment, network signaling is used to instruct the UE to receive an F-DPCH sent by the LPN.

In summary, in the embodiments of the present disclosure, an explicit or implicit manner is used so that a UE receives no an F-DPCH, a DPCCH, or a DPDCH when necessary. For example, when downlink quality from one base station to the UE deteriorates, some receiving functions of the UE may be flexibly disabled or a corresponding sending function for the UE may be disabled, so as to reduce transmit power consumption for sending a low-quality radio link by the base station, which may also reduce receive power consumption for receiving the low-quality radio link by the UE, and reduce impact of deteriorated link quality on network communications. Further, the base station and an RNC may use a disabled radio link to serve another UE, which improves a downlink capacity of a network.

In the several embodiments provided in the present disclosure, it should be understood that the disclosed apparatus and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. A part or all of the units may be selected according to actual needs to achieve the objectives of the solutions of the embodiments.

In addition, functional units in the embodiments of the present disclosure may be integrated into one processing unit, or each of the units may exist alone physically, or two or more units are integrated into one unit. The integrated unit may be implemented in a form of hardware, or may be implemented in a form of hardware in addition to a software functional unit.

When the foregoing integrated unit is implemented in a form of a software functional unit, the integrated unit may be stored in a computer-readable storage medium. The software functional unit is stored in a storage medium and includes several instructions for instructing a computer device (which may be a personal computer, a server, or a network device) or a processor to perform a part of the steps of the methods described in the embodiments of the present disclosure. The foregoing storage medium includes any medium that can store program code, such as a universal serial bus (USB) flash drive, a removable hard disk, a read-only memory (ROM), a random-access memory (RAM), a magnetic disk, or an optical disc.

It may be clearly understood by a person skilled in the art that, for the purpose of convenient and brief description, division of the foregoing function modules is taken as an example for illustration. In actual application, the foregoing functions can be allocated to different function modules and implemented according to a requirement, that is, an inner structure of an apparatus is divided into different function modules to implement all or part of the functions described above. For a detailed working process of the foregoing apparatus, reference may be made to a corresponding process in the foregoing method embodiments, and details are not described herein again.

Finally, it should be noted that the foregoing embodiments are merely intended for describing the technical solutions of the present disclosure, but not for limiting the present disclosure. Although the present disclosure is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present disclosure.

What is claimed is:

1. A user equipment (UE) in an access network, comprising:
   a radio transceiver configured to:
      receive first radio resource control (RRC) signaling of a radio network controller (RNC) indicating an RRC instruction;
      add a first base station to an enhanced dedicated channel (E-DCH) active set of the UE according to the RRC instruction;
      receive an enhanced dedicated channel hybrid automatic repeat request indicator channel (E-HICH) of the first base station; and
      send new E-DCH data when the E-HICH indicates an acknowledgement (ACK); and
   a processor coupled to the radio transceiver and configured to:
      disable, according to the RRC instruction, a first function of receiving a fractional dedicated physical channel (F-DPCH) of the first base station when the UE receives no dedicated channel (DCH) data from the first base station; and
      disable, according to the RRC instruction, a second function of receiving a downlink dedicated physical data channel (DPDCH) of the first base station when the UE receives DCH data from the first base station.

2. The UE according to claim 1, wherein the radio transceiver is further configured to receive the F-DPCH of the first base station according to the RRC instruction when the UE receives the DCH data from the access network, and wherein the F-DPCH is used to perform transmit power control on the UE.

3. The UE according to claim 1, wherein the processor is further configured to disable a third function of receiving a downlink dedicated physical control channel (DPCCH) of the first base station when the UE receives the DCH data from the access network.

4. The UE according to claim 1, wherein the radio transceiver is further configured to:
   receive first control signaling from the access network after adding the first base station to the E-DCH active set, wherein the first control signaling indicates a control signaling instruction;
   receive the F-DPCH of the first base station according to the control signaling instruction.

5. The UE according to claim 1, wherein the radio transceiver is further configured to:
   receive first control signaling from the access network after adding the first base station to the E-DCH active set, wherein the first control signaling indicates a control signaling instruction; and
   receive the downlink DPDCH from the first base station, wherein the downlink DPDCH carries the DCH data.

6. The UE according to claim 5, wherein the radio transceiver is further configured to receive a downlink DPCCH of the first base station, and wherein the downlink DPCCH carries physical layer control signaling for the UE.

7. The UE according to claim 4, wherein the first control signaling comprises a second RRC signaling sent by the RNC.

8. The UE according to claim 4, wherein the first control signaling comprises a first physical layer signaling sent by a second base station in the access network, wherein the second base station is in the E-DCH active set or a DCH active set of the UE.

9. The UE according to claim 7, wherein the radio transceiver is further configured to:
   measure, prior to receiving the first control signaling, common pilot channel quality of each cell; and
   send, prior to receiving the first control signaling, a measurement report to the RNC when measuring that common pilot channel quality of the first base station is greater than a preset first threshold,
   wherein the second RRC signaling is received in response to the measurement report, and
   wherein the first physical layer signaling is received in response to the measurement report.

10. A radio network controller (RNC) in an access network, comprising:
    a radio transceiver configured to:
       send first RRC signaling to a user equipment (UE) to instruct the UE to add a first base station to an enhanced dedicated channel (E-DCH) active set of the UE and to receive an enhanced dedicated channel hybrid automatic repeat request indicator channel (E-HICH) of the first base station; and
       send first network signaling to the first base station in the access network to instruct the first base station to receive E-DCH data from the UE and to send the E-HICH to the UE; and
    a processor coupled to the radio transceiver and configured to:
       generate the first RRC signaling;
       remove first configuration information of a fractional dedicated physical channel (F-DPCH) from the first RRC signaling or set a first preset indication field in the first RRC signaling when determining that the UE receives no dedicated channel (DCH) data from the first base station to instruct the UE to disable a first function of receiving the F-DPCH of the first base station;
       remove second configuration information of the F-DPCH from the first network signaling or set a second preset indication field in the first network signaling when determining that the UE receives no DCH data from the first base station to instruct the first base station to disable a second function of sending the F-DPCH;
       remove third configuration information of a dedicated physical channel (DPCH) from the first RRC signaling or using a third preset indication field in the first RRC signaling when determining that the UE receives first DCH data from the first base station to instruct the UE to disable a third function of receiving a downlink dedicated physical data channel (DPDCH) of the first base station; and
       remove fourth configuration information of the DPCH from the first network signaling or set a fourth preset indication field in the first network signaling when determining that the UE receives the first DCH data from the first base station to instruct the first base station to disable a fourth function of sending the downlink DPDCH.

11. The RNC according to claim 10, wherein the processor is further configured to:
    generate the first RRC signaling to further instruct the UE to receive the F-DPCH of the first base station when determining that the UE receives the first DCH data from the access network, wherein the F-DPCH is used to perform uplink transmit power control on the UE; and generate the first network signaling to further instruct the first base station to send the F-DPCH to the UE when determining that the UE receives the first DCH data from the access network.

12. The RNC according to claim 10, wherein the first network signaling further instructs the first base station to disable a fifth function of sending a dedicated physical control channel (DPCCH) to the UE, and wherein the first RRC signaling further instructs the UE to disable a function of receiving the downlink DPCCH of the first base station.

13. The RNC according to claim 10, wherein the processor is further configured to generate second RRC signaling after the radio transceiver sends the first RRC signaling to the UE and the first network signaling to the first base station, wherein the radio transceiver is further configured to send the second RRC signaling to the UE, wherein the second RRC signaling instructs the UE to receive the F-DPCH from the first base station when the UE receives no DCH data from the access network, and wherein the second RRC signaling instructs the UE to receive a downlink DPDCH from the first base station when the UE receives second DCH data from the access network.

14. The RNC according to claim 13, wherein the second RRC signaling further instructs the UE to receive the downlink DPCCH from the first base station when the UE receives the second DCH data from the access network.

15. The RNC according to claim 13, wherein the processor is further configured to generate the second network signaling, wherein the radio transceiver is further configured to send the second network signaling to the first base station, wherein the second network signaling instructs the first base station to send the F-DPCH to the UE when the UE receives no DCH data from the access network, and wherein the second network signaling instructs the first base station to send the DPDCH to the UE when the UE receives the second DCH data from the access network.

16. The RNC according to claim 15, wherein the second network signaling further instructs the first base station to send a downlink DPCCH to the UE when the UE receives the second DCH data from the access network.

17. The RNC according to claim 13, wherein the radio transceiver is further configured to receive a measurement report from the UE before the processor generates the second RRC signaling, and wherein the measurement report is used to instruct the RNC to send the second RRC signaling to the UE.

18. A first base station in an access network, comprising:
a radio transceiver configured to:
receive first network signaling from a radio network controller (RNC); and
receive enhanced dedicated channel (E-DCH) data from a user equipment (UE) in the access network according to the first network signaling; and
send an enhanced dedicated channel hybrid automatic repeat request indicator channel (E-HICH) to the UE according to the first network signaling; and
a processor coupled to the radio transceiver and configured to:
disable, according to an instruction of the first network signaling, a first function of sending a fractional dedicated physical channel (F-DPCH) to the UE when the UE receives no dedicated channel (DCH) data from the first base station; and
disable, according to the instruction of the first network signaling, a second function of sending a downlink dedicated physical data channel (DPDCH) to the UE when the UE receives dedicated channel (DCH) data from the first base station.

19. The first base station according to claim 18, wherein first network signaling does not comprise configuration information of the F-DPCH or comprise a set preset indication field.

20. The first base station according to claim 18, wherein the radio transceiver is further configured to send an F-DPCH to the UE when the UE receives the DCH data, and wherein the F-DPCH is used by the first base station to perform uplink transmit power control on the UE.

21. The first base station according to claim 18, wherein the radio transceiver is further configured to disable a function of sending a downlink dedicated physical control channel (DPCCH) to the UE when the UE receives the DCH data.

* * * * *